(12) United States Patent
Gruber et al.

(10) Patent No.: US 9,280,610 B2
(45) Date of Patent: Mar. 8, 2016

(54) CROWD SOURCING INFORMATION TO FULFILL USER REQUESTS

(71) Applicant: Apple Inc., Cupertino, CA (US)

(72) Inventors: Thomas R. Gruber, Emerald Hills, CA (US); Adam J. Cheyer, Oakland, CA (US); Donald W. Pitschel, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 125 days.

(21) Appl. No.: 13/831,669

(22) Filed: Mar. 15, 2013

(65) Prior Publication Data

US 2013/0304758 A1    Nov. 14, 2013

Related U.S. Application Data

(60) Provisional application No. 61/646,831, filed on May 14, 2012.

(51) Int. Cl.
*G06F 17/30* (2006.01)

(52) U.S. Cl.
CPC .................. *G06F 17/30976* (2013.01)

(58) Field of Classification Search
None
See application file for complete search history.

(56) References Cited

U.S. PATENT DOCUMENTS

| | | |
|---|---|---|
| 3,704,345 A | 11/1972 | Coker et al. |
| 3,828,132 A | 8/1974 | Flanagan et al. |
| 3,979,557 A | 9/1976 | Schulman et al. |
| 4,278,838 A | 7/1981 | Antonov |
| 4,282,405 A | 8/1981 | Taguchi |
| 4,310,721 A | 1/1982 | Manley et al. |
| 4,348,553 A | 9/1982 | Baker et al. |
| 4,653,021 A | 3/1987 | Takagi |
| 4,688,195 A | 8/1987 | Thompson et al. |
| 4,692,941 A | 9/1987 | Jacks et al. |
| 4,718,094 A | 1/1988 | Bahl et al. |
| 4,724,542 A | 2/1988 | Williford |
| 4,726,065 A | 2/1988 | Froessl |
| 4,727,354 A | 2/1988 | Lindsay |
| 4,776,016 A | 10/1988 | Hansen |
| 4,783,807 A | 11/1988 | Marley |
| 4,811,243 A | 3/1989 | Racine |

(Continued)

FOREIGN PATENT DOCUMENTS

| | | |
|---|---|---|
| CH | 681573 A5 | 4/1993 |
| DE | 3837590 A1 | 5/1990 |

(Continued)

OTHER PUBLICATIONS

Alfred App, 2011, http://www.alfredapp.com/, 5 pages.

(Continued)

*Primary Examiner* — Belix M Ortiz Ditren
(74) *Attorney, Agent, or Firm* — Morrison & Foerster LLP

(57) ABSTRACT

A user request is received from a mobile client device, where the user request includes at least a speech input and seeks an informational answer or performance of a task. A failure to provide a satisfactory response to the user request is detected. In response to detection of the failure, information relevant to the user request is crowd-sourced by querying one or more crowd sourcing information sources. One or more answers are received from the crowd sourcing information sources, and the response to the user request is generated based on at least one of the one or more answers received from the one or more crowd sourcing information sources.

27 Claims, 11 Drawing Sheets

(56) References Cited

U.S. PATENT DOCUMENTS

| | | |
|---|---|---|
| 4,819,271 A | 4/1989 | Bahl et al. |
| 4,827,520 A | 5/1989 | Zeinstra |
| 4,829,576 A | 5/1989 | Porter |
| 4,833,712 A | 5/1989 | Bahl et al. |
| 4,839,853 A | 6/1989 | Deerwester et al. |
| 4,852,168 A | 7/1989 | Sprague |
| 4,862,504 A | 8/1989 | Nomura |
| 4,878,230 A | 10/1989 | Murakami et al. |
| 4,903,305 A | 2/1990 | Gillick et al. |
| 4,905,163 A | 2/1990 | Garber et al. |
| 4,914,586 A | 4/1990 | Swinehart et al. |
| 4,914,590 A | 4/1990 | Loatman et al. |
| 4,944,013 A | 7/1990 | Gouvianakis et al. |
| 4,955,047 A | 9/1990 | Morganstein et al. |
| 4,965,763 A | 10/1990 | Zamora |
| 4,974,191 A | 11/1990 | Amirghodsi et al. |
| 4,977,598 A | 12/1990 | Doddington et al. |
| 4,992,972 A | 2/1991 | Brooks et al. |
| 5,010,574 A | 4/1991 | Wang |
| 5,020,112 A | 5/1991 | Chou |
| 5,021,971 A | 6/1991 | Lindsay |
| 5,022,081 A | 6/1991 | Hirose et al. |
| 5,027,406 A | 6/1991 | Roberts et al. |
| 5,031,217 A | 7/1991 | Nishimura |
| 5,032,989 A | 7/1991 | Tornetta |
| 5,040,218 A | 8/1991 | Vitale et al. |
| 5,047,614 A | 9/1991 | Bianco |
| 5,057,915 A | 10/1991 | Von Kohorn |
| 5,072,452 A | 12/1991 | Brown et al. |
| 5,091,945 A | 2/1992 | Kleijn |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,142,584 A | 8/1992 | Ozawa |
| 5,164,900 A | 11/1992 | Bernath |
| 5,165,007 A | 11/1992 | Bahl et al. |
| 5,179,652 A | 1/1993 | Rozmanith et al. |
| 5,194,950 A | 3/1993 | Murakami et al. |
| 5,197,005 A | 3/1993 | Shwartz et al. |
| 5,199,077 A | 3/1993 | Wilcox et al. |
| 5,202,952 A | 4/1993 | Gillick et al. |
| 5,208,862 A | 5/1993 | Ozawa |
| 5,216,747 A | 6/1993 | Hardwick et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,235,680 A | 8/1993 | Bijnagte |
| 5,267,345 A | 11/1993 | Brown et al. |
| 5,268,990 A | 12/1993 | Cohen et al. |
| 5,282,265 A | 1/1994 | Rohra Suda et al. |
| RE34,562 E | 3/1994 | Murakami et al. |
| 5,291,286 A | 3/1994 | Murakami et al. |
| 5,293,448 A | 3/1994 | Honda |
| 5,293,452 A | 3/1994 | Picone et al. |
| 5,297,170 A | 3/1994 | Eyuboglu et al. |
| 5,301,109 A | 4/1994 | Landauer et al. |
| 5,303,406 A | 4/1994 | Hansen et al. |
| 5,309,359 A | 5/1994 | Katz et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,327,498 A | 7/1994 | Hamon |
| 5,333,236 A | 7/1994 | Bahl et al. |
| 5,333,275 A | 7/1994 | Wheatley et al. |
| 5,345,536 A | 9/1994 | Hoshimi et al. |
| 5,349,645 A | 9/1994 | Zhao |
| 5,353,377 A | 10/1994 | Kuroda et al. |
| 5,377,301 A | 12/1994 | Rosenberg et al. |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,279 A | 2/1995 | Strong |
| 5,396,625 A | 3/1995 | Parkes |
| 5,400,434 A | 3/1995 | Pearson |
| 5,404,295 A | 4/1995 | Katz et al. |
| 5,412,756 A | 5/1995 | Bauman et al. |
| 5,412,804 A | 5/1995 | Krishna |
| 5,412,806 A | 5/1995 | Du et al. |
| 5,418,951 A | 5/1995 | Damashek |
| 5,424,947 A | 6/1995 | Nagao et al. |
| 5,434,777 A | 7/1995 | Luciw |
| 5,444,823 A | 8/1995 | Nguyen |
| 5,455,888 A | 10/1995 | Iyengar et al. |
| 5,469,529 A | 11/1995 | Bimbot et al. |
| 5,471,611 A | 11/1995 | McGregor |
| 5,475,587 A | 12/1995 | Anick et al. |
| 5,479,488 A | 12/1995 | Lenning et al. |
| 5,491,772 A | 2/1996 | Hardwick et al. |
| 5,493,677 A | 2/1996 | Balogh |
| 5,495,604 A | 2/1996 | Harding et al. |
| 5,502,790 A | 3/1996 | Yi |
| 5,502,791 A | 3/1996 | Nishimura et al. |
| 5,515,475 A | 5/1996 | Gupta et al. |
| 5,536,902 A | 7/1996 | Serra et al. |
| 5,537,618 A | 7/1996 | Boulton et al. |
| 5,574,823 A | 11/1996 | Hassanein et al. |
| 5,577,241 A | 11/1996 | Spencer |
| 5,578,808 A | 11/1996 | Taylor |
| 5,579,436 A | 11/1996 | Chou et al. |
| 5,581,655 A | 12/1996 | Cohen et al. |
| 5,584,024 A | 12/1996 | Shwartz |
| 5,596,676 A | 1/1997 | Swaminathan et al. |
| 5,596,994 A | 1/1997 | Bro |
| 5,608,624 A | 3/1997 | Luciw |
| 5,613,036 A | 3/1997 | Strong |
| 5,617,507 A | 4/1997 | Lee et al. |
| 5,619,694 A | 4/1997 | Shimazu |
| 5,621,859 A | 4/1997 | Schwartz et al. |
| 5,621,903 A | 4/1997 | Luciw et al. |
| 5,642,464 A | 6/1997 | Yue et al. |
| 5,642,519 A | 6/1997 | Martin |
| 5,644,727 A | 7/1997 | Atkins |
| 5,664,055 A | 9/1997 | Kroon |
| 5,675,819 A | 10/1997 | Schuetze |
| 5,682,539 A | 10/1997 | Conrad et al. |
| 5,687,077 A | 11/1997 | Gough, Jr. |
| 5,696,962 A | 12/1997 | Kupiec |
| 5,701,400 A | 12/1997 | Amado |
| 5,706,442 A | 1/1998 | Anderson et al. |
| 5,710,886 A | 1/1998 | Christensen et al. |
| 5,712,957 A | 1/1998 | Waibel et al. |
| 5,715,468 A | 2/1998 | Budzinski |
| 5,721,827 A | 2/1998 | Logan et al. |
| 5,727,950 A | 3/1998 | Cook et al. |
| 5,729,694 A | 3/1998 | Holzrichter et al. |
| 5,732,390 A | 3/1998 | Katayanagi et al. |
| 5,734,791 A | 3/1998 | Acero et al. |
| 5,737,734 A | 4/1998 | Schultz |
| 5,748,974 A | 5/1998 | Johnson |
| 5,749,081 A | 5/1998 | Whiteis |
| 5,759,101 A | 6/1998 | Von Kohorn |
| 5,790,978 A | 8/1998 | Olive et al. |
| 5,794,050 A | 8/1998 | Dahlgren et al. |
| 5,794,182 A | 8/1998 | Manduchi et al. |
| 5,794,207 A | 8/1998 | Walker et al. |
| 5,794,237 A | 8/1998 | Gore, Jr. |
| 5,799,276 A | 8/1998 | Komissarchik et al. |
| 5,822,743 A | 10/1998 | Gupta et al. |
| 5,825,881 A | 10/1998 | Colvin, Sr. |
| 5,826,261 A | 10/1998 | Spencer |
| 5,828,999 A | 10/1998 | Bellegarda et al. |
| 5,835,893 A | 11/1998 | Ushioda |
| 5,839,106 A | 11/1998 | Bellegarda |
| 5,845,255 A | 12/1998 | Mayaud |
| 5,857,184 A | 1/1999 | Lynch |
| 5,860,063 A | 1/1999 | Gorin et al. |
| 5,862,223 A | 1/1999 | Walker et al. |
| 5,864,806 A | 1/1999 | Mokbel et al. |
| 5,864,844 A | 1/1999 | James et al. |
| 5,867,799 A | 2/1999 | Lang et al. |

(56) References Cited

U.S. PATENT DOCUMENTS

| | | |
|---|---|---|
| 5,873,056 A | 2/1999 | Liddy et al. |
| 5,875,437 A | 2/1999 | Atkins |
| 5,884,323 A | 3/1999 | Hawkins et al. |
| 5,895,464 A | 4/1999 | Bhandari et al. |
| 5,895,466 A | 4/1999 | Goldberg et al. |
| 5,899,972 A | 5/1999 | Miyazawa et al. |
| 5,913,193 A | 6/1999 | Huang et al. |
| 5,915,249 A | 6/1999 | Spencer |
| 5,930,769 A | 7/1999 | Rose |
| 5,933,822 A | 8/1999 | Braden-Harder et al. |
| 5,936,926 A | 8/1999 | Yokouchi et al. |
| 5,940,811 A | 8/1999 | Norris |
| 5,941,944 A | 8/1999 | Messerly |
| 5,943,670 A | 8/1999 | Prager |
| 5,948,040 A | 9/1999 | DeLorme et al. |
| 5,956,699 A | 9/1999 | Wong et al. |
| 5,960,422 A | 9/1999 | Prasad |
| 5,963,924 A | 10/1999 | Williams et al. |
| 5,966,126 A | 10/1999 | Szabo |
| 5,970,474 A | 10/1999 | LeRoy et al. |
| 5,974,146 A | 10/1999 | Randle et al. |
| 5,982,891 A | 11/1999 | Ginter et al. |
| 5,987,132 A | 11/1999 | Rowney |
| 5,987,140 A | 11/1999 | Rowney et al. |
| 5,987,404 A | 11/1999 | Della Pietra et al. |
| 5,987,440 A | 11/1999 | O'Neil et al. |
| 5,999,908 A | 12/1999 | Abelow |
| 6,016,471 A | 1/2000 | Kuhn et al. |
| 6,023,684 A | 2/2000 | Pearson |
| 6,024,288 A | 2/2000 | Gottlich et al. |
| 6,026,345 A | 2/2000 | Shah et al. |
| 6,026,375 A | 2/2000 | Hall et al. |
| 6,026,388 A | 2/2000 | Liddy et al. |
| 6,026,393 A | 2/2000 | Gupta et al. |
| 6,029,132 A | 2/2000 | Kuhn et al. |
| 6,038,533 A | 3/2000 | Buchsbaum et al. |
| 6,052,656 A | 4/2000 | Suda et al. |
| 6,055,514 A | 4/2000 | Wren |
| 6,055,531 A | 4/2000 | Bennett et al. |
| 6,064,960 A | 5/2000 | Bellegarda et al. |
| 6,070,139 A | 5/2000 | Miyazawa et al. |
| 6,070,147 A | 5/2000 | Harms et al. |
| 6,076,051 A | 6/2000 | Messerly et al. |
| 6,076,088 A | 6/2000 | Paik et al. |
| 6,078,914 A | 6/2000 | Redfern |
| 6,081,750 A | 6/2000 | Hoffberg et al. |
| 6,081,774 A | 6/2000 | de Hita et al. |
| 6,088,731 A | 7/2000 | Kiraly et al. |
| 6,094,649 A | 7/2000 | Bowen et al. |
| 6,105,865 A | 8/2000 | Hardesty |
| 6,108,627 A | 8/2000 | Sabourin |
| 6,119,101 A | 9/2000 | Peckover |
| 6,122,616 A | 9/2000 | Henton |
| 6,125,356 A | 9/2000 | Brockman et al. |
| 6,144,938 A | 11/2000 | Surace et al. |
| 6,173,261 B1 | 1/2001 | Arai et al. |
| 6,173,279 B1 | 1/2001 | Levin et al. |
| 6,188,999 B1 | 2/2001 | Moody |
| 6,195,641 B1 | 2/2001 | Loring et al. |
| 6,205,456 B1 | 3/2001 | Nakao |
| 6,208,971 B1 | 3/2001 | Bellegarda et al. |
| 6,233,559 B1 | 5/2001 | Balakrishnan |
| 6,233,578 B1 | 5/2001 | Machihara et al. |
| 6,246,981 B1 | 6/2001 | Papineni et al. |
| 6,260,024 B1 | 7/2001 | Shkedy |
| 6,266,637 B1 | 7/2001 | Donovan et al. |
| 6,275,824 B1 | 8/2001 | O'Flaherty et al. |
| 6,285,786 B1 | 9/2001 | Seni et al. |
| 6,308,149 B1 | 10/2001 | Gaussier et al. |
| 6,311,189 B1 | 10/2001 | deVries et al. |
| 6,317,594 B1 | 11/2001 | Gossman et al. |
| 6,317,707 B1 | 11/2001 | Bangalore et al. |
| 6,317,831 B1 | 11/2001 | King |
| 6,321,092 B1 | 11/2001 | Fitch et al. |
| 6,334,103 B1 | 12/2001 | Surace et al. |
| 6,356,854 B1 | 3/2002 | Schubert et al. |
| 6,356,905 B1 | 3/2002 | Gershman et al. |
| 6,366,883 B1 | 4/2002 | Campbell et al. |
| 6,366,884 B1 | 4/2002 | Bellegarda et al. |
| 6,421,672 B1 | 7/2002 | McAllister et al. |
| 6,434,524 B1 | 8/2002 | Weber |
| 6,446,076 B1 | 9/2002 | Burkey et al. |
| 6,449,620 B1 | 9/2002 | Draper et al. |
| 6,453,292 B2 | 9/2002 | Ramaswamy et al. |
| 6,460,029 B1 | 10/2002 | Fries et al. |
| 6,466,654 B1 | 10/2002 | Cooper et al. |
| 6,477,488 B1 | 11/2002 | Bellegarda |
| 6,487,534 B1 | 11/2002 | Thelen et al. |
| 6,499,013 B1 | 12/2002 | Weber |
| 6,501,937 B1 | 12/2002 | Ho et al. |
| 6,505,158 B1 | 1/2003 | Conkie |
| 6,505,175 B1 | 1/2003 | Silverman et al. |
| 6,505,183 B1 | 1/2003 | Loofbourrow et al. |
| 6,510,417 B1 | 1/2003 | Woods et al. |
| 6,513,063 B1 | 1/2003 | Julia et al. |
| 6,523,061 B1 | 2/2003 | Halverson et al. |
| 6,523,172 B1 | 2/2003 | Martinez-Guerra et al. |
| 6,526,382 B1 | 2/2003 | Yuschik |
| 6,526,395 B1 | 2/2003 | Morris |
| 6,532,444 B1 | 3/2003 | Weber |
| 6,532,446 B1 | 3/2003 | King |
| 6,546,388 B1 | 4/2003 | Edlund et al. |
| 6,553,344 B2 | 4/2003 | Bellegarda et al. |
| 6,556,983 B1 | 4/2003 | Altschuler et al. |
| 6,584,464 B1 | 6/2003 | Warthen |
| 6,598,039 B1 | 7/2003 | Livowsky |
| 6,601,026 B2 | 7/2003 | Appelt et al. |
| 6,601,234 B1 | 7/2003 | Bowman-Amuah |
| 6,604,059 B2 | 8/2003 | Strubbe et al. |
| 6,615,172 B1 | 9/2003 | Bennett et al. |
| 6,615,175 B1 | 9/2003 | Gazdzinski |
| 6,615,220 B1 | 9/2003 | Austin et al. |
| 6,625,583 B1 | 9/2003 | Silverman et al. |
| 6,631,346 B1 | 10/2003 | Karaorman et al. |
| 6,633,846 B1 | 10/2003 | Bennett et al. |
| 6,647,260 B2 | 11/2003 | Dusse et al. |
| 6,650,735 B2 | 11/2003 | Burton et al. |
| 6,654,740 B2 | 11/2003 | Tokuda et al. |
| 6,665,639 B2 | 12/2003 | Mozer et al. |
| 6,665,640 B1 | 12/2003 | Bennett et al. |
| 6,665,641 B1 | 12/2003 | Coorman et al. |
| 6,684,187 B1 | 1/2004 | Conkie |
| 6,691,064 B2 | 2/2004 | Vroman |
| 6,691,111 B2 | 2/2004 | Lazaridis et al. |
| 6,691,151 B1 | 2/2004 | Cheyer et al. |
| 6,697,780 B1 | 2/2004 | Beutnagel et al. |
| 6,697,824 B1 | 2/2004 | Bowman-Amuah |
| 6,701,294 B1 | 3/2004 | Ball et al. |
| 6,711,585 B1 | 3/2004 | Copperman et al. |
| 6,718,324 B2 | 4/2004 | Edlund et al. |
| 6,721,728 B2 | 4/2004 | McGreevy |
| 6,735,632 B1 | 5/2004 | Kiraly et al. |
| 6,742,021 B1 | 5/2004 | Halverson et al. |
| 6,757,362 B1 | 6/2004 | Cooper et al. |
| 6,757,718 B1 | 6/2004 | Halverson et al. |
| 6,766,320 B1 | 7/2004 | Wang et al. |
| 6,778,951 B1 | 8/2004 | Contractor |
| 6,778,952 B2 | 8/2004 | Bellegarda |
| 6,778,962 B1 | 8/2004 | Kasai et al. |
| 6,778,970 B2 | 8/2004 | Au |
| 6,792,082 B1 | 9/2004 | Levine |
| 6,807,574 B1 | 10/2004 | Partovi et al. |
| 6,810,379 B1 | 10/2004 | Vermeulen et al. |
| 6,813,491 B1 | 11/2004 | McKinney |
| 6,829,603 B1 | 12/2004 | Chai et al. |
| 6,832,194 B1 | 12/2004 | Mozer et al. |
| 6,842,767 B1 | 1/2005 | Partovi et al. |
| 6,847,966 B1 | 1/2005 | Sommer et al. |
| 6,847,979 B2 | 1/2005 | Allemang et al. |
| 6,851,115 B1 | 2/2005 | Cheyer et al. |
| 6,859,931 B1 | 2/2005 | Cheyer et al. |
| 6,895,380 B2 | 5/2005 | Sepe, Jr. |
| 6,895,558 B1 | 5/2005 | Loveland |
| 6,901,399 B1 | 5/2005 | Corston et al. |

(56) References Cited

U.S. PATENT DOCUMENTS

| | | |
|---|---|---|
| 6,912,499 B1 | 6/2005 | Sabourin et al. |
| 6,924,828 B1 | 8/2005 | Hirsch |
| 6,928,614 B1 | 8/2005 | Everhart |
| 6,931,384 B1 | 8/2005 | Horvitz et al. |
| 6,937,975 B1 | 8/2005 | Elworthy |
| 6,937,986 B2 | 8/2005 | Denenberg et al. |
| 6,964,023 B2 | 11/2005 | Maes et al. |
| 6,980,949 B2 | 12/2005 | Ford |
| 6,980,955 B2 | 12/2005 | Okutani et al. |
| 6,985,865 B1 | 1/2006 | Packingham et al. |
| 6,988,071 B1 | 1/2006 | Gazdzinski |
| 6,996,531 B2 | 2/2006 | Korall et al. |
| 6,999,927 B2 | 2/2006 | Mozer et al. |
| 7,020,685 B1 | 3/2006 | Chen et al. |
| 7,027,974 B1 | 4/2006 | Busch et al. |
| 7,036,128 B1 | 4/2006 | Julia et al. |
| 7,050,977 B1 | 5/2006 | Bennett |
| 7,058,569 B2 | 6/2006 | Coorman et al. |
| 7,062,428 B2 | 6/2006 | Hogenhout et al. |
| 7,069,560 B1 | 6/2006 | Cheyer et al. |
| 7,092,887 B2 | 8/2006 | Mozer et al. |
| 7,092,928 B2 | 8/2006 | Elad et al. |
| 7,093,693 B1 | 8/2006 | Gazdzinski |
| 7,127,046 B1 | 10/2006 | Smith et al. |
| 7,127,403 B1 | 10/2006 | Saylor et al. |
| 7,136,710 B1 | 11/2006 | Hoffberg et al. |
| 7,137,126 B1 | 11/2006 | Coffman et al. |
| 7,139,714 B2 | 11/2006 | Bennett et al. |
| 7,139,722 B2 | 11/2006 | Perrella et al. |
| 7,152,070 B1 | 12/2006 | Musick et al. |
| 7,177,798 B2 | 2/2007 | Hsu et al. |
| 7,197,460 B1 | 3/2007 | Gupta et al. |
| 7,200,559 B2 | 4/2007 | Wang |
| 7,203,646 B2 | 4/2007 | Bennett |
| 7,216,073 B2 | 5/2007 | Lavi et al. |
| 7,216,080 B2 | 5/2007 | Tsiao et al. |
| 7,225,125 B2 | 5/2007 | Bennett et al. |
| 7,233,790 B2 | 6/2007 | Kjellberg et al. |
| 7,233,904 B2 | 6/2007 | Luisi |
| 7,266,496 B2 | 9/2007 | Wang et al. |
| 7,277,854 B2 | 10/2007 | Bennett et al. |
| 7,290,039 B1 | 10/2007 | Lisitsa et al. |
| 7,299,033 B2 | 11/2007 | Kjellberg et al. |
| 7,310,600 B1 | 12/2007 | Garner et al. |
| 7,324,947 B2 | 1/2008 | Jordan et al. |
| 7,349,953 B2 | 3/2008 | Lisitsa et al. |
| 7,376,556 B2 | 5/2008 | Bennett |
| 7,376,645 B2 | 5/2008 | Bernard |
| 7,379,874 B2 | 5/2008 | Schmid et al. |
| 7,386,449 B2 | 6/2008 | Sun et al. |
| 7,389,224 B1 | 6/2008 | Elworthy |
| 7,392,185 B2 | 6/2008 | Bennett |
| 7,398,209 B2 | 7/2008 | Kennewick et al. |
| 7,403,938 B2 | 7/2008 | Harrison et al. |
| 7,409,337 B1 | 8/2008 | Potter et al. |
| 7,415,100 B2 | 8/2008 | Cooper et al. |
| 7,418,392 B1 | 8/2008 | Mozer et al. |
| 7,426,467 B2 | 9/2008 | Nashida et al. |
| 7,427,024 B1 | 9/2008 | Gazdzinski et al. |
| 7,447,635 B1 | 11/2008 | Konopka et al. |
| 7,454,351 B2 | 11/2008 | Jeschke et al. |
| 7,467,087 B1 | 12/2008 | Gillick et al. |
| 7,475,010 B2 | 1/2009 | Chao |
| 7,483,894 B2 | 1/2009 | Cao |
| 7,487,089 B2 | 2/2009 | Mozer |
| 7,496,498 B2 | 2/2009 | Chu et al. |
| 7,496,512 B2 | 2/2009 | Zhao et al. |
| 7,502,738 B2 | 3/2009 | Kennewick et al. |
| 7,508,373 B2 | 3/2009 | Lin et al. |
| 7,522,927 B2 | 4/2009 | Fitch et al. |
| 7,523,108 B2 | 4/2009 | Cao |
| 7,526,466 B2 | 4/2009 | Au |
| 7,529,671 B2 | 5/2009 | Rockenbeck et al. |
| 7,529,676 B2 | 5/2009 | Koyama |
| 7,539,656 B2 | 5/2009 | Fratkina et al. |
| 7,546,382 B2 | 6/2009 | Healey et al. |
| 7,548,895 B2 | 6/2009 | Pulsipher |
| 7,552,055 B2 | 6/2009 | Lecoeuche |
| 7,555,431 B2 | 6/2009 | Bennett |
| 7,558,730 B2 | 7/2009 | Davis et al. |
| 7,571,106 B2 | 8/2009 | Cao et al. |
| 7,599,918 B2 | 10/2009 | Shen et al. |
| 7,620,549 B2 | 11/2009 | Di Cristo et al. |
| 7,624,007 B2 | 11/2009 | Bennett |
| 7,634,409 B2 | 12/2009 | Kennewick et al. |
| 7,636,657 B2 | 12/2009 | Ju et al. |
| 7,640,160 B2 | 12/2009 | Di Cristo et al. |
| 7,647,225 B2 | 1/2010 | Bennett et al. |
| 7,657,424 B2 | 2/2010 | Bennett |
| 7,672,841 B2 | 3/2010 | Bennett |
| 7,676,026 B1 | 3/2010 | Baxter, Jr. |
| 7,684,985 B2 | 3/2010 | Dominach et al. |
| 7,693,715 B2 | 4/2010 | Hwang et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,707,027 B2 | 4/2010 | Balchandran et al. |
| 7,707,032 B2 | 4/2010 | Wang et al. |
| 7,707,267 B2 | 4/2010 | Lisitsa et al. |
| 7,711,565 B1 | 5/2010 | Gazdzinski |
| 7,711,672 B2 | 5/2010 | Au |
| 7,716,056 B2 | 5/2010 | Weng et al. |
| 7,720,674 B2 | 5/2010 | Kaiser et al. |
| 7,720,683 B1 | 5/2010 | Vermeulen et al. |
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,729,904 B2 | 6/2010 | Bennett |
| 7,729,916 B2 | 6/2010 | Coffman et al. |
| 7,734,461 B2 | 6/2010 | Kwak et al. |
| 7,747,616 B2 | 6/2010 | Yamada et al. |
| 7,752,152 B2 | 7/2010 | Paek et al. |
| 7,756,868 B2 | 7/2010 | Lee |
| 7,774,204 B2 | 8/2010 | Mozer et al. |
| 7,783,486 B2 | 8/2010 | Rosser et al. |
| 7,801,729 B2 | 9/2010 | Mozer |
| 7,809,570 B2 | 10/2010 | Kennewick et al. |
| 7,809,610 B2 | 10/2010 | Cao |
| 7,818,176 B2 | 10/2010 | Freeman et al. |
| 7,822,608 B2 | 10/2010 | Cross, Jr. et al. |
| 7,826,945 B2 | 11/2010 | Zhang et al. |
| 7,831,426 B2 | 11/2010 | Bennett |
| 7,840,400 B2 | 11/2010 | Lavi et al. |
| 7,840,447 B2 | 11/2010 | Kleinrock et al. |
| 7,853,574 B2 | 12/2010 | Kraenzel et al. |
| 7,873,519 B2 | 1/2011 | Bennett |
| 7,873,654 B2 | 1/2011 | Bernard |
| 7,881,936 B2 | 2/2011 | Longé et al. |
| 7,890,652 B2 | 2/2011 | Bull et al. |
| 7,912,702 B2 | 3/2011 | Bennett |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,925,525 B2 | 4/2011 | Chin |
| 7,930,168 B2 | 4/2011 | Weng et al. |
| 7,949,529 B2 | 5/2011 | Weider et al. |
| 7,949,534 B2 | 5/2011 | Davis et al. |
| 7,974,844 B2 | 7/2011 | Sumita |
| 7,974,972 B2 | 7/2011 | Cao |
| 7,983,915 B2 | 7/2011 | Knight et al. |
| 7,983,917 B2 | 7/2011 | Kennewick et al. |
| 7,983,997 B2 | 7/2011 | Allen et al. |
| 7,986,431 B2 | 7/2011 | Emori et al. |
| 7,987,151 B2 | 7/2011 | Schott et al. |
| 7,996,228 B2 | 8/2011 | Miller et al. |
| 8,000,453 B2 | 8/2011 | Cooper et al. |
| 8,005,679 B2 | 8/2011 | Jordan et al. |
| 8,015,006 B2 | 9/2011 | Kennewick et al. |
| 8,024,195 B2 | 9/2011 | Mozer et al. |
| 8,036,901 B2 | 10/2011 | Mozer |
| 8,041,570 B2 | 10/2011 | Mirkovic et al. |
| 8,041,611 B2 | 10/2011 | Kleinrock et al. |

(56) References Cited

U.S. PATENT DOCUMENTS

| | | |
|---|---|---|
| 8,055,708 B2 | 11/2011 | Chitsaz et al. |
| 8,065,155 B1 | 11/2011 | Gazdzinski |
| 8,065,156 B2 | 11/2011 | Gazdzinski |
| 8,069,046 B2 | 11/2011 | Kennewick et al. |
| 8,073,681 B2 | 12/2011 | Baldwin et al. |
| 8,078,473 B1 | 12/2011 | Gazdzinski |
| 8,082,153 B2 | 12/2011 | Coffman et al. |
| 8,095,364 B2 | 1/2012 | LongÉ et al. |
| 8,099,289 B2 | 1/2012 | Mozer et al. |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,131,557 B2 | 3/2012 | Davis et al. |
| 8,140,335 B2 | 3/2012 | Kennewick et al. |
| 8,165,886 B1 | 4/2012 | Gagnon et al. |
| 8,166,019 B1 | 4/2012 | Lee et al. |
| 8,190,359 B2 | 5/2012 | Bourne |
| 8,195,467 B2 | 6/2012 | Mozer et al. |
| 8,204,238 B2 | 6/2012 | Mozer |
| 8,205,788 B1 | 6/2012 | Gazdzinski et al. |
| 8,219,407 B1 | 7/2012 | Roy et al. |
| 8,285,551 B2 | 10/2012 | Gazdzinski |
| 8,285,553 B2 | 10/2012 | Gazdzinski |
| 8,290,778 B2 | 10/2012 | Gazdzinski |
| 8,290,781 B2 | 10/2012 | Gazdzinski |
| 8,296,146 B2 | 10/2012 | Gazdzinski |
| 8,296,153 B2 | 10/2012 | Gazdzinski |
| 8,301,456 B2 | 10/2012 | Gazdzinski |
| 8,311,834 B1 | 11/2012 | Gazdzinski |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,447,612 B2 | 5/2013 | Gazdzinski |
| 2001/0047264 A1 | 11/2001 | Roundtree |
| 2002/0032564 A1 | 3/2002 | Ehsani et al. |
| 2002/0046025 A1 | 4/2002 | Hain |
| 2002/0069063 A1 | 6/2002 | Buchner et al. |
| 2002/0077817 A1 | 6/2002 | Atal |
| 2002/0103641 A1 | 8/2002 | Kuo et al. |
| 2002/0164000 A1 | 11/2002 | Cohen et al. |
| 2002/0198714 A1 | 12/2002 | Zhou |
| 2004/0135701 A1 | 7/2004 | Yasuda et al. |
| 2004/0236778 A1 | 11/2004 | Junqua et al. |
| 2005/0055403 A1 | 3/2005 | Brittan |
| 2005/0071332 A1 | 3/2005 | Ortega et al. |
| 2005/0080625 A1 | 4/2005 | Bennett et al. |
| 2005/0091118 A1 | 4/2005 | Fano |
| 2005/0102614 A1 | 5/2005 | Brockett et al. |
| 2005/0108001 A1 | 5/2005 | Aarskog |
| 2005/0114124 A1 | 5/2005 | Liu et al. |
| 2005/0119897 A1 | 6/2005 | Bennett et al. |
| 2005/0143972 A1 | 6/2005 | Gopalakrishnan et al. |
| 2005/0165607 A1 | 7/2005 | DiFabbrizio et al. |
| 2005/0182629 A1 | 8/2005 | Coorman et al. |
| 2005/0196733 A1 | 9/2005 | Budra et al. |
| 2005/0288936 A1 | 12/2005 | Busayapongchai et al. |
| 2006/0018492 A1 | 1/2006 | Chiu et al. |
| 2006/0106592 A1 | 5/2006 | Brockett et al. |
| 2006/0106594 A1 | 5/2006 | Brockett et al. |
| 2006/0106595 A1 | 5/2006 | Brockett et al. |
| 2006/0117002 A1 | 6/2006 | Swen |
| 2006/0122834 A1 | 6/2006 | Bennett |
| 2006/0143007 A1 | 6/2006 | Koh et al. |
| 2007/0055529 A1 | 3/2007 | Kanevsky et al. |
| 2007/0058832 A1 | 3/2007 | Hug et al. |
| 2007/0088556 A1 | 4/2007 | Andrew |
| 2007/0100790 A1 | 5/2007 | Cheyer et al. |
| 2007/0106674 A1 | 5/2007 | Agrawal et al. |
| 2007/0118377 A1 | 5/2007 | Badino et al. |
| 2007/0135949 A1 | 6/2007 | Snover et al. |
| 2007/0174188 A1 | 7/2007 | Fish |
| 2007/0185917 A1 | 8/2007 | Prahlad et al. |
| 2007/0282595 A1 | 12/2007 | Tunning et al. |
| 2008/0015864 A1 | 1/2008 | Ross et al. |
| 2008/0021708 A1 | 1/2008 | Bennett et al. |
| 2008/0034032 A1 | 2/2008 | Healey et al. |
| 2008/0052063 A1 | 2/2008 | Bennett et al. |
| 2008/0120112 A1 | 5/2008 | Jordan et al. |
| 2008/0129520 A1 | 6/2008 | Lee |
| 2008/0140657 A1 | 6/2008 | Azvine et al. |
| 2008/0154612 A1* | 6/2008 | Evermann et al. ............ 704/275 |
| 2008/0221903 A1 | 9/2008 | Kanevsky et al. |
| 2008/0228496 A1 | 9/2008 | Yu et al. |
| 2008/0247519 A1 | 10/2008 | Abella et al. |
| 2008/0249770 A1 | 10/2008 | Kim et al. |
| 2008/0300878 A1 | 12/2008 | Bennett |
| 2008/0319763 A1 | 12/2008 | Di Fabbrizio et al. |
| 2009/0006100 A1 | 1/2009 | Badger et al. |
| 2009/0006343 A1 | 1/2009 | Platt et al. |
| 2009/0030800 A1 | 1/2009 | Grois |
| 2009/0055179 A1 | 2/2009 | Cho et al. |
| 2009/0058823 A1 | 3/2009 | Kocienda |
| 2009/0076796 A1 | 3/2009 | Daraselia |
| 2009/0077165 A1 | 3/2009 | Rhodes et al. |
| 2009/0100049 A1 | 4/2009 | Cao |
| 2009/0112677 A1 | 4/2009 | Rhett |
| 2009/0150156 A1 | 6/2009 | Kennewick et al. |
| 2009/0157401 A1 | 6/2009 | Bennett |
| 2009/0164441 A1 | 6/2009 | Cheyer |
| 2009/0171664 A1 | 7/2009 | Kennewick et al. |
| 2009/0287583 A1 | 11/2009 | Holmes |
| 2009/0290718 A1 | 11/2009 | Kahn et al. |
| 2009/0299745 A1 | 12/2009 | Kennewick et al. |
| 2009/0299849 A1 | 12/2009 | Cao et al. |
| 2009/0307162 A1 | 12/2009 | Bui et al. |
| 2010/0005081 A1 | 1/2010 | Bennett |
| 2010/0023320 A1 | 1/2010 | Di Cristo et al. |
| 2010/0036660 A1 | 2/2010 | Bennett |
| 2010/0042400 A1 | 2/2010 | Block et al. |
| 2010/0088020 A1 | 4/2010 | Sano et al. |
| 2010/0138215 A1 | 6/2010 | Williams |
| 2010/0145700 A1 | 6/2010 | Kennewick et al. |
| 2010/0204986 A1 | 8/2010 | Kennewick et al. |
| 2010/0217604 A1 | 8/2010 | Baldwin et al. |
| 2010/0228540 A1 | 9/2010 | Bennett |
| 2010/0235341 A1 | 9/2010 | Bennett |
| 2010/0257160 A1 | 10/2010 | Cao |
| 2010/0262599 A1 | 10/2010 | Nitz |
| 2010/0277579 A1 | 11/2010 | Cho et al. |
| 2010/0280983 A1 | 11/2010 | Cho et al. |
| 2010/0286985 A1 | 11/2010 | Kennewick et al. |
| 2010/0299142 A1 | 11/2010 | Freeman et al. |
| 2010/0312547 A1 | 12/2010 | van Os et al. |
| 2010/0318576 A1 | 12/2010 | Kim |
| 2010/0332235 A1 | 12/2010 | David |
| 2010/0332348 A1 | 12/2010 | Cao |
| 2011/0047072 A1 | 2/2011 | Ciurea |
| 2011/0060807 A1 | 3/2011 | Martin et al. |
| 2011/0082688 A1 | 4/2011 | Kim et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |
| 2011/0130958 A1 | 6/2011 | Stahl et al. |
| 2011/0131036 A1 | 6/2011 | Di Cristo et al. |
| 2011/0131045 A1 | 6/2011 | Cristo et al. |
| 2011/0143811 A1 | 6/2011 | Rodriguez |
| 2011/0144999 A1 | 6/2011 | Jang et al. |
| 2011/0161076 A1 | 6/2011 | Davis et al. |
| 2011/0161309 A1 | 6/2011 | Lung et al. |
| 2011/0175810 A1 | 7/2011 | Markovic et al. |
| 2011/0184730 A1 | 7/2011 | LeBeau et al. |
| 2011/0218855 A1 | 9/2011 | Cao et al. |
| 2011/0231182 A1 | 9/2011 | Weider et al. |
| 2011/0231188 A1 | 9/2011 | Kennewick et al. |
| 2011/0264643 A1 | 10/2011 | Cao |
| 2011/0279368 A1 | 11/2011 | Klein et al. |
| 2011/0306426 A1 | 12/2011 | Novak et al. |
| 2012/0002820 A1 | 1/2012 | Leichter |
| 2012/0016678 A1 | 1/2012 | Gruber et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |

(56) References Cited

U.S. PATENT DOCUMENTS

| | | |
|---|---|---|
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022874 A1 | 1/2012 | Lloyd et al. |
| 2012/0022876 A1 | 1/2012 | LeBeau et al. |
| 2012/0023088 A1 | 1/2012 | Cheng et al. |
| 2012/0034904 A1 | 2/2012 | LeBeau et al. |
| 2012/0035908 A1 | 2/2012 | LeBeau et al. |
| 2012/0035924 A1 | 2/2012 | Jitkoff et al. |
| 2012/0035931 A1 | 2/2012 | LeBeau et al. |
| 2012/0035932 A1 | 2/2012 | Jitkoff et al. |
| 2012/0042343 A1 | 2/2012 | Laligand et al. |
| 2012/0137367 A1 | 5/2012 | Dupont et al. |
| 2012/0173464 A1 | 7/2012 | Tur et al. |
| 2012/0265528 A1 | 10/2012 | Gruber et al. |
| 2012/0271676 A1 | 10/2012 | Aravamudan et al. |
| 2012/0275377 A1* | 11/2012 | Lehane ............... H04L 41/0816 370/328 |
| 2012/0311583 A1 | 12/2012 | Gruber et al. |
| 2013/0110518 A1 | 5/2013 | Gruber et al. |
| 2013/0110520 A1 | 5/2013 | Cheyer et al. |
| 2013/0238647 A1* | 9/2013 | Thompson ................... 707/758 |

FOREIGN PATENT DOCUMENTS

| | | |
|---|---|---|
| DE | 198 41 541 B4 | 12/2007 |
| EP | 0138061 B1 | 9/1984 |
| EP | 0138061 A1 | 4/1985 |
| EP | 0218859 A2 | 4/1987 |
| EP | 0262938 A1 | 4/1988 |
| EP | 0293259 A2 | 11/1988 |
| EP | 0299572 A2 | 1/1989 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0559349 A1 | 9/1993 |
| EP | 0559349 B1 | 9/1993 |
| EP | 0570660 A1 | 11/1993 |
| EP | 0863453 A1 | 9/1998 |
| EP | 1245023 A1 | 10/2002 |
| EP | 2 109 295 A1 | 10/2009 |
| GB | 2293667 A | 4/1996 |
| JP | 06 019965 | 1/1994 |
| JP | 2001 125896 | 5/2001 |
| JP | 2002 024212 | 1/2002 |
| JP | 2003 517158 A | 5/2003 |
| JP | 2009 036999 | 2/2009 |
| KR | 10-2007-0057496 | 6/2007 |
| KR | 10-0776800 B1 | 11/2007 |
| KR | 10-2008-001227 | 2/2008 |
| KR | 10-0810500 B1 | 3/2008 |
| KR | 10 2008 109322 A | 12/2008 |
| KR | 10 2009 086805 A | 8/2009 |
| KR | 10-0920267 B1 | 10/2009 |
| KR | 10-2010-0032792 | 4/2010 |
| KR | 10 2011 0113414 A | 10/2011 |
| WO | WO 95/02221 | 1/1995 |
| WO | WO 97/26612 | 7/1997 |
| WO | WO 98/41956 | 9/1998 |
| WO | WO 99/01834 | 1/1999 |
| WO | WO 99/08238 | 2/1999 |
| WO | WO 99/56227 | 11/1999 |
| WO | WO 00/60435 | 10/2000 |
| WO | WO 00/60435 A3 | 10/2000 |
| WO | WO 02/073603 A1 | 9/2002 |
| WO | WO 2006/129967 A1 | 12/2006 |
| WO | WO 2008/085742 A2 | 7/2008 |
| WO | WO 2008/109835 A2 | 9/2008 |
| WO | WO 2011/088053 A2 | 7/2011 |

OTHER PUBLICATIONS

Ambite, JL., et al., "Design and Implementation of the CALO Query Manager," Copyright © 2006, American Association for Artificial Intelligence, (www.aaai.org), 8 pages.

Annbite, JL., et al., "Integration of Heterogeneous Knowledge Sources in the CALO Query Manager," 2005, The 4th International Conference on Ontologies, DataBases, and Applications of Semantics (ODBASE), Agia Napa, Cyprus, ttp://www.isi.edu/people/ambite/publications/integration_heterogeneous_knowledge_sources_calo_query_manager, 18 pages.

Belvin, R. et al., "Development of the HRL Route Navigation Dialogue System," 2001, In Proceedings of the First International Conference on Human Language Technology Research, Paper, Copyright © 2001 HRL Laboratories, LLC, http://citeseerx.ist.psu.edu/viewdoc/summary?doi=10.1.1.10.6538, 5 pages.

Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.

Bussler, C., et al., "Web Service Execution Environment (WSMX)," Jun. 3, 2005, W3C Member Submission, http://www.w3.org/Submission/WSMX, 29 pages.

Butcher, M., "EVI arrives in town to go toe-to-toe with Siri," Jan. 23, 2012, http://techcrunch.com/2012/01/23/evi-arrives-in-town-to-go-toe-to-toe-with-siri/, 2 pages.

Chen, Y., "Multimedia Siri Finds and Plays Whatever You Ask for," Feb. 9, 2012, http://www.psfk.com/2012/02/multimedia-siri.html, 9 pages.

Cheyer, A., "About Adam Cheyer," Sep. 17, 2012, http://www.adam.cheyer.com/about.html, 2 pages.

Cheyer, A., "A Perspective on Al & Agent Technologies for SCM," VerticalNet, 2001 presentation, 22 pages.

Cheyer, A. et al., "Spoken Language and Multimodal Applications for Electronic Realties," © Springer-Verlag London Ltd, Virtual Reality 1999, 3:1-15, 15 pages.

Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.

Domingue, J., et al., "Web Service Modeling Ontology (WSMO)—An Ontology for Semantic Web Services," Jun. 9-10, 2005, position paper at the W3C Workshop on Frameworks for Semantics in Web Services, Innsbruck, Austria, 6 pages.

Elio, R. et al., "On Abstract Task Models and Conversation Policies," http://webdocs.cs.ualberta.ca/~ree/publications/papers2/ATS.AA99.pdf, May 1999, 10 pages.

Ericsson, S. et al., "Software illustrating a unified approach to multimodality and multilinguality in the in-home domain," Dec. 22, 2006, Talk and Look: Tools for Ambient Linguistic Knowledge, http://www.talk-project.eurice.eu/fileadmin/talk/publications_public/deliverables_public/D1_6.pdf, 127 pages.

Evi, "Meet Evi: the one mobile app that provides solutions for your everyday problems," Feb. 8, 2012, http://www.evi.com/, 3 pages.

Feigenbaum, E., et al., "Computer-assisted Semantic Annotation of Scientific Life Works," 2007, http://tomgruber.org/writing/stanford-cs300.pdf, 22 pages.

Gannes, L., "Alfred App Gives Personalized Restaurant Recommendations," allthingsd.com, Jul. 18, 2011, http://allthingsd.com/20110718/alfred-app-gives-personalized-restaurant-recommendations/, 3 pages.

Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.

Gervasio, M. T., et al., Active Preference Learning for Personalized Calendar Scheduling Assistancae, Copyright © 2005, http://www.ai.sri.com/~gervasio/pubs/gervasio-iui05.pdf, 8 pages.

Glass, A., "Explaining Preference Learning," 2006, http://cs229.stanford.edu/proj2006/Glass-ExplainingPreferenceLearning.pdf, 5 pages.

(56) References Cited

OTHER PUBLICATIONS

Glass, J., et al., "Multilingual Spoken-Language Understanding in the MIT Voyager System," Aug. 1995, http://groups.csail.mit.edu/sls/publications/1995/speechcomm95-voyager.pdf, 29 pages.

Goddeau, D., et al., "A Form-Based Dialogue Manager for Spoken Language Applications," Oct. 1996, http://phasedance.com/pdf/icslp96.pdf, 4 pages.

Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.

Gruber, T. R., et al., "An Ontology for Engineering Mathematics," In Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.

Gruber, T. R., "A Translation Approach to Portable Ontology Specifications," Knowledge Systems Laboratory, Stanford University, Sep. 1992, Technical Report KSL 92-71, Revised Apr. 1993, 27 pages.

Gruber, T. R., "Automated Knowledge Acquisition for Strategic Knowledge," Knowledge Systems Laboratory, Machine Learning, 4, 293-336 (1989), 44 pages.

Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.

Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.

Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.

Gruber, T. R., "Collective Knowledge Systems: Where the Social Web meets the Semantic Web," Web Semantics: Science, Services and Agents on the World Wide Web (2007), doi:10.1016/j.websem. 2007.11.011, keynote presentation given at the 5th International Semantic Web Conference, Nov. 7, 2006, 19 pages.

Gruber, T. R., "Where the Social Web meets the Semantic Web," Presentation at the 5th International Semantic Web Conference, Nov. 7, 2006, 38 pages.

Gruber, T. R., "Despite our Best Efforts, Ontologies are not the Problem," AAAI Spring Symposium, Mar. 2008, http://tomgruber.org/writing/aaai-ss08.htm, 40 pages.

Gruber, T. R., "Enterprise Collaboration Management with Intraspect," Intraspect Software, Inc., Instraspect Technical White Paper Jul. 2001, 24 pages.

Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.

Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.

Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm, 30 pages.

Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.

Gruber, T. R., Interactive Acquisition of Justifications: Learning "Why" by Being Told "What" Knowledge Systems Laboratory, Stanford University, Oct. 1990, Technical Report KSL 91-17, Revised Feb. 1991, 24 pages.

Gruber, T. R., "It Is What It Does: The Pragmatics of Ontology for Knowledge Sharing," (c) 2000, 2003, http://www.cidoc-crm.org/docs/symposium_presentations/gruber_cidoc-ontology-2003.pdf, 21 pages.

Gruber, T. R., et al., "Machine-generated Explanations of Engineering Models: A Compositional Modeling Approach," (1993) In Proc. International Joint Conference on Artificial Intelligence, http://citeseerx.ist.psu.edu/viewdoc/summary?doi=10.1.1.34.930, 7 pages.

Gruber, T. R., "2021: Mass Collaboration and the Really New Economy," TNTY Futures, the newsletter of the Next Twenty Years series, vol. 1, Issue 6, Aug. 2001, http://www.tnty.com/newsletter/futures/archive/v01-05business.html, 5 pages.

Gruber, T. R., et al.,"NIKE: A National Infrastructure for Knowledge Exchange," Oct. 1994, http://www.eit.com/papers/nike/nike.html and nike.ps, 10 pages.

Gruber, T. R., "Ontologies, Web 2.0 and Beyond," Apr. 24, 2007, Ontology Summit 2007, http://tomgruber.org/writing/ontolog-social-web-keynote.pdf, 17 pages.

Gruber, T. R., "Ontology of Folksonomy: A Mash-up of Apples and Oranges," Originally published to the web in 2005, Int'l Journal on Semantic Web & Information Systems, 3(2), 2007, 7 pages.

Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.

Gruber, T. R., "TagOntology," Presentation to Tag Camp, www.tagcamp.org, Oct. 29, 2005, 20 pages.

Gruber, T. R., et al., "Toward a Knowledge Medium for Collaborative Product Development," In Artificial Intelligence in Design 1992, from Proceedings of the Second International Conference on Artificial Intelligence in Design, Pittsburgh, USA, Jun. 22-25, 1992, 19 pages.

Gruber, T. R., "Toward Principles for the Design of Ontologies Used for Knowledge Sharing," In International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.

Guzzoni, D., et al., "Active, A Platform for Building Intelligent Operating Rooms," Surgetica 2007 Computer-Aided Medical Interventions: tools and applications, pp. 191-198, Paris, 2007, Sauramps Médical, http://lsro.epfl.ch/page-68384-en.html, 8 pages.

Guzzoni, D., et al., "Active, A Tool for Building Intelligent User Interfaces," ASC 2007, Palma de Mallorca, http://lsro.epfl.ch/page-34241.html, 6 pages.

Guzzoni, D., et al., "A Unified Platform for Building Intelligent Web Interaction Assistants," Proceedings of the 2006 IEEE/WIC/ACM International Conference on Web Intelligence and Intelligent Agent Technology, Computer Society, 4 pages.

Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.

Hardawar, D., "Driving app Waze builds its own Siri for hands-free voice control," Feb. 9, 2012, http://venturebeat.com/2012/02/09/driving-app-waze-builds-its-own-siri-for-hands-free-voice-control/, 4 pages.

Intraspect Software, "The Intraspect Knowledge Management Solution: Technical Overview," http://tomgruber.org/writing/intraspect-whitepaper-1998.pdf, 18 pages.

Julia, L., et al., Un éditeur interactif de tableaux dessinés à main levée (An Interactive Editor for Hand-Sketched Tables), Traitement du Signal 1995, vol. 12, No. 6, 8 pages. No English Translation Available.

Karp, P. D., "A Generic Knowledge-Base Access Protocol," May 12, 1994, http://lecture.cs.buu.ac.th/~f50353/Document/gfp.pdf, 66 pages.

(56) References Cited

OTHER PUBLICATIONS

Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.
Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.
Lieberman, H., et al., "Out of context: Computer systems that adapt to, and learn from, context," 2000, IBM Systems Journal, vol. 39, Nos. 3/4, 2000, 16 pages.
Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.
Martin, D., et al., "The Open Agent Architecture: A Framework for building distributed software systems," Jan.-Mar. 1999, Applied Artificial Intelligence: An International Journal, vol. 13, No. 1-2, http://adam.cheyer.com/papers/oaa.pdf, 38 pages.
McGuire, J., et al., "SHADE: Technology for Knowledge-Based Collaborative Engineering," 1993, Journal of Concurrent Engineering: Applications and Research (CERA), 18 pages.
Meng, H., et al., "Wheels: A Conversational System in the Automobile Classified Domain," Oct. 1996, httphttp://citeseerx.ist.psu.edu/viewdoc/summary?doi=10.1.1.16.3022, 4 pages.
Milward, D., et al., "D2.2: Dynamic Multimodal Interface Reconfiguration," Talk and Look: Tools for Ambient Linguistic Knowledge, Aug. 8, 2006, http://www.ihmc.us/users/nblaylock/Pubs/Files/talk_d2.2.pdf, 69 pages.
Mitra, P., et al., "A Graph-Oriented Model for Articulation of Ontology Interdependencies," 2000, http://ilpubs.stanford.edu:8090/442/1/2000-20.pdf, 15 pages.
Moran, D. B., et al., "Multimodal User Interfaces in the Open Agent Architecture," Proc. of the 1997 International Conference on Intelligent User Interfaces (IUI97), 8 pages.
Mozer, M., "An Intelligent Environment Must be Adaptive," Mar./Apr. 1999, IEEE Intelligent Systems, 3 pages.
Mühlhäuser, M., "Context Aware Voice User Interfaces for Workflow Support," Darmstadt 2007, http://tuprints.ulb.tu-darmstadt.de/876/1/PhD.pdf, 254 pages.
Naone, E., "TR10: Intelligent Software Assistant," Mar.-Apr. 2009, Technology Review, http://www.technologyreview.com/printer_friendly_article.aspx?id=22117, 2 pages.
Neches, R., "Enabling Technology for Knowledge Sharing," Fall 1991, AI Magazine, pp. 37-56, (21 pages).
Nöth, E., et al., "Verbmobil: The Use of Prosody in the Linguistic Components of a Speech Understanding System," IEEE Transactions on Speech and Audio Processing, vol. 8, No. 5, Sep. 2000, 14 pages.
*Phoenix Solutions, Inc.* v. *West Interactive Corp.*, Document 40, Declaration of Christopher Schmandt Regarding the MIT Galaxy System dated Jul. 2, 2010, 162 pages.
Rice, J., et al., "Monthly Program: Nov. 14, 1995," The San Francisco Bay Area Chapter of ACM SIGCHI, http://www.baychi.org/calendar/19951114/, 2 pages.
Rice, J., et al., "Using the Web Instead of a Window System," Knowledge Systems Laboratory, Stanford University, (http://tomgruber.org/writing/ksl-95-69.pdf, Sep. 1995.) CHI '96 Proceedings: Conference on Human Factors in Computing Systems, Apr. 13-18, 1996, Vancouver, BC, Canada, 14 pages.
Rivlin, Z., et al., "Maestro: Conductor of Multimedia Analysis Technologies," 1999 SRI International, Communications of the Association for Computing Machinery (CACM), 7 pages.
Roddy, D., et al., "Communication and Collaboration in a Landscape of B2B eMarketplaces," VerticalNet Solutions, white paper, Jun. 15, 2000, 23 pages.
Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16...rep . . . , 4 pages.

Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.
Simonite, T., "One Easy Way to Make Siri Smarter," Oct. 18, 2011, Technology Review, http:// www.technologyreview.com/printer_friendly_article.aspx?id=38915, 2 pages.
Stent, A., et al., "The CommandTalk Spoken Dialogue System," 1999, http://acl.Idc.upenn.edu/P/P99/P99-1024.pdf, 8 pages.
Tofel, K., et al., "SpeakTolt: A personal assistant for older iPhones, iPads," Feb. 9, 2012, http://gigaom.com/apple/speaktoit-siri-for-older-iphones-ipads/, 7 pages.
Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.
Tur, G., et al., "The CALO Meeting Speech Recognition and Understanding System," 2008, Proc. IEEE Spoken Language Technology Workshop, 4 pages.
Tur, G., et al., "The-CALO-Meeting-Assistant System," IEEE Transactions on Audio, Speech, and Language Processing, vol. 18, No. 6, Aug. 2010, 11 pages.
Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.
Vlingo, "Vlingo Launches Voice Enablement Application on Apple App Store," Vlingo press release dated Dec. 3, 2008, 2 pages.
YouTube, "Knowledge Navigator," 5:34 minute video uploaded to YouTube by Knownav on Apr. 29, 2008, http://www.youtube.com/watch?v=QRH8eimU_20, 1 page.
YouTube,"Send Text, Listen to and Send E-Mail 'By Voice' www.voiceassist.com," 2:11 minute video uploaded to YouTube by VoiceAssist on Jul. 30, 2009, http://www.youtube.com/watch?v=0tEU61nHHA4, 1 page.
YouTube,"Text'nDrive App Demo—Listen and Reply to your Messages by Voice while Driving!," 1:57 minute video uploaded to YouTube by TextnDrive on Apr. 27, 2010, http://www.youtube.com/watch?v=WaGfzoHsAMw, 1 page.
YouTube, "Voice on the Go (BlackBerry)," 2:51 minute video uploaded to YouTube by VoiceOnTheGo on Jul. 27, 2009, http://www.youtube.com/watch?v=pJqpWgQS98w, 1 page.
Zue, V., "Conversational Interfaces: Advances and Challenges," Sep. 1997, http://www.cs.cmu.edu/~dod/papers/zue97.pdf, 10 pages.
Zue, V. W., "Toward Systems that Understand Spoken Language," Feb. 1994, ARPA Strategic Computing Institute, © 1994 IEEE, 9 pages.
International Search Report and Written Opinion dated Nov. 29, 2011, received in International Application No. PCT/US2011/20861, which corresponds to U.S. Appl. No. 12/987,982, 15 pages (Thomas Robert Gruber).
Agnäs, MS., et al., "Spoken Language Translator: First-Year Report," Jan. 1994, SICS (ISSN 0283-3638), SRI and Telia Research AB, 161 pages.
Allen, J., "Natural Language Understanding," 2nd Edition, Copyright © 1995 by The Benjamin/Cummings Publishing Company, Inc., 671 pages.
Alshawi, H., et al., "CLARE: A Contextual Reasoning and Cooperative Response Framework for the Core Language Engine," Dec. 1992, SRI International, Cambridge Computer Science Research Centre, Cambridge, 273 pages.
Alshawi, H., et al., "Declarative Derivation of Database Queries from Meaning Representations," Oct. 1991, Proceedings of the BANKAI Workshop on Intelligent Information Access, 12 pages.
Alshawi H., et al., "Logical Forms in the Core Language Engine," 1989, Proceedings of the 27th Annual Meeting of the Association for Computational Linguistics, 8 pages.
Alshawi, H., et al., "Overview of the Core Language Engine," Sep. 1988, Proceedings of Future Generation Computing Systems, Tokyo, 13 pages.
Alshawi, H., "Translation and Monotonic Interpretation/Generation," Jul. 1992, SRI International, Cambridge Computer Science Research Centre, Cambridge, 18 pages, http://www.cam.sri.com/tr/crc024/paper.ps.Z 1992.

(56) References Cited

OTHER PUBLICATIONS

Appelt, D., et al., "Fastus: A Finite-state Processor for Information Extraction from Real-world Text," 1993, Proceedings of IJCAI, 8 pages.
Appelt, D., et al., "SRI: Description of the JV-FASTUS System Used for MUC-5," 1993, SRI International, Artificial Intelligence Center, 19 pages.
Appelt, D., et al., SRI International Fastus System MUC-6 Test Results and Analysis, 1995, SRI International, Menlo Park, California, 12 pages.
Archbold, A., et al., "A Team User's Guide," Dec. 21, 1981, SRI International, 70 pages.
Bear, J., et al., "A System for Labeling Self-Repairs in Speech," Feb. 22, 1993, SRI International, 9 pages.
Bear, J., et al., "Detection and Correction of Repairs in Human-Computer Dialog," May 5, 1992, SRI International, 11 pages.
Bear, J., et al., "Integrating Multiple Knowledge Sources for Detection and Correction of Repairs in Human-Computer Dialog," 1992, Proceedings of the 30th annual meeting on Association for Computational Linguistics (ACL), 8 pages.
Bear, J., et al., "Using Information Extraction to Improve Document Retrieval," 1998, SRI International, Menlo Park, California, 11 pages.
Berry, P., et al., "Task Management under Change and Uncertainty Constraint Solving Experience with the CALO Project," 2005, Proceedings of CP'05 Workshop on Constraint Solving under Change, 5 pages.
Bobrow, R. et al., "Knowledge Representation for Syntactic/Semantic Processing," From: AAA-80 Proceedings. Copyright © 1980, AAAI, 8 pages.
Bouchou, B., et al., "Using Transducers in Natural Language Database Query," Jun. 17-19, 1999, Proceedings of 4th International Conference on Applications of Natural Language to Information Systems, Austria, 17 pages.
Bratt, H., et al., "The SRI Telephone-based ATIS System," 1995, Proceedings of ARPA Workshop on Spoken Language Technology, 3 pages.
Bulyko, I. et al., "Error-Correction Detection and Response Generation in a Spoken Dialogue System," © 2004 Elsevier B.V., specom. 2004.09.009, 18 pages.
Burke, R., et al., "Question Answering from Frequently Asked Question Files," 1997, AI Magazine, vol. 18, No. 2, 10 pages.
Burns, A., et al., "Development of a Web-Based Intelligent Agent for the Fashion Selection and Purchasing Process via Electronic Commerce," Dec. 31, 1998, Proceedings of the Americas Conference on Information system (AMCIS), 4 pages.
Carter, D., "Lexical Acquisition in the Core Language Engine," 1989, Proceedings of the Fourth Conference of the European Chapter of the Association for Computational Linguistics, 8 pages.
Carter, D., et al., "The Speech-Language Interface in the Spoken Language Translator," Nov. 23, 1994, SRI International, 9 pages.
Chai, J., et al., "Comparative Evaluation of a Natural Language Dialog Based System and a Menu Driven System for Information Access: a Case Study," Apr. 2000, Proceedings of the International Conference on Multimedia Information Retrieval (RIAO), Paris, 11 pages.
Cheyer, A., et al., "Multimodal Maps: An Agent-based Approach," International Conference on Cooperative Multimodal Communication, 1995, 15 pages.
Cheyer, A., et al., "The Open Agent Architecture," Autonomous Agents and Multi-Agent systems, vol. 4, Mar. 1, 2001, 6 pages.
Cheyer, A., et al., "The Open Agent Architecture: Building communities of distributed software agents" Feb. 21, 1998, Artificial Intelligence Center SRI International, Power Point presentation, downloaded from http://www.ai.sri.com/~oaa/, 25 pages.
Codd, E. F., "Databases: Improving Usability and Responsiveness—'How About Recently'," Copyright © 1978, by Academic Press, Inc., 28 pages.
Cohen, P.R., et al., "An Open Agent Architecture," 1994, 8 pages. http://citeseerx.ist.psu.edu/viewdoc/summary?doi=10.1.1.30.480.

Coles, L. S., et al., "Chemistry Question-Answering," Jun. 1969, SRI International, 15 pages.
Coles, L. S., "Techniques for Information Retrieval Using an Inferential Question-Answering System with Natural-Language Input," Nov. 1972, SRI International, 198 Pages.
Coles, L. S., "The Application of Theorem Proving to Information Retrieval," Jan. 1971, SRI International, 21 pages.
Constantinides, P., et al., "A Schema Based Approach to Dialog Control," 1998, Proceedings of the International Conference on Spoken Language Processing, 4 pages.
Cox, R. V., et al., "Speech and Language Processing for Next-Millennium Communications Services," Proceedings of the IEEE, vol. 88, No. 8, Aug. 2000, 24 pages.
Craig, J., et al., "Deacon: Direct English Access and Control," Nov. 7-10, 1966 AFIPS Conference Proceedings, vol. 19, San Francisco, 18 pages.
Dar, S., et al., "DTL's DataSpot: Database Exploration Using Plain Language," 1998 Proceedings of the 24th VLDB Conference, New York, 5 pages.
Davis, Z., et al., "A Personal Handheld Multi-Modal Shopping Assistant," 2006 IEEE, 9 pages.
Decker, K., et al., "Designing Behaviors for Information Agents," The Robotics Institute, Carnegie-Mellon University, paper, Jul. 6, 1996, 15 pages.
Decker, K., et al., "Matchmaking and Brokering," The Robotics Institute, Carnegie-Mellon University, paper, May 16, 1996, 19 pages.
Dowding, J., et al., "Gemini: A Natural Language System for Spoken-Language Understanding," 1993, Proceedings of the Thirty-First Annual Meeting of the Association for Computational Linguistics, 8 pages.
Dowding, J., et al., "Interleaving Syntax and Semantics in an Efficient Bottom-Up Parser," 1994, Proceedings of the 32nd Annual Meeting of the Association for Computational Linguistics, 7 pages.
Epstein, M., et al., "Natural Language Access to a Melanoma Data Base," Sep. 1978, SRI International, 7 pages.
Exhibit 1, "Natural Language Interface Using Constrained Intermediate Dictionary of Results," Classes/Subclasses Manually Reviewed for the Search of U.S. Pat. No. 7,177,798, Mar. 22, 2013, 1 page.
Exhibit 1, "Natural Language Interface Using Constrained Intermediate Dictionary of Results," List of Publications Manually reviewed for the Search of U.S. Pat. No. 7,177,798, Mar. 22, 2013, 1 page.
Ferguson, G., et al., "TRIPS: An Integrated Intelligent Problem-Solving Assistant," 1998, Proceedings of the Fifteenth National Conference on Artificial Intelligence (AAAI-98) and Tenth Conference on Innovative Applications of Artificial Intelligence (IAAI-98), 7 pages.
Fikes, R., et al., "A Network-based knowledge Representation and its Natural Deduction System," Jul. 1977, SRI International, 43 pages.
Gambäck, B., et al., "The Swedish Core Language Engine," 1992 NOTEX Conference, 17 pages.
Glass, J., et al., "Multilingual Language Generation Across Multiple Domains," Sep. 18-22, 1994, International Conference on Spoken Language Processing, Japan, 5 pages.
Green, C. "The Application of Theorem Proving to Question-Answering Systems," Jun. 1969, SRI Stanford Research Institute, Artificial Intelligence Group, 169 pages.
Gregg, D. G., "DSS Access on the WWW: An Intelligent Agent Prototype," 1998 Proceedings of the Americas Conference on Information Systems—Association for Information Systems, 3 pages.
Grishman, R., "Computational Linguistics: An Introduction," © Cambridge University Press 1986, 172 pages.
Grosz, B. et al., "Dialogic: A Core Natural-Language Processing System," Nov. 9, 1982, SRI International, 17 pages.
Grosz, B. et al., "Research on Natural-Language Processing at SRI," Nov. 1981, SRI International, 21 pages.
Grosz, B., et al., "TEAM: An Experiment in the Design of Transportable Natural-Language Interfaces," Artificial Intelligence, vol. 32, 1987, 71 pages.
Grosz, B., "Team: A Transportable Natural-Language Interface System," 1983, Proceedings of the First Conference on Applied Natural Language Processing, 7 pages.

(56) References Cited

OTHER PUBLICATIONS

Guida, G., et al., "NLI: A Robust Interface for Natural Language Person-Machine Communication," Int. J. Man-Machine Studies, vol. 17, 1982, 17 pages.

Guzzoni, D., et al., "Active, A platform for Building Intelligent Software," Computational Intelligence 2006, 5 pages. http://www.informatik.uni-trier.de/~ley/pers/hd/g/Guzzoni:Didier.

Guzzoni, D., "Active: A unified platform for building intelligent assistant applications," Oct. 25, 2007, 262 pages.

Guzzoni, D., et al., "Many Robots Make Short Work," 1996 AAAI Robot Contest, SRI International, 9 pages.

Haas, N., et al., "An Approach to Acquiring and Applying Knowledge," Nov. 1980, SRI International, 22 pages.

Hadidi, R., et al., "Students' Acceptance of Web-Based Course Offerings: An Empirical Assessment," 1998 Proceedings of the Americas Conference on Information Systems (AMCIS), 4 pages.

Hawkins, J., et al., "Hierarchical Temporal Memory: Concepts, Theory, and Terminology," Mar. 27, 2007, Numenta, Inc., 20 pages.

He, Q., et al., "Personal Security Agent: KQML-Based PKI," The Robotics Institute, Carnegie-Mellon University, paper, Oct. 1, 1997, 14 pages.

Hendrix, G. et al., "Developing a Natural Language Interface to Complex Data," ACM Transactions on Database Systems, vol. 3, No. 2, Jun. 1978, 43 pages.

Hendrix, G., "Human Engineering for Applied Natural Language Processing," Feb. 1977, SRI International, 27 pages.

Hendrix, G., "Klaus: A System for Managing Information and Computational Resources," Oct. 1980, SRI International, 34 pages.

Hendrix, G., "Lifer: A Natural Language Interface Facility," Dec. 1976, SRI Stanford Research Institute, Artificial Intelligence Center, 9 pages.

Hendrix, G., "Natural-Language Interface," Apr.-Jun. 1982, American Journal of Computational Linguistics, vol. 8, No. 2, 7 pages.

Hendrix, G., "The Lifer Manual: A Guide to Building Practical Natural Language Interfaces," Feb. 1977, SRI International, 76 pages.

Hendrix, G., et al., "Transportable Natural-Language Interfaces to Databases," Apr. 30, 1981, SRI International, 18 pages.

Hirschman, L., et al., "Multi-Site Data Collection and Evaluation in Spoken Language Understanding," 1993, Proceedings of the workshop on Human Language Technology, 6 pages.

Hobbs, J., et al., "Fastus: A System for Extracting Information from Natural-Language Text," Nov. 19, 1992, SRI International, Artificial Intelligence Center, 26 pages.

Hobbs, J., et al.,"Fastus: Extracting Information from Natural-Language Texts," 1992, SRI International, Artificial Intelligence Center, 22 pages.

Hobbs, J., "Sublanguage and Knowledge," Jun. 1984, SRI International, Artificial Intelligence Center, 30 pages.

Hodjat, B., et al., "Iterative Statistical Language Model Generation for Use with an Agent-Oriented Natural Language Interface," vol. 4 of the Proceedings of HCI International 2003, 7 pages.

Huang, X., et al., "The SPHINX-II Speech Recognition System: An Overview," Jan. 15, 1992, Computer, Speech and Language, 14 pages.

Issar, S., et al., "CMU's Robust Spoken Language Understanding System," 1993, Proceedings of EUROSPEECH, 4 pages.

Issar, S., "Estimation of Language Models for New Spoken Language Applications," Oct. 3-6, 1996, Proceedings of 4th International Conference on Spoken language Processing, Philadelphia, 4 pages.

Janas, J., "The Semantics-Based Natural Language Interface to Relational Databases," © Springer-Verlag Berlin Heidelberg 1986, Germany, 48 pages.

Johnson, J., "A Data Management Strategy for Transportable Natural Language Interfaces," Jun. 1989, doctoral thesis submitted to the Department of Computer Science, University of British Columbia, Canada, 285 pages.

Julia, L., et al., "http://www.speech.sri.com/demos/atis.html," 1997, Proceedings of AAAI, Spring Symposium, 5 pages.

Kahn, M., et al., "CoABS Grid Scalability Experiments," 2003, Autonomous Agents and Multi-Agent Systems, vol. 7, 8 pages.

Kamel, M., et al., "A Graph Based Knowledge Retrieval System," © 1990 IEEE, 7 pages.

Katz, B., "Annotating the World Wide Web Using Natural Language," 1997, Proceedings of the 5th RIAO Conference on Computer Assisted Information Searching on the Internet, 7 pages.

Katz, B., "A Three-Step Procedure for Language Generation," Dec. 1980, Massachusetts Institute of Technology, Artificial Intelligence Laboratory, 42 pages.

Kats, B., et al., "Exploiting Lexical Regularities in Designing Natural Language Systems," 1988, Proceedings of the 12th International Conference on Computational Linguistics, Coling'88, Budapest, Hungary, 22 pages.

Katz, B., et al., "REXTOR: A System for Generating Relations from Natural Language," In Proceedings of the ACL Oct. 2000 Workshop on Natural Language Processing and Information Retrieval (NLP&IR), 11 pages.

Katz, B., "Using English for Indexing and Retrieving," 1988 Proceedings of the 1st RIAO Conference on User-Oriented Content-Based Text and Image (RIAO'88), 19 pages.

Konolige, K., "A Framework for a Portable Natural-Language Interface to Large Data Bases," Oct. 12, 1979, SRI International, Artificial Intelligence Center, 54 pages.

Laird, J., et al., "SOAR: An Architecture for General Intelligence," 1987, Artificial Intelligence vol. 33, 64 pages.

Langly, P., et al.,"A Design for the Icarus Architechture," SIGART Bulletin, vol. 2, No. 4, 6 pages.

Larks, "Intelligent Software Agents: Larks," 2006, downloaded on Mar. 15, 2013 from http://www.cs.cmu.edu/larks.html, 2 pages.

Martin, D., et al., "Building Distributed Software Systems with the Open Agent Architecture," Mar. 23-25, 1998, Proceedings of the Third International Conference on the Practical Application of Intelligent Agents and Multi-Agent Technology, 23 pages.

Martin, D., et al., "Development Tools for the Open Agent Architecture," Apr. 1996, Proceedings of the International Conference on the Practical Application of Intelligent Agents and Multi-Agent Technology, 17 pages.

Martin, D., et al., "Information Brokering in an Agent Architecture," Apr. 1997, Proceedings of the second International Conference on the Practical Application of Intelligent Agents and Multi-Agent Technology, 20 pages.

Martin, D., et al., "PAAM '98 Tutorial: Building and Using Practical Agent Applications," 1998, SRI International, 78 pages.

Martin, P., et al., "Transportability and Generality in a Natural-Language Interface System," Aug. 8-12, 1983, Proceedings of the Eight International Joint Conference on Artificial Intelligence, West Germany, 21 pages.

Matiasek, J., et al., "Tamic-P: A System for NL Access to Social Insurance Database," Jun. 17-19, 1999, Proceeding of the 4th International Conference on Applications of Natural Language to Information Systems, Austria, 7 pages.

Michos, S.E., et al., "Towards an adaptive natural language interface to command languages," Natural Language Engineering 2 (3), © 1994 Cambridge University Press, 19 pages.

Milstead, J., et al., "Metadata: Cataloging by Any Other Name . . . " Jan. 1999, Online, Copyright © 1999 Information Today, Inc., 18 pages.

Minker, W., et al., "Hidden Understanding Models for Machine Translation," 1999, Proceedings of ETRW on Interactive Dialogue in Multi-Modal Systems, 4 pages.

Modi, P. J., et al., "CMRadar: A Personal Assistant Agent for Calendar Management," © 2004, American Association for Artificial Intelligence, Intelligent Systems Demonstrations, 2 pages.

Moore, R., et al., "Combining Linguistic and Statistical Knowledge Sources in Natural-Language Processing for ATIS," 1995, SRI International, Artificial Intelligence Center, 4 pages.

Moore, R., "Handling Complex Queries in a Distributed Data Base," Oct. 8, 1979, SRI International, Artificial Intelligence Center, 38 pages.

Moore, R., "Practical Natural-Language Processing by Computer," Oct. 1981, SRI International, Artificial Intelligence Center, 34 pages.

(56) References Cited

OTHER PUBLICATIONS

Moore, R., et al., "SRI's Experience with the ATIS Evaluation," Jun. 24-27, 1990, Proceedings of a workshop held at Hidden Valley, Pennsylvania, 4 pages.
Moore, et al., "The Information Warefare Advisor: An Architecture for Interacting with Intelligent Agents Across the Web," Dec. 31, 1998 Proceedings of Americas Conference on Information Systems (AMCIS), 4 pages.
Moore, R., "The Role of Logic in Knowledge Representation and Commonsense Reasoning," Jun. 1982, SRI International, Artificial Intelligence Center, 19 pages.
Moore, R., "Using Natural-Language Knowledge Sources in Speech Recognition," Jan. 1999, SRI International, Artificial Intelligence Center, 24 pages.
Moran, D., et al., "Intelligent Agent-based User Interfaces," Oct. 12-13, 1995, Proceedings of International Workshop on Human Interface Technology, University of Aizu, Japan, 4 pages. http://www.dougmoran.com/dmoran/PAPERS/oaa-iwhit1995.pdf.
Moran, D., "Quantifier Scoping in the SRI Core Language Engine," 1988, Proceedings of the 26th annual meeting on Association for Computational Linguistics, 8 pages.
Motro, A., "Flex: A Tolerant and Cooperative User Interface to Databases," IEEE Transactions on Knowledge and Data Engineering, vol. 2, No. 2, Jun. 1990, 16 pages.
Murveit, H., et al., "Speech Recognition in SRI's Resource Management and ATIS Systems," 1991, Proceedings of the workshop on Speech and Natural Language (HTL'91), 7 pages.
OAA, "The Open Agent Architecture 1.0 Distribution Source Code," Copyright 1999, SRI International, 2 pages.
Odubiyi, J., et al., "SAIRE—a scalable agent-based information retrieval engine," 1997 Proceedings of the First International Conference on Autonomous Agents, 12 pages.
Owei, V., et al., "Natural Language Query Filtration in the Conceptual Query Language," © 1997 IEEE, 11 pages.
Pannu, A., et al., "A Learning Personal Agent for Text Filtering and Notification," 1996, The Robotics Institute School of Computer Science, Carnegie-Mellon University, 12 pages.
Pereira, "Logic for Natural Language Analysis," Jan. 1983, SRI International, Artificial Intelligence Center, 194 pages.
Perrault, C.R., et al., "Natural-Language Interfaces," Aug. 22, 1986, SRI International, 48 pages.
Pulman, S.G., et al., "Clare: A Combined Language and Reasoning Engine," 1993, Proceedings of JFIT Conference, 8 pages. URL: http://www.cam.sri.com/tr/crc042/paper.ps.Z.
Ravishankar, "Efficient Algorithms for Speech Recognition," May 15, 1996, Doctoral Thesis submitted to School of Computer Science, Computer Science Division, Carnegie Mellon University, Pittsburg, 146 pages.
Rayner, M., "Abductive Equivalential Translation and its application to Natural Language Database Interfacing," Sep. 1993 Dissertation paper, SRI International, 163 pages.
Rayner, M., et al., "Adapting the Core Language Engine to French and Spanish," May 10, 1996, Cornell University Library, 9 pages. http://arxiv.org/abs/cmp-lg/9605015.
Rayner, M., et al., "Deriving Database Queries from Logical Forms by Abductive Definition Expansion," 1992, Proceedings of the Third Conference on Applied Natural Language Processing, ANLC'92, 8 pages.
Rayner, M., "Linguistic Domain Theories: Natural-Language Database Interfacing from First Principles," 1993, SRI International, Cambridge, 11 pages.
Rayner, M., et al., "Spoken Language Translation With Mid-90's Technology: A Case Study," 1993, EUROSPEECH, ISCA, 4 pages. http://dblp.uni-trier.de/db/conf/interspeech/eurospeech1993. html#RaynerBCCDGKKLPPS93.
Rudnicky, A.I., et al., "Creating Natural Dialogs in the Carnegie Mellon Communicator System".
Russell, S., et al., "Artificial Intelligence, A Modern Approach," © 1995 Prentice Hall, Inc., 121 pages.

Sacerdoti, E., et al., "A Ladder User's Guide (Revised)," Mar. 1980, SRI International, Artificial Intelligence Center, 39 pages.
Sagalowicz, D., "A D-Ladder User's Guide," Sep. 1980, SRI International, 42 pages.
Sameshima, Y., et al., "Authorization with security attributes and privilege delegation Access control beyond the ACL," Computer Communications, vol. 20, 1997, 9 pages.
San-Segundo, R., et al., "Confidence Measures for Dialogue Management in the CU Communicator System," Jun. 5-9, 2000, Proceedings of Acoustics, Speech, and Signal Processing (ICASSP'00), 4 pages.
Sato, H., "A Data Model, Knowledge Base, and Natural Language Processing for Sharing a Large Statistical Database," 1989, Statistical and Scientific Database Management, Lecture Notes in Computer Science, vol. 339, 20 pages.
Schnelle, D., "Context Aware Voice User Interfaces for Workflow Support," Aug. 27, 2007, Dissertation paper, 254 pages.
Sharoff, S., et al., "Register-domain Separation as a Methodology for Development of Natural Language Interfaces to Databases," 1999, Proceedings of Human-Computer Interaction (INTERACT'99), 7 pages.
Shimazu, H., et al., "CAPIT: Natural Language Interface Design Tool with Keyword Analyzer and Case-Based Parser," NEC Research & Development, vol. 33, No. 4, Oct. 1992, 11 pages.
Shinkle, L., "Team User's Guide," Nov. 1984, SRI International, Artificial Intelligence Center, 78 pages.
Shklar, L., et al., "Info Harness: Use of Automatically Generated Metadata for Search and Retrieval of Heterogeneous Information," 1995 Proceedings of CAiSE'95, Finland.
Singh, N., "Unifying Heterogeneous Information Models," 1998 Communications of the ACM, 13 pages.
SRI2009, "SRI Speech: Products: Software Development Kits: EduSpeak," 2009, 2 pages, available at http://web.archive.org/web/20090828084033/http://www.speechatsri.com/products/eduspeak.shtml.
Starr, B., et al., "Knowledge-Intensive Query Processing," May 31, 1998, Proceedings of the 5th KRDB Workshop, Seattle, 6 pages.
Stern, R., et al. "Multiple Approaches to Robust Speech Recognition," 1992, Proceedings of Speech and Natural Language Workshop, 6 pages.
Stickel, "A Nonclausal Connection-Graph Resolution Theorem-Proving Program," 1982, Proceedings of AAAI'82, 5 pages.
Sugumaran, V., "A Distributed Intelligent Agent-Based Spatial Decision Support System," Dec. 31, 1998, Proceedings of the Americas Conference on Information systems (AMCIS), 4 pages.
Sycara, K., et al., "Coordination of Multiple Intelligent Software Agents," International Journal of Cooperative Information Systems (IJCIS), vol. 5, Nos. 2 & 3, Jun. & Sep. 1996, 33 pages.
Sycara, K., et al., "Distributed Intelligent Agents," IEEE Expert, vol. 11, No. 6, Dec. 1996, 32 pages.
Sycara, K., et al., "Dynamic Service Matchmaking Among Agents in Open Information Environments," 1999, SIGMOD Record, 7 pages.
Sycara, K., et al., "The RETSINA MAS Infrastructure," 2003, Autonomous Agents and Multi-Agent Systems, vol. 7, 20 pages.
Tyson, M., et al., "Domain-Independent Task Specification in the TACITUS Natural Language System," May 1990, SRI International, Artificial Intelligence Center, 16 pages.
Wahlster, W., et al., "Smartkom: multimodal communication with a life-like character," 2001 EUROSPEECH—Scandinavia, 7th European Conference on Speech Communication and Technology, 5 pages.
Waldinger, R., et al., "Deductive Question Answering from Multiple Resources," 2003, New Directions in Question Answering, published by AAAI, Menlo Park, 22 pages.
Walker, D., et al., "Natural Language Access to Medical Text," Mar. 1981, SRI International, Artificial Intelligence Center, 23 pages.
Waltz, D., "An English Language Question Answering System for a Large Relational Database," © 1978 ACM, vol. 21, No. 7, 14 pages.
Ward, W., et al., "A Class Based Language Model for Speech Recognition," © 1996 IEEE, 3 pages.
Ward, W., et al., "Recent Improvements in the CMU Spoken Language Understanding System," 1994, ARPA Human Language Technology Workshop, 4 pages.

(56) References Cited

OTHER PUBLICATIONS

Ward, W., "The CMU Air Travel Information Service: Understanding Spontaneous Speech," 3 pages.
Warren, D.H.D., et al., "An Efficient Easily Adaptable System for Interpreting Natural Language Queries," Jul.-Dec. 1982, American Journal of Computational Linguistics, vol. 8, No. 3-4, 11 pages.
Weizenbaum, J., "ELIZA—A Computer Program for the Study of Natural Language Communication Between Man and Machine," Communications of the ACM, vol. 9, No. 1, Jan. 1966, 10 pages.
Winiwarter, W., "Adaptive Natural Language Interfaces to FAQ Knowledge Bases," Jun. 17-19, 1999, Proceedings of 4th International Conference on Applications of Natural Language to Information Systems, Austria, 22 pages.
Wu, X. et al., "KDA: A Knowledge-based Database Assistant," Data Engineering, Feb. 6-10, 1989, Proceeding of the Fifth International Conference on Engineering (IEEE Cat. No. 89CH2695-5), 8 pages.
Yang, J., et al., "Smart Sight: A Tourist Assistant System," 1999 Proceedings of Third International Symposium on Wearable Computers, 6 pages.
Zeng, D., et al., "Cooperative Intelligent Software Agents," The Robotics Institute, Carnegie-Mellon University, Mar. 1995, 13 pages.
Zhao, L., "Intelligent Agents for Flexible Workflow Systems," Oct. 31, 1998 Proceedings of the Americas Conference on Information Systems (AMCIS), 4 pages.
Zue, V., et al., "From Interface to Content: Translingual Access and Delivery of On-Line Information," 1997, EUROSPEECH, 4 pages.
Zue, V., et al., "Jupiter: A Telephone-Based Conversational Interface for Weather Information," Jan. 2000, IEEE Transactions on Speech and Audio Processing, 13 pages.
Zue, V., et al., "Pegasus: A Spoken Dialogue Interface for On-Line Air Travel Planning," 1994 Elsevier, Speech Communication 15 (1994), 10 pages.
Zue, V., et al., "The Voyager Speech Understanding System: Preliminary Development and Evaluation," 1990, Proceedings of IEEE 1990 International Conference on Acoustics, Speech, and Signal Processing, 4 pages.
Acero, A., et al., "Environmental Robustness in Automatic Speech Recognition," International Conference on Acoustics, Speech, and Signal Processing (ICASSP'90), Apr. 3-6, 1990, 4 pages.
Acero, A., et al., "Robust Speech Recognition by Normalization of the Acoustic Space," International Conference on Acoustics, Speech, and Signal Processing, 1991, 4 pages.
Ahlbom, G., et al., "Modeling Spectral Speech Transitions Using Temporal Decomposition Techniques," IEEE International Conference of Acoustics, Speech, and Signal Processing (ICASSP'87), Apr. 1987, vol. 12, 4 pages.
Aikawa, K., "Speech Recognition Using Time-Warping Neural Networks," Proceedings of the 1991 IEEE Workshop on Neural Networks for Signal Processing, Sep. 30 to Oct. 1, 1991, 10 pages.
Anastasakos, A., et al., "Duration Modeling in Large Vocabulary Speech Recognition," International Conference on Acoustics, Speech, and Signal Processing (ICASSP'95), May 9-12, 1995, 4 pages.
Anderson, R. H., "Syntax-Directed Recognition of Hand-Printed Two-Dimensional Mathematics," In Proceedings of Symposium on Interactive Systems for Experimental Applied Mathematics: Proceedings of the Association for Computing Machinery Inc. Symposium, © 1967, 12 pages.
Ansari, R., et al., "Pitch Modification of Speech using a Low-Sensitivity Inverse Filter Approach," IEEE Signal Processing Letters, vol. 5, No. 3, Mar. 1998, 3 pages.
Anthony, N. J., et al., "Supervised Adaption for Signature Verification System," Jun. 1, 1978, IBM Technical Disclosure, 3 pages.
Apple Computer, "Guide Maker User's Guide," © Apple Computer, Inc., Apr. 27, 1994, 8 pages.
Apple Computer, "Introduction to Apple Guide," © Apple Computer, Inc., Apr. 28, 1994, 20 pages.
Asanović, K., et al., "Experimental Determination of Precision Requirements for Back-Propagation Training of Artificial Neural Networks," In Proceedings of the 2nd International Conference of Microelectronics for Neural Networks, 1991, www.ICSI.Berkeley.EDU, 7 pages.
Atal, B. S., "Efficient Coding of LPC Parameters by Temporal Decomposition," IEEE International Conference on Acoustics, Speech, and Signal Processing (ICASSP'83), Apr. 1983, 4 pages.
Bahl, L. R., et al., "Acoustic Markov Models Used in the Tangora Speech Recognition System," In Proceeding of International Conference on Acoustics, Speech, and Signal Processing (ICASSP'88), Apr. 11-14, 1988, vol. 1, 4 pages.
Bahl, L. R., et al., "A Maximum Likelihood Approach to Continuous Speech Recognition," IEEE Transaction on Pattern Analysis and Machine Intelligence, vol. PAMI-5, No. 2, Mar. 1983, 13 pages.
Bahl, L. R., et al., "A Tree-Based Statistical Language Model for Natural Language Speech Recognition," IEEE Transactions on Acoustics, Speech and Signal Processing, vol. 37, Issue 7, Jul. 1989, 8 pages.
Bahl, L. R., et al., "Large Vocabulary Natural Language Continuous Speech Recognition," In Proceedings of 1989 International Conference on Acoustics, Speech, and Signal Processing, May 23-26, 1989, vol. 1, 6 pages.
Bahl, L. R., et al, "Multonic Markov Word Models for Large Vocabulary Continuous Speech Recognition," IEEE Transactions on Speech and Audio Processing, vol. 1, No. 3, Jul. 1993, 11 pages.
Bahl, L. R., et al., "Speech Recognition with Continuous-Parameter Hidden Markov Models," In Proceeding of International Conference on Acoustics, Speech, and Signal Processing (ICASSP'88), Apr. 11-14, 1988, vol. 1, 8 pages.
Banbrook, M., "Nonlinear Analysis of Speech from a Synthesis Perspective," A thesis submitted for the degree of Doctor of Philosophy, The University of Edinburgh, Oct. 15, 1996, 35 pages.
Belaid, A., et al., "A Syntactic Approach for Handwritten Mathematical Formula Recognition," IEEE Transactions on Pattern Analysis and Machine Intelligence, vol. PAMI-6, No. 1, Jan. 1984, 7 pages.
Bellegarda, E. J., et al., "On-Line Handwriting Recognition Using Statistical Mixtures," Advances in Handwriting and Drawings: A Multidisciplinary Approach, Europia, 6th International IGS Conference on Handwriting and Drawing, Paris—France, Jul. 1993, 11 pages.
Bellegarda, J. R., "A Latent Semantic Analysis Framework for Large-Span Language Modeling," 5th European Conference on Speech, Communication and Technology, (EUROSPEECH'97), Sep. 22-25, 1997, 4 pages.
Bellegarda, J. R., "A Multispan Language Modeling Framework for Large Vocabulary Speech Recognition," IEEE Transactions on Speech and Audio Processing, vol. 6, No. 5, Sep. 1998, 12 pages.
Bellegarda, J. R., et al., "A Novel Word Clustering Algorithm Based on Latent Semantic Analysis," In Proceedings of the IEEE International Conference on Acoustics, Speech, and Signal Processing (ICASSP'96), vol. 1, 4 pages.
Bellegarda, J. R., et al., "Experiments Using Data Augmentation for Speaker Adaptation," International Conference on Acoustics, Speech, and Signal Processing (ICASSP'95), May 9-12, 1995, 4 pages.
Bellegarda, J. R., "Exploiting Both Local and Global Constraints for Multi-Span Statistical Language Modeling," Proceeding of the 1998 IEEE International Conference on Acoustics, Speech, and Signal Processing (ICASSP'98), vol. 2, May 12-15, 1998, 5 pages.
Bellegarda, J. R., "Exploiting Latent Semantic Information in Statistical Language Modeling," In Proceedings of the IEEE, Aug. 2000, vol. 88, No. 8, 18 pages.
Bellegarda, J. R., "Interaction-Driven Speech Input—A Data-Driven Approach to the Capture of Both Local and Global Language Constraints," 1992, 7 pages, available at http://old.sigchi.org/bulletin/1998.2/bellegarda.html.
Bellegarda, J. R., "Large Vocabulary Speech Recognition with Multispan Statistical Language Models," IEEE Transactions on Speech and Audio Processing, vol. 8, No. 1, Jan. 2000, 9 pages.
Bellegarda, J. R., et al., "Performance of the IBM Large Vocabulary Continuous Speech Recognition System on the ARPA Wall Street Journal Task," Signal Processing VII: Theories and Applications, © 1994 European Association for Signal Processing, 4 pages.

(56) References Cited

OTHER PUBLICATIONS

Bellegarda, J. R., et al., "The Metamorphic Algorithm: A Speaker Mapping Approach to Data Augmentation," IEEE Transactions on Speech and Audio Processing, vol. 2, No. 3, Jul. 1994, 8 pages.

Black, A. W., et al., "Automatically Clustering Similar Units for Unit Selection in Speech Synthesis," In Proceedings of Eurospeech 1997, vol. 2, 4 pages.

Blair, D. C., et al., "An Evaluation of Retrieval Effectiveness for a Full-Text Document-Retrieval System," Communications of the ACM, vol. 28, No. 3, Mar. 1985, 11 pages.

Briner, L. L., "Identifying Keywords in Text Data Processing," In Zelkowitz, Marvin V., ED, Directions and Challenges,15th Annual Technical Symposium, Jun. 17, 1976, Gaithersbury, Maryland, 7 pages.

Bulyko, I., et al., "Joint Prosody Prediction and Unit Selection for Concatenative Speech Synthesis," Electrical Engineering Department, University of Washington, Seattle, 2001, 4 pages.

Bussey, H. E., et al., "Service Architecture, Prototype Description, and Network Implications of a Personalized Information Grazing Service," INFOCOM'90, Ninth Annual Joint Conference of the IEEE Computer and Communication Societies, Jun. 3-7, 1990, http://slrohall.com/publications/, 8 pages.

Buzo, A., et al., "Speech Coding Based Upon Vector Quantization," IEEE Transactions on Acoustics, Speech, and Signal Processing, vol. Assp-28, No. 5, Oct. 1980, 13 pages.

Caminero-Gil, J., et al., "Data-Driven Discourse Modeling for Semantic Interpretation," In Proceedings of the IEEE International Conference on Acoustics, Speech, and Signal Processing, May 7-10, 1996, 6 pages.

Cawley, G. C., "The Application of Neural Networks to Phonetic Modelling," PhD Thesis, University of Essex, Mar. 1996, 13 pages.

Chang, S., et al., "A Segment-based Speech Recognition System for Isolated Mandarin Syllables," Proceedings TENCON '93, IEEE Region 10 conference on Computer, Communication, Control and Power Engineering, Oct. 19-21, 1993, vol. 3, 6 pages.

Conklin, J., "Hypertext: An Introduction and Survey," Computer Magazine, Sep. 1987, 25 pages.

Connolly, F. T., et al., "Fast Algorithms for Complex Matrix Multiplication Using Surrogates," IEEE Transactions on Acoustics, Speech, and Signal Processing, Jun. 1989, vol. 37, No. 6, 13 pages.

Deerwester, S., et al., "Indexing by Latent Semantic Analysis," Journal of the American Society for Information Science, vol. 41, No. 6, Sep. 1990, 19 pages.

Deller, Jr., J. R., et al., "Discrete-Time Processing of Speech Signals," © 1987 Prentice Hall, ISBN: 0-02-328301-7, 14 pages.

Digital Equipment Corporation, "Open VMS Software Overview," Dec. 1995, software manual, 159 pages.

Donovan, R. E., "A New Distance Measure for Costing Spectral Discontinuities in Concatenative Speech Synthesisers," 2001, http://citeseerx.ist.psu.edu/viewdoc/summary?doi=10.1.1.21.6398, 4 pages.

Frisse, M. E., "Searching for Information in a Hypertext Medical Handbook," Communications of the ACM, vol. 31, No. 7, Jul. 1988, 8 pages.

Goldberg, D., et al., "Using Collaborative Filtering to Weave an Information Tapestry," Communications of the ACM, vol. 35, No. 12, Dec. 1992, 10 pages.

Gorin, A. L., et al., "On Adaptive Acquisition of Language," International Conference on Acoustics, Speech, and Signal Processing (ICASSP'90), vol. 1, Apr. 3-6, 1990, 5 pages.

Gotoh, Y., et al., "Document Space Models Using Latent Semantic Analysis," In Proceedings of Eurospeech, 1997, 4 pages.

Gray, R. M., "Vector Quantization," IEEE ASSP Magazine, Apr. 1984, 26 pages.

Harris, F. J., "On the Use of Windows for Harmonic Analysis with the Discrete Fourier Transform," In Proceedings of the IEEE, vol. 66, No. 1, Jan. 1978, 34 pages.

Helm, R., et al., "Building Visual Language Parsers," In Proceedings of CHI'91 Proceedings of the SIGCHI Conference on Human Factors in Computing Systems, 8 pages.

Hermansky, H., "Perceptual Linear Predictive (PLP) Analysis of Speech," Journal of the Acoustical Society of America, vol. 87, No. 4, Apr. 1990, 15 pages.

Hermansky, H., "Recognition of Speech in Additive and Convolutional Noise Based on Rasta Spectral Processing," In proceedings of IEEE International Conference on Acoustics, speech, and Signal Processing (ICASSP'93), Apr. 27-30, 1993, 4 pages.

Hoehfeld M., et al., "Learning with Limited Numerical Precision Using the Cascade-Correlation Algorithm," IEEE Transactions on Neural Networks, vol. 3, No. 4, Jul. 1992, 18 pages.

Holmes, J. N., "Speech Synthesis and Recognition—Stochastic Models for Word Recognition," Speech Synthesis and Recognition, Published by Chapman & Hall, London, ISBN 0 412 53430 4, © 1998 J. N. Holmes, 7 pages.

Hon, H.W., et al., "CMU Robust Vocabulary-Independent Speech Recognition System," IEEE International Conference on Acoustics, Speech, and Signal Processing (ICASSP-91), Apr. 14-17, 1991, 4 pages.

IBM Technical Disclosure Bulletin, "Speech Editor," vol. 29, No. 10, Mar. 10, 1987, 3 pages.

IBM Technical Disclosure Bulletin, "Integrated Audio-Graphics User Interface," vol. 33, No. 11, Apr. 1991, 4 pages.

IBM Technical Disclosure Bulletin, "Speech Recognition with Hidden Markov Models of Speech Waveforms," vol. 34, No. 1, Jun. 1991, 10 pages.

Iowegian International, "FIR Filter Properties," dspGuro, Digital Signal Processing Central, http://www.dspguru.com/dsp/taqs/fir/properties, downloaded on Jul. 28, 2010, 6 pages.

Jacobs, P. S., et al., "Scisor: Extracting Information from On-Line News," Communications of the ACM, vol. 33, No. 11, Nov. 1990, 10 pages.

Jelinek, F., "Self-Organized Language Modeling for Speech Recognition," Readings in Speech Recognition, edited by Alex Waibel and Kai-Fu Lee, May 15, 1990, © 1990 Morgan Kaufmann Publishers, Inc., ISBN: 1-55860-124-4, 63 pages.

Jennings, A., et al., "A Personal News Service Based on a User Model Neural Network," IEICE Transactions on Information and Systems, vol. E75-D, No. 2, Mar. 1992, Tokyo, JP, 12 pages.

Ji, T., et al., "A Method for Chinese Syllables Recognition based upon Sub-syllable Hidden Markov Model," 1994 International Symposium on Speech, Image Processing and Neural Networks, Apr. 13-16, 1994, Hong Kong, 4 pages.

Jones, J., "Speech Recognition for Cyclone," Apple Computer, Inc., E.R.S., Revision 2.9, Sep. 10, 1992, 93 pages.

Katz, S. M., "Estimation of Probabilities from Sparse Data for the Language Model Component of a Speech Recognizer," IEEE Transactions on Acoustics, Speech, and Signal Processing, vol. ASSP-35, No. 3, Mar. 1987, 3 pages.

Kitano, H., "PhiDM-Dialog, An Experimental Speech-to-Speech Dialog Translation System," Jun. 1991 Computer, vol. 24, No. 6, 13 pages.

Klabbers, E., et al., "Reducing Audible Spectral Discontinuities," IEEE Transactions on Speech and Audio Processing, vol. 9, No. 1, Jan. 2001, 13 pages.

Klatt, D. H., "Linguistic Uses of Segmental Duration in English: Acoustic and Perpetual Evidence," Journal of the Acoustical Society of America, vol. 59, No. 5, May 1976, 16 pages.

Kominek, J., et al., "Impact of Durational Outlier Removal from Unit Selection Catalogs," 5th ISCA Speech Synthesis Workshop, Jun. 14-16, 2004, 6 pages.

Kubala, F., et al., "Speaker Adaptation from a Speaker-Independent Training Corpus," International Conference on Acoustics, Speech, and Signal Processing (ICASSP'90), Apr. 3-6, 1990, 4 pages.

Kubala, F., et al., "The Hub and Spoke Paradigm for CSR Evaluation," Proceedings of the Spoken Language Technology Workshop, Mar. 6-8, 1994, 9 pages.

Lee, K.F., "Large-Vocabulary Speaker-Independent Continuous Speech Recognition: The SPHINX System," Apr. 18, 1988, Partial fulfillment of the requirements for the degree of Doctor of Philosophy, Computer Science Department, Carnegie Mellon University, 195 pages.

Lee, L., et al., "A Real-Time Mandarin Dictation Machine for Chinese Language with Unlimited Texts and Very Large Vocabulary,"

(56) References Cited

OTHER PUBLICATIONS

International Conference on Acoustics, Speech and Signal Processing, vol. 1, Apr. 3-6, 1990, 5 pages.
Lee, L, et al., "Golden Mandarin(II)—An Improved Single-Chip Real-Time Mandarin Dictation Machine for Chinese Language with Very Large Vocabulary," 0-7803-0946-4/93 © 1993IEEE, 4 pages.
Lee, L, et al., "Golden Mandarin(II)—An Intelligent Mandarin Dictation Machine for Chinese Character Input with Adaptation/Learning Functions," International Symposium on Speech, Image Processing and Neural Networks, Apr. 13-16, 1994, Hong Kong, 5 pages.
Lee, L., et al., "System Description of Golden Mandarin (I) Voice Input for Unlimited Chinese Characters," International Conference on Computer Processing of Chinese & Oriental Languages, vol. 5, Nos. 3 & 4, Nov. 1991, 16 pages.
Lin, C.H., et al., "A New Framework for Recognition of Mandarin Syllables With Tones Using Sub-syllabic Unites," IEEE International Conference on Acoustics, Speech, and Signal Processing (ICASSP-93), Apr. 27-30, 1993, 4 pages.
Linde, Y., et al., "An Algorithm for Vector Quantizer Design," IEEE Transactions on Communications, vol. 28, No. 1, Jan. 1980, 12 pages.
Liu, F.H., et al., "Efficient Joint Compensation of Speech for the Effects of Additive Noise and Linear Filtering," IEEE International Conference of Acoustics, Speech, and Signal Processing, ICASSP-92, Mar. 23-26, 1992, 4 pages.
Logan, B., "Mel Frequency Cepstral Coefficients for Music Modeling," In International Symposium on Music Information Retrieval, 2000, 2 pages.
Lowerre, B. T., "The-HARPY Speech Recognition System," Doctoral Dissertation, Department of Computer Science, Carnegie Mellon University, Apr. 1976, 20 pages.
Maghbouleh, A., "An Empirical Comparison of Automatic Decision Tree and Linear Regression Models for Vowel Durations," Revised version of a paper presented at the Computational Phonology in Speech Technology workshop, 1996 annual meeting of the Association for Computational Linguistics in Santa Cruz, California, 7 pages.
Markel, J. D., et al., "Linear Prediction of Speech," Springer-Verlag, Berlin Heidelberg New York 1976, 12 pages.
Morgan, B., "Business Objects," (Business Objects for Windows) Business Objects Inc., DBMS Sep. 1992, vol. 5, No. 10, 3 pages.
Mountford, S. J., et al., "Talking and Listening to Computers," The Art of Human-Computer Interface Design, Copyright © 1990 Apple Computer, Inc. Addison-Wesley Publishing Company, Inc., 17 pages.
Murty, K. S. R., et al., "Combining Evidence from Residual Phase and MFCC Features for Speaker Recognition," IEEE Signal Processing Letters, vol. 13, No. 1, Jan. 2006, 4 pages.
Murveit H. et al., "Integrating Natural Language Constraints into HMM-based Speech Recognition," 1990 International Conference on Acoustics, Speech, and Signal Processing, Apr. 3-6, 1990, 5 pages.
Nakagawa, S., et al., "Speaker Recognition by Combining MFCC and Phase Information," IEEE International Conference on Acoustics Speech and Signal Processing (ICASSP), Mar. 14-19, 2010, 4 pages.
Niesler, T. R., et al., "A Variable-Length Category-Based N-Gram Language Model," IEEE International Conference on Acoustics, Speech, and Signal Processing (ICASSP'96), vol. 1, May 7-10, 1996, 6 pages.
Papadimitriou, C. H., et al., "Latent Semantic Indexing: A Probabilistic Analysis," Nov. 14, 1997, http://citeseerx.ist.psu.edu/messages/downloadsexceeded.html, 21 pages.
Parsons, T. W., "Voice and Speech Processing," Linguistics and Technical Fundamentals, Articulatory Phonetics and Phonemics, © 1987 McGraw-Hill, Inc., ISBN: 0-07-0485541-0, 5 pages.
Parsons, T. W., "Voice and Speech Processing," Pitch and Formant Estimation, © 1987 McGraw-Hill, Inc., ISBN: 0-07-0485541-0, 15 pages.
Picone, J., "Continuous Speech Recognition Using Hidden Markov Models," IEEE ASSP Magazine, vol. 7, No. 3, Jul. 1990, 16 pages.
Rabiner, L. R., et al., "Fundamental of Speech Recognition," © 1993 AT&T, Published by Prentice-Hall, Inc., ISBN: 0-13-285826-6, 17 pages.

Rabiner, L. R., et al., "Note on the Properties of a Vector Quantizer for LPC Coefficients," The Bell System Technical Journal, vol. 62, No. 8, Oct. 1983, 9 pages.
Ratcliffe, M., "ClearAccess 2.0 allows SQL searches off-line," (Structured Query Language), ClearAcess Corp., MacWeek Nov. 16, 1992, vol. 6, No. 41, 2 pages.
Remde, J. R., et al., "SuperBook: An Automatic Tool for Information Exploration—Hypertext?," In Proceedings of Hypertext'87 papers, Nov. 13-15, 1987, 14 pages.
Reynolds, C. F., "On-Line Reviews: A New Application of the HICOM Conferencing System," IEE Colloquium on Human Factors in Electronic Mail and Conferencing Systems, Feb. 3, 1989, 4 pages.
Rigoll, G., "Speaker Adaptation for Large Vocabulary Speech Recognition Systems Using Speaker Markov Models," International Conference on Acoustics, Speech, and Signal Processing (ICASSP'89), May 23-26, 1989, 4 pages.
Riley, M. D., "Tree-Based Modelling of Segmental Durations," Talking Machines Theories, Models, and Designs, 1992 © Elsevier Science Publishers B.V., North-Holland, ISBN: 08-444-89115.3, 15 pages.
Rivoira, S., et al., "Syntax and Semantics in a Word-Sequence Recognition System," IEEE International Conference on Acoustics, Speech, and Signal Processing (ICASSP'79), Apr. 1979, 5 pages.
Rosenfeld, R., "A Maximum Entropy Approach to Adaptive Statistical Language Modelling," Computer Speech and Language, vol. 10, No. 3, Jul. 1996, 25 pages.
Roszkiewicz, A., "Extending your Apple," Back Talk—Lip Service, A+ Magazine, The Independent Guide for Apple Computing, vol. 2, No. 2, Feb. 1984, 5 pages.
Sakoe, H., et al., "Dynamic Programming Algorithm Optimization for Spoken Word Recognition," IEEE Transactins on Acoustics, Speech, and Signal Processing, Feb. 1978, vol. ASSP-26 No. 1, 8 pages.
Salton, G., et al., "On the Application of Syntactic Methodologies in Automatic Text Analysis," Information Processing and Management, vol. 26, No. 1, Great Britain 1990, 22 pages.
Savoy, J., "Searching Information in Hypertext Systems Using Multiple Sources of Evidence," International Journal of Man-Machine Studies, vol. 38, No. 6, Jun. 1993, 15 pages.
Scagliola, C., "Language Models and Search Algorithms for Real-Time Speech Recognition," International Journal of Man-Machine Studies, vol. 22, No. 5, 1985, 25 pages.
Schmandt, C., et al., "Augmenting a Window System with Speech Input," IEEE Computer Society, Computer Aug. 1990, vol. 23, No. 8, 8 pages.
Schütze, H., "Dimensions of Meaning," Proceedings of Supercomputing'92 Conference, Nov. 16-20, 1992, 10 pages.
Sheth B., et al., "Evolving Agents for Personalized Information Filtering," In Proceedings of the Ninth Conference on Artificial Intelligence for Applications, Mar. 1-5, 1993, 9 pages.
Shikano, K., et al., "Speaker Adaptation Through Vector Quantization," IEEE International Conference on Acoustics, Speech, and Signal Processing (ICASSP'86), vol. 11, Apr. 1986, 4 pages.
Sigurdsson, S., et al., "Mel Frequency Cepstral Coefficients: An Evaluation of Robustness of MP3 Encoded Music," In Proceedings of the 7th International Conference on Music Information Retrieval (ISMIR), 2006, 4 pages.
Silverman, K. E. A., et al., "Using a Sigmoid Transformation for Improved Modeling of Phoneme Duration," Proceedings of the IEEE International Conference on Acoustics, Speech, and Signal Processing, Mar. 15-19, 1999, 5 pages.
Tenenbaum, A.M., et al., "Data Structure Using Pascal," 1981 Prentice-Hall, Inc., 34 pages.
Tsai, W.H., et al., "Attributed Grammar—A Tool for Combining Syntactic and Statistical Approaches to Pattern Recognition," IEEE Transactions on Systems, Man, and Cybernetics, vol. SMC-10, No. 12, Dec. 1980, 13 pages.
Udell, J., "Computer Telephony," Byte, vol. 19, No. 7, Jul. 1, 1994, 9 pages.
van Santen, J. P. H., "Contextual Effects on Vowel Duration," Journal Speech Communication, vol. 11, No. 6, Dec. 1992, 34 pages.

(56) References Cited

OTHER PUBLICATIONS

Vepa, J., et al., "New Objective Distance Measures for Spectral Discontinuities in Concatenative Speech Synthesis," In Proceedings of the IEEE 2002 Workshop on Speech Synthesis, 4 pages.
Verschelde, J., "MATLAB Lecture 8. Special Matrices in MATLAB," Nov. 23, 2005, UIC Dept. of Math., Stat.. & C.S., MCS 320, Introduction to Symbolic Computation, 4 pages.
Vingron, M. "Near-Optimal Sequence Alignment," Deutsches Krebsforschungszentrum (DKFZ), Abteilung Theoretische Bioinformatik, Heidelberg, Germany, Jun. 1996, 20 pages.
Werner, S., et al., "Prosodic Aspects of Speech," Université de Lausanne, Switzerland, 1994, Fundamentals of Speech Synthesis and Speech Recognition: Basic Concepts, State of the Art, and Future Challenges, 18 pages.
Wikipedia, "Mel Scale," Wikipedia, the free encyclopedia, last modified page date: Oct. 13, 2009, http://en.wikipedia.org/wiki/Mel_scale, 2 pages.
Wikipedia, "Minimum Phase," Wikipedia, the free encyclopedia, last modified page date: Jan. 12, 2010, http://en.wikipedia.org/wiki/Minimum_phase, 8 pages.
Wolff, M., "Poststructuralism and the ARTFUL Database: Some Theoretical Considerations," Information Technology and Libraries, vol. 13, No. 1, Mar. 1994, 10 pages.
Wu, M., "Digital Speech Processing and Coding," ENEE408G Capstone—Multimedia Signal Processing, Spring 2003, Lecture-2 course presentation, University of Maryland, College Park, 8 pages.
Wu, M., "Speech Recognition, Synthesis, and H.C.I.," ENEE408G Capstone—Multimedia Signal Processing, Spring 2003, Lecture—3 course presentation, University of Maryland, College Park, 11 pages.
Wyle, M. F., "A Wide Area Network Information Filter," In Proceedings of First International Conference on Artificial Intelligence on Wall Street, Oct. 9-11, 1991, 6 pages.
Yankelovich, N., et al., "Intermedia: The Concept and the Construction of a Seamless Information Environment," Computer Magazine, Jan. 1988, © 1988 IEEE, 16 pages.
Yoon, K., et al., "Letter-to-Sound Rules for Korean," Department of Linguistics, The Ohio State University, 2002, 4 pages.
Zhao, Y., "An Acoustic-Phonetic-Based Speaker Adaptation Technique for Improving Speaker-Independent Continuous Speech Recognition," IEEE Transactions on Speech and Audio Processing, vol. 2, No. 3, Jul. 1994, 15 pages.
Zovato, E., et al., "Towards Emotional Speech Synthesis: A Rule Based Approach," 5th ISCA Speech Synthesis Workshop—Pittsburgh, Jun. 14-16, 2004, 2 pages.
International Search Report dated Nov. 9, 1994, received in International Application No. PCT/US1993/12666, which corresponds to U.S. Appl. No. 07/999,302, 8 pages (Robert Don Strong).
International Preliminary Examination Report dated Mar. 1, 1995, received in International Application No. PCT/US1993/12666, which corresponds to U.S. Appl. No. 07/999,302, 5 pages (Robert Don Strong).
International Preliminary Examination Report dated Apr. 10, 1995, received in International Application No. PCT/US1993/12637, which corresponds to U.S. Appl. No. 07/999,354, 7 pages (Alejandro Acero).
International Search Report dated Feb. 8, 1995, received in International Application No. PCT/US1994/11011, which corresponds to U.S. Appl. No. 08/129,679, 7 pages (Yen-Lu Chow).
International Preliminary Examination Report dated Feb. 28, 1996, received in International Application No. PCT/US1994/11011, which corresponds to U.S. Appl. No. 08/129,679, 4 pages (Yen-Lu Chow).
Written Opinion dated Aug. 21, 1995, received in International Application No. PCT/US1994/11011, which corresponds to U.S. Appl. No. 08/129,679, 4 pages (Yen-Lu Chow).
International Search Report dated Nov. 8, 1995, received in International Application No. PCT/US1995/08369, which corresponds to U.S. Appl. No. 08/271,639, 6 pages (Peter V. De Souza).
International Preliminary Examination Report dated Oct. 9, 1996, received in International Application No. PCT/US1995/08369, which corresponds to U.S. Appl. No. 08/271,639, 4 pages (Peter V. De Souza).

\* cited by examiner

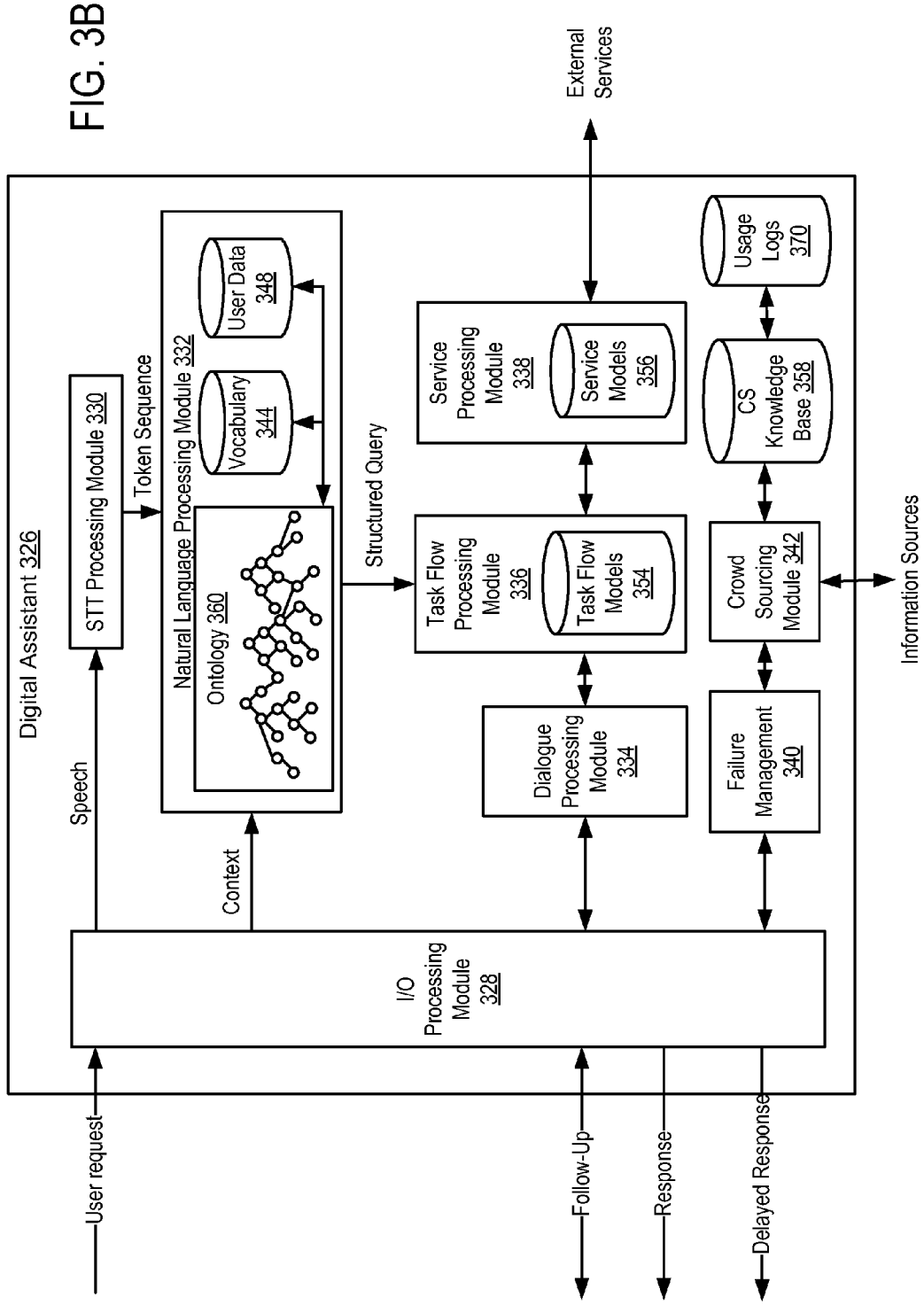

CROWD SOURCING INFORMATION TO FULFILL USER REQUESTS

RELATED APPLICATIONS

This application claims priority of U.S. Provisional Application Ser. No. 61/646,831, filed May 14, 2012, which is incorporated herein by reference in its entirety.

TECHNICAL FIELD

The disclosed embodiments relate generally to digital assistants, and more specifically, digital assistants that provide crowd-sourced responses to users' speech-based requests.

BACKGROUND

Just like human personal assistants, digital assistants or virtual assistants can perform requested tasks and provide requested advice, information, or services. An assistant's ability to fulfill a user's request is dependent on the assistant's correct comprehension of the request or instructions. Recent advances in natural language processing have enabled users to interact with digital assistants using natural language, in spoken or textual forms, rather than employing a conventional user interface (e.g., menus or programmed commands). Such digital assistants can interpret the user's input to infer the user's intent; translate the inferred intent into actionable tasks and parameters; execute operations or deploy services to perform the tasks; and produce output that is intelligible to the user. Ideally, the output produced by a digital assistant should fulfill the user's intent expressed during the natural language interaction between the user and the digital assistant.

The ability of a digital assistant system to produce satisfactory responses to user requests depends on the natural language processing, knowledge base, and artificial intelligence implemented by the system. At any time, a digital assistant may be limited by its particular implementation, however sophisticated that implementation may be, and fail to produce a satisfactory response to a user's request. A well-designed response procedure in such a situation can improve a user's experience in interacting with the system and prevent the user's loss of confidence in the system's service.

SUMMARY

The embodiments disclosed herein provide methods, systems, computer readable storage medium and user interfaces for a digital assistant to crowd source assistance or information from one or more external information sources (so-called "crowd sourcing information sources" or "CS information sources"), and generate a response to a user request based on the crowd sourced information or assistance. These external information sources, for example, include expert information services, general information sources, and forums where answers to questions are provided in structured, semistructured, and unstructured forms by members of the public. In addition, crowd sourced information and answers can be stored, e.g., in a crowd-sourced knowledge base, in a manner that facilitates searching based on natural language queries or structured queries derived from subsequent user requests.

Accordingly, some embodiments provide a method for providing a response to a user request, the method including, at a computer system including one or more processors and memory storing one or more programs: receiving a user request from a mobile client device, the user request including at least a speech input and seeks an informational answer or performance of a task; detecting a failure to provide a satisfactory response to the user request; in response to detecting the failure, crowd-sourcing information relevant to the user request by querying one or more crowd sourcing information sources; receiving one or more answers from the crowd sourcing information sources; and generating a response to the user request based on at least one of the one or more answers received from the one or more crowd sourcing information sources.

In some embodiments, crowd-sourcing the information relevant to the user request further includes: generating one or more queries based on the user request; and sending the one or more queries to the one or more crowd sourcing information sources.

In some embodiments, at least one of the queries includes an audio recording of the speech input.

In some embodiments, the crowd-sourcing further comprises identifying, from a set of crowd sourcing information sources, the one or more crowd sourcing information sources to be queried.

In some embodiments, detecting the failure to provide a satisfactory response to the user request further includes determining that a web-search based on information contained in the user request is unsatisfactory to the user.

In some embodiments, detecting the failure to provide a satisfactory response to the user request comprises receiving feedback from the user that a previous response provided to the user for the user request was unsatisfactory.

In some embodiments, detecting the failure to provide a satisfactory response to the user request comprises analyzing logs of the usage of the digital assistant.

In some embodiments, the method further includes: prior to the crowd-sourcing: requesting permission from the user to send the information contained in the user request to the one or more crowd sourcing information sources; and receiving permission from the user to send the information contained in the user request to the one or more crowd sourcing information sources.

In some embodiments, the method further includes: sending a list of the one or more crowd sourcing information sources to the mobile client device.

In some embodiments, the one or more crowd sourcing information sources represented in the list are separately selectable by the user.

In some embodiments, the information contained in the user request is sent to a real-time answer-lookup database.

In some embodiments, the information contained in the user request is sent to one or more non-real-time expert services.

In some embodiments, the method further includes: receiving at least one real-time answer from a real-time answer-lookup database; upon receipt of the at least one real-time answer, sending to the mobile client device the at least one real-time answer; receiving at least one non-real-time answer from a non-real-time expert service after receiving the at least one real-time answer; and upon receipt of the at least one non-real-time answer, sending to the mobile client device the at least one non-real-time answer.

In some embodiments, the at least one real-time answer and the at least one non-real-time answer are presented to the user at different times.

In some embodiments, the method further includes: not receiving any answer from at least one of the one or more crowd sourcing information sources before generating the remedial response.

In some embodiments, the method further includes: when more than one answer is received from the one or more crowd sourcing information sources, ranking the answers in accordance with predetermined criteria.

In some embodiments, the method further includes: selecting a subset of answers from the one or more answers in accordance with the ranking.

In some embodiments, the method further includes: providing the response in speech form to the user.

In some embodiments, receiving the one or more answers from the crowd sourcing information sources further includes: receiving at least one of the one or more answers from individual members of the public in non-real-time.

BRIEF DESCRIPTION OF THE DRAWINGS

FIG. 3B is a block diagram illustrating functions of the digital assistant shown in FIG. 3A in accordance with some embodiments.

Like reference numerals refer to corresponding parts throughout the drawings.

DESCRIPTION OF EMBODIMENTS

Figure 1:
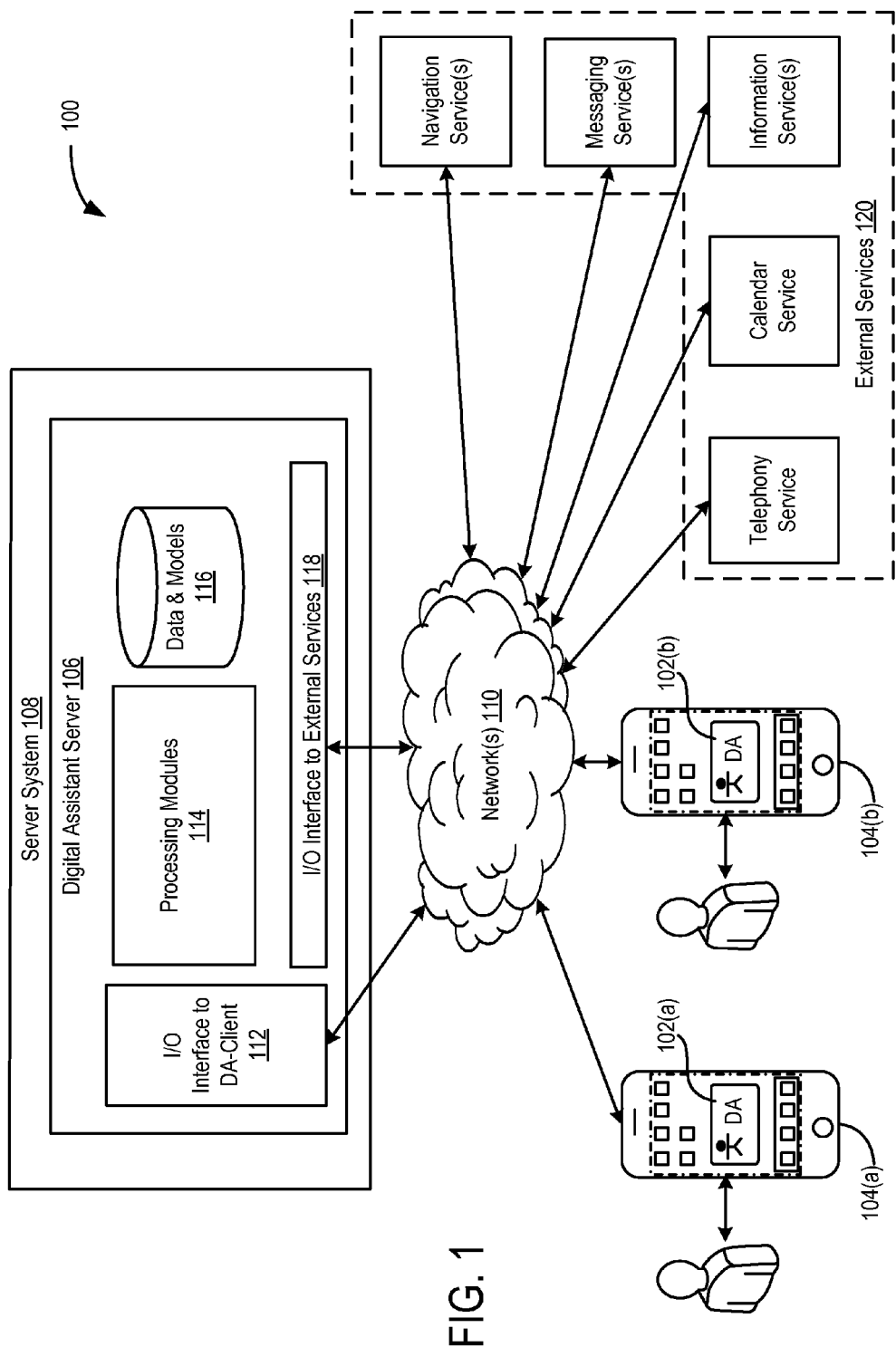
FIG. 1 is a block diagram illustrating an environment in which a digital assistant operates in accordance with some embodiments.

FIG. 1 is a block diagram of an operating environment 100 of a digital assistant according to some embodiments. The terms "digital assistant," "virtual assistant," "intelligent automated assistant," or "automatic digital assistant," refer to any information processing system that interprets natural language input in spoken and/or textual form to infer user intent, and performs actions based on the inferred user intent. For example, to act on a inferred user intent, the system can perform one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g. speech), textual, and/or visual form.

Specifically, a digital assistant is capable of accepting a user request at least partially in the form of a natural language command, request, statement, narrative, and/or inquiry. Typically, the user request seeks either an informational answer or performance of a task by the digital assistant. A satisfactory response to the user request is either provision of the requested informational answer, performance of the requested task, or a combination of the two. For example, a user may ask the digital assistant a question, such as "Where am I right now?" Based on the user's current location, the digital assistant may answer, "You are in Central Park near the west gate." The user may also request the performance of a task, for example, "Please invite my friends to my girlfriend's birthday party next week." In response, the digital assistant may acknowledge the request by saying "Yes, right away," and then send a suitable calendar invite on behalf of the user to each of the user' friends listed in the user's electronic address book. There are numerous other ways of interacting with a digital assistant to request information or performance of various tasks. In addition to providing verbal responses and taking programmed actions, the digital assistant can also provide responses in other visual or audio forms, e.g., as text, alerts, music, videos, animations, etc.

An example of a digital assistant is described in Applicant's U.S. Utility application Ser. No. 12/987,982 for "Intelligent Automated Assistant," filed Jan. 10, 2011, the entire disclosure of which is incorporated herein by reference.

As shown in FIG. 1, in some embodiments, a digital assistant is implemented according to a client-server model. The digital assistant includes a client-side portion 102a, 102b (hereafter "DA client 102") executed on a user device 104a, 104b, and a server-side portion 106 (hereafter "DA server 106") executed on a server system 108. The DA client 102 communicates with the DA server 106 through one or more networks 110. The DA client 102 provides client-side functionalities such as user-facing input and output processing and communications with the DA-server 106. The DA server 106 provides server-side functionalities for any number of DA-clients 102 each residing on a respective user device 104.

In some embodiments, the DA server 106 includes a client-facing I/O interface 112, one or more processing modules 114, data and models 116, and an I/O interface to external services 118. The client-facing I/O interface facilitates the client-facing input and output processing for the digital assistant server 106. The one or more processing modules 114 utilize the data and models 116 to determine the user's intent based on natural language input and perform task execution based on inferred user intent. In some embodiments, the DA-server 106 communicates with external services 120 through the network(s) 110 for task completion or information acquisition. The I/O interface to external services 118 facilitates such communications.

Examples of the user device 104 include, but are not limited to, a handheld computer, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices. More details on the user device 104 are provided in reference to an exemplary user device 104 shown in FIG. 2.

Examples of the communication network(s) 110 include local area networks ("LAN") and wide area networks ("WAN"), e.g., the Internet. The communication network(s) 110 may be implemented using any known network protocol, including various wired or wireless protocols, such as e.g., Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

The server system 108 can be implemented on one or more standalone data processing apparatus and/or a distributed network of computers. In some embodiments, the server system 108 also employs various virtual devices and/or services of third party service providers (e.g., third-party cloud service providers) to provide the underlying computing resources and/or infrastructure resources of the server system 108.

Although the digital assistant shown in FIG. 1 includes both a client-side portion (e.g., the DA-client 102) and a server-side portion (e.g., the DA server 106), in some embodiments, the functions of a digital assistant can be implemented as a standalone application installed on a user device. In addition, the divisions of functionalities between the client and server portions of the digital assistant can vary in different embodiments. For example, in one example embodiment, the DA client can be a thin-client that provides only user-facing input and output processing functions, and delegates all other functionalities of the digital assistant to a backend server.

As described later in this specification, the digital assistant can implement a crowd sourcing functionality. The crowd sourcing functionality allows the digital assistant to gather information from third party information sources (i.e., so-called "crowd-sourcing information sources" or "CS information sources"), and use the crowd sourced information to facilitate request fulfillment, and in some cases, intent inference, in an extended time frame. In some embodiments, the information crowd sourcing is only invoked when other real-time response mechanisms of the digital assistant have failed to produce a satisfactory response to a user request. In some embodiments, the information crowd sourcing is available to produce a response to a user request without the presence of a prior failure by another response mechanism of the digital assistant. In some embodiments, the information crowd sourcing is performed offline when failures are detected in a user interaction log, and the crowd sourced information is subsequently used to improve the response mechanisms of the digital assistant for future user requests and interactions.

Figure 2:
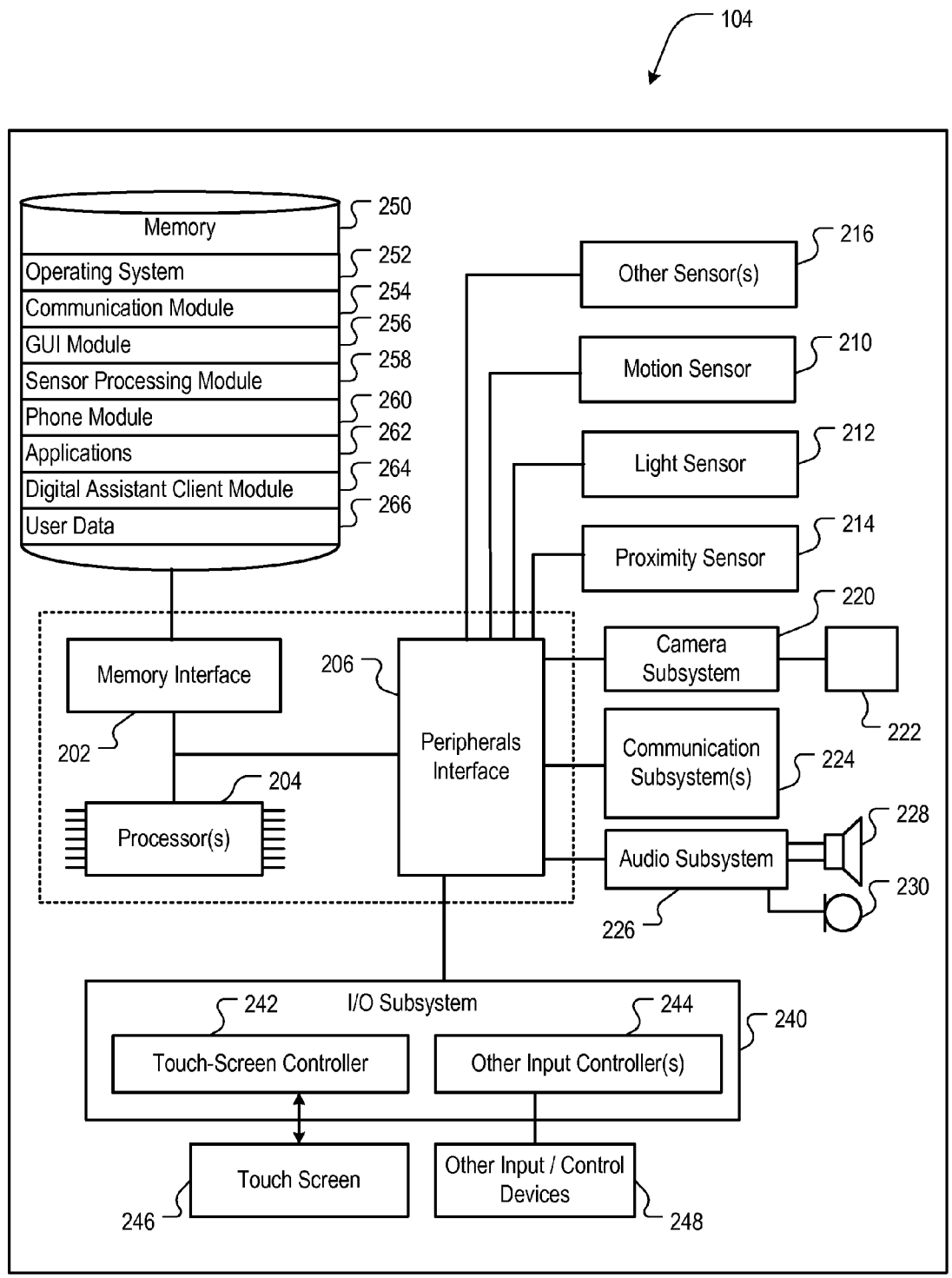
FIG. 2 is a block diagram illustrating a digital assistant client system in accordance with some embodiments.

FIG. 2 is a block diagram of a user-device 104 in accordance with some embodiments. The user device 104 includes a memory interface 202, one or more processors 204, and a peripherals interface 206. The various components in the user device 104 are coupled by one or more communication buses or signal lines. The user device 104 includes various sensors, subsystems, and peripheral devices that are coupled to the peripherals interface 206. The sensors, subsystems, and peripheral devices gather information and/or facilitate various functionalities of the user device 104.

For example, a motion sensor 210, a light sensor 212, and a proximity sensor 214 are coupled to the peripherals interface 206 to facilitate orientation, light, and proximity sensing functions. Other sensors 216, such as a positioning system (e.g., GPS receiver), a temperature sensor, a biometric sensor, and the like, can also be connected to the peripherals interface 206, to facilitate related functionalities.

A camera subsystem 220 and an optical sensor 222 are utilized to facilitate camera functions, such as taking photographs and recording video clips. Communication functions are facilitated through one or more wired and/or wireless communication subsystems 224, which can include various communication ports, radio frequency receivers and transmitters, and/or optical (e.g., infrared) receivers and transmitters. An audio subsystem 226 is coupled to speakers 228 and a microphone 230 to facilitate voice-enabled functions, such as voice recognition, voice replication, digital recording, and telephony functions.

An I/O subsystem 240 is also coupled to the peripheral interface 206. The I/O subsystem 240 includes a touch screen controller 242 and/or other input controller(s) 244. The touch-screen controller 242 is coupled to a touch screen 246. The touch screen 246 and the touch screen controller 242 can, for example, detect contact and movement or break thereof using any of a plurality of touch sensitivity technologies, such as capacitive, resistive, infrared, surface acoustic wave technologies, proximity sensor arrays, and the like. The other input controller(s) 244 can be coupled to other input/control devices 248, such as one or more buttons, rocker switches, thumb-wheel, infrared port, USB port, and/or a pointer device such as a stylus.

The memory interface 202 is coupled to memory 250. The memory 250 can include high-speed random access memory and/or non-volatile memory, such as one or more magnetic disk storage devices, one or more optical storage devices, and/or flash memory (e.g., NAND, NOR).

The memory 250 stores an operating system 252, a communication module 254, a graphical user interface module 256, a sensor processing module 258, a phone module 260, and applications 262. The operating system 252 includes instructions for handling basic system services and for performing hardware dependent tasks. The communication module 254 facilitates communicating with one or more additional devices, one or more computers and/or one or more servers. The graphical user interface module 256 facilitates graphic user interface processing. The sensor processing module 258 facilitates sensor-related processing and functions. The phone module 260 facilitates phone-related processes and functions. The application module 262 facilitates various functionalities of user applications, such as electronic-messaging, web browsing, media processing, Navigation, imaging and/or other processes and functions.

As described in this specification, the memory 250 also stores client-side digital assistant instructions (e.g., in a digital assistant client module 264) and various user data 266 (e.g., user-specific vocabulary data, preference data, and/or other data such as the user's electronic address book, to-do lists, shopping lists, etc.) to provide the client-side functionalities of the digital assistant.

In various embodiments, the digital assistant client module 264 is capable of accepting voice input, text input, touch input, and/or gestural input through various user interfaces (e.g., the I/O subsystem 244) of the user device 104. The digital assistant client module 264 is also capable of providing output in audio, visual, and/or tactile forms. For example, output can be provided as voice, sound, alerts, text messages, menus, graphics, videos, animations, vibrations, and/or combinations of two or more of the above. During operation, the digital assistant client module 264 communicates with the digital assistant server using the communication subsystems 224.

In some embodiments, the digital assistant client module 264 utilizes the various sensors, subsystems and peripheral devices to gather additional information from the surrounding environment of the user device 104 to establish a context associated with a user input. In some embodiments, the digital assistant client module 264 optionally provides the context information or a subset thereof with the user input to the digital assistant server to help infer the user's intent.

In some embodiments, the context information that can accompany the user input includes sensor information, e.g., lighting, ambient noise, ambient temperature, images or videos of the surrounding environment, etc. In some embodiments, the context information also includes the physical state of the device, e.g., device orientation, device location, device temperature, power level, speed, acceleration, motion patterns, cellular signals strength, etc. In some embodiments, information related to the software state of the user device 104, e.g., running processes, installed programs, past and present network activities, background services, error logs, resources usage, etc., of the user device 104 can also be provided to the digital assistant server as context information associated with a user input.

In some embodiments, the DA client module 264 selectively provides information (e.g., user data 266) stored on the user device 104 in response to requests from the digital assistant server. In some embodiments, the digital assistant client module 264 also elicits additional input from the user via a natural language dialogue or other user interfaces upon request by the digital assistant server 106. The digital assistant client module 264 passes the additional input to the digital assistant server 106 to help the digital assistant server 106 in intent inference and/or fulfillment of the user's intent expressed in the user request.

In various embodiments, the memory 250 can include additional instructions or fewer instructions. Furthermore, various functions of the user device 104 may be implemented in hardware and/or in firmware, including in one or more signal processing and/or application specific integrated circuits.

Figure 3A:
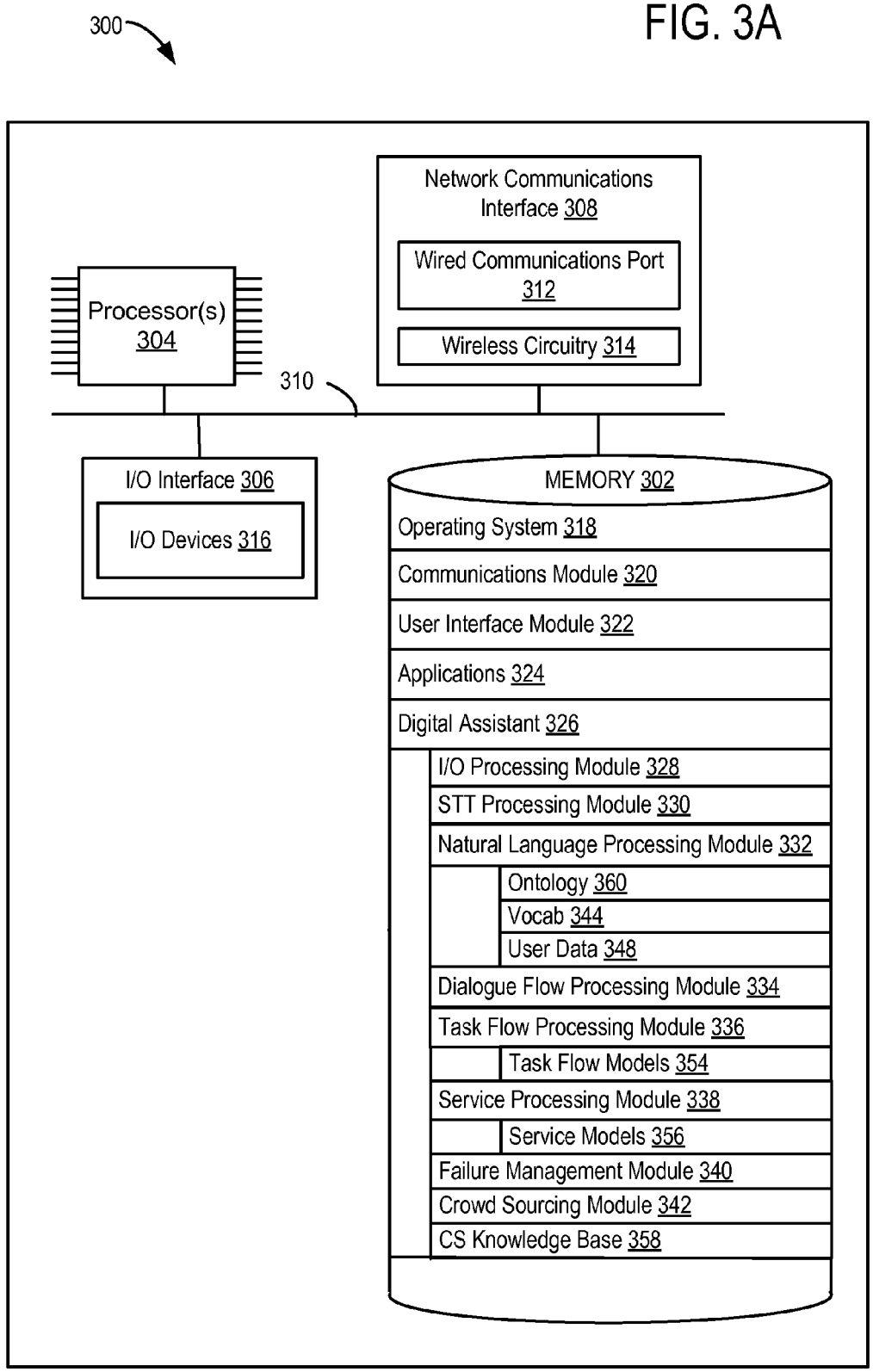
FIG. 3A is a block diagram illustrating a standalone digital assistant system or a digital assistant server system in accordance with some embodiments.

FIG. 3A is a block diagram of an example digital assistant system 300 in accordance with some embodiments. In some embodiments, the digital assistant system 300 is implemented on a standalone computer system. In some embodiments, the digital assistant system 300 is distributed across multiple computers. In some embodiments, some of the modules and functions of the digital assistant are divided into a server portion and a client portion, where the client portion resides on a user device (e.g., the user device 104) and communicates with the server portion (e.g., the server system 108) through one or more networks, e.g., as shown in FIG. 1. In some embodiments, the digital assistant system 300 is an embodiment of the server system 108 (and/or the digital assistant server 106) shown in FIG. 1. It should be noted that the digital assistant system 300 is only one example of a digital assistant system, and that the digital assistant system 300 may have more or fewer components than shown, may combine two or more components, or may have a different configuration or arrangement of the components. The various components shown in FIG. 3A may be implemented in hardware, software, firmware, including one or more signal processing and/or application specific integrated circuits, or a combination of thereof.

The digital assistant system 300 includes memory 302, one or more processors 304, an input/output (I/O) interface 306, and a network communications interface 308. These components communicate with one another over one or more communication buses or signal lines 310.

In some embodiments, the memory 302 includes a non-transitory computer readable medium, such as high-speed random access memory and/or a non-volatile computer readable storage medium (e.g., one or more magnetic disk storage devices, flash memory devices, or other non-volatile solid-state memory devices).

The I/O interface 306 couples input/output devices 316 of the digital assistant system 300, such as displays, a keyboards, touch screens, and microphones, to the user interface module 322. The I/O interface 306, in conjunction with the user interface module 322, receive user inputs (e.g., voice input, keyboard inputs, touch inputs, etc.) and process them accordingly. In some embodiments, e.g., when the digital assistant is implemented on a standalone user device, the digital assistant system 300 includes any of the components and I/O and communication interfaces described with respect to the user device 104 in FIG. 2. In some embodiments, the digital assistant system 300 represents the server portion of a digital assistant implementation, and interacts with the user through a client-side portion residing on a user device (e.g., the user device 104 shown in FIG. 2).

In some embodiments, the network communications interface 308 includes wired communication port(s) 312 and/or wireless transmission and reception circuitry 314. The wired communication port(s) receive and send communication signals via one or more wired interfaces, e.g., Ethernet, Universal Serial Bus (USB), FIREWIRE, etc. The wireless circuitry 314 receives and sends RF signals and/or optical signals from/to communications networks and other communications devices. The wireless communications may use any of a plurality of communications standards, protocols and technologies, such as GSM, EDGE, CDMA, TDMA, Bluetooth, Wi-Fi, VoIP, Wi-MAX, or any other suitable communication protocol. The network communications interface 308 enables communication between the digital assistant system 300 with networks, such as the Internet, an intranet and/or a wireless network, such as a cellular telephone network, a wireless local area network (LAN) and/or a metropolitan area network (MAN), and other devices.

In some embodiments, memory 302, or the non-volatile and/or non-transitory computer readable storage media of memory 302, stores programs, modules, instructions, and data structures including all of a subset of: an operating system 318, a communications module 320, a user interface module 322, one or more applications 324, and a digital assistant module 326. The one or more processors 304 execute these programs, modules, and instructions, and reads/writes from/to the data structures.

The operating system 318 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

The communications module 320 facilitates communications between the digital assistant system 300 with other devices over the network communications interface 308. For example, the communication module 320 may communicate with the communication interface 254 of the device 104 shown in FIG. 2. The communications module 320 also includes various software components for handling data received by the wireless circuitry 314 and/or wired communications port 312.

The user interface module 322 receives commands and/or inputs from a user via the I/O interface 306 (e.g., from a keyboard, touch screen, and/or microphone), and generates user interface objects on a display.

The applications 324 include programs and/or modules that are configured to be executed by the one or more processors 304. For example, if the digital assistant system is implemented on a standalone user device, the applications 324 may include user applications, such as games, a calendar application, a navigation application, or an email application. If the digital assistant system 300 is implemented on a server farm, the applications 324 may include resource management applications, diagnostic applications, or scheduling applications, for example.

The memory 302 also stores the digital assistant module (or the server portion of a digital assistant) 326. In some embodiments, the digital assistant module 326 includes the following sub-modules, or a subset or superset thereof: an input/output processing module 328, a speech-to-text (STT) processing module 330, a natural language processing module 332, a dialogue flow processing module 334, a task flow processing module 336, a service processing module 338, a failure management module 340, and a crowd sourcing module 342. Each of these processing modules has access to one or more of the following data and models of the digital assistant 326, or a subset or superset thereof: ontology 360, vocabulary index 344, user data 348, task flow models 354, service models 356, and crowd-sourced knowledge base 358.

In some embodiments, using the processing modules, data, and models implemented in the digital assistant module 326, the digital assistant performs at least some of the following: identifying a user's intent expressed in a natural language input received from the user; actively eliciting and obtaining information needed to fully infer the user's intent (e.g., by disambiguating words, names, intentions, etc.); determining the task flow for fulfilling the inferred intent; and executing the task flow to fulfill the inferred intent. In some embodiments, the digital assistant also takes appropriate actions when a satisfactory response was not or could not be provided to the user for various reasons.

As shown in FIG. 3B, in some embodiments, the I/O processing module 328 interacts with the user through the I/O devices 316 in FIG. 3A or with a user device (e.g., a user device 104 in FIG. 1) through the network communications interface 308 in FIG. 3A to obtain user input (e.g., a speech input) and to provide responses to the user input. The I/O processing module 328 optionally obtains context information associated with the user input from the user device, along with or shortly after the receipt of the user input. The context information includes user-specific data, vocabulary, and/or preferences relevant to the user input. In some embodiments, the context information also includes software and hardware states of the device (e.g., the user device 104 in FIG. 1) at the time the user request is received, and/or information related to the surrounding environment of the user at the time that the user request was received. In some embodiments, the I/O processing module 328 also sends follow-up questions to, and receives answers from, the user regarding the user request. When a user request is received by the I/O processing module 328 and the user request contains a speech input, the I/O processing module 328 forwards the speech input to the speech-to-text (STT) processing module 330 for speech-to-text conversions.

The speech-to-text processing module 330 receives speech input (e.g., a user utterance captured in a voice recording) through the I/O processing module 328. In some embodiments, the speech-to-text processing module 330 uses various acoustic and language models to recognize the speech input as a sequence of phonemes, and ultimately, a sequence of words or tokens written in one or more languages. The speech-to-text processing module 330 can be implemented using any suitable speech recognition techniques, acoustic models, and language models, such as Hidden Markov Models, Dynamic Time Warping (DTW)-based speech recognition, and other statistical and/or analytical techniques. In some embodiments, the speech-to-text processing can be performed at least partially by a third party service or on the user's device. Once the speech-to-text processing module 330 obtains the result of the speech-to-text processing, e.g., a sequence of words or tokens, it passes the result to the natural language processing module 332 for intent inference.

More details on the speech-to-text processing are described in Applicant's U.S. Utility application Ser. No. 13/236,942 for "Consolidating Speech Recognition Results," filed on Sep. 20, 2011, the entire disclosure of which is incorporated herein by reference.

The natural language processing module 332 ("natural language processor") of the digital assistant takes the sequence of words or tokens ("token sequence") generated by the speech-to-text processing module 330, and attempts to associate the token sequence with one or more "actionable intents" recognized by the digital assistant. An "actionable intent" represents a task that can be performed by the digital assistant, and has an associated task flow implemented in the task flow models 354. The associated task flow is a series of programmed actions and steps that the digital assistant takes in order to perform the task. The scope of a digital assistant's capabilities is dependent on the number and variety of task flows that have been implemented and stored in the task flow models 354, or in other words, on the number and variety of "actionable intents" that the digital assistant recognizes. The effectiveness of the digital assistant, however, is also dependent on the assistant's ability to infer the correct "actionable intent(s)" from the user request expressed in natural language.

In some embodiments, in addition to the sequence of words or tokens obtained from the speech-to-text processing module 330, the natural language processor 332 also receives context information associated with the user request, e.g., from the I/O processing module 328. The natural language processor 332 optionally uses the context information to clarify, supplement, and/or further define the information contained in the token sequence received from the speech-to-text processing module 330. The context information includes, for example, user preferences, hardware and/or software states of the user device, sensor information collected before, during, or shortly after the user request, prior interactions (e.g., dialogue) between the digital assistant and the user, and the like.

In some embodiments, the natural language processing is based on an ontology 360. The ontology 360 is a hierarchical structure containing many nodes, each node representing either an "actionable intent" or a "property" relevant to one or more of the "actionable intents" or other "properties". As noted above, an "actionable intent" represents a task that the digital assistant is capable of performing, i.e., it is "actionable" or can be acted on. A "property" represents a parameter associated with an actionable intent, a domain concept or entity, or a sub-aspect of another property. A linkage between an actionable intent node and a property node in the ontology 360 defines how a parameter represented by the property node pertains to the task represented by the actionable intent node.

Figure 3C:
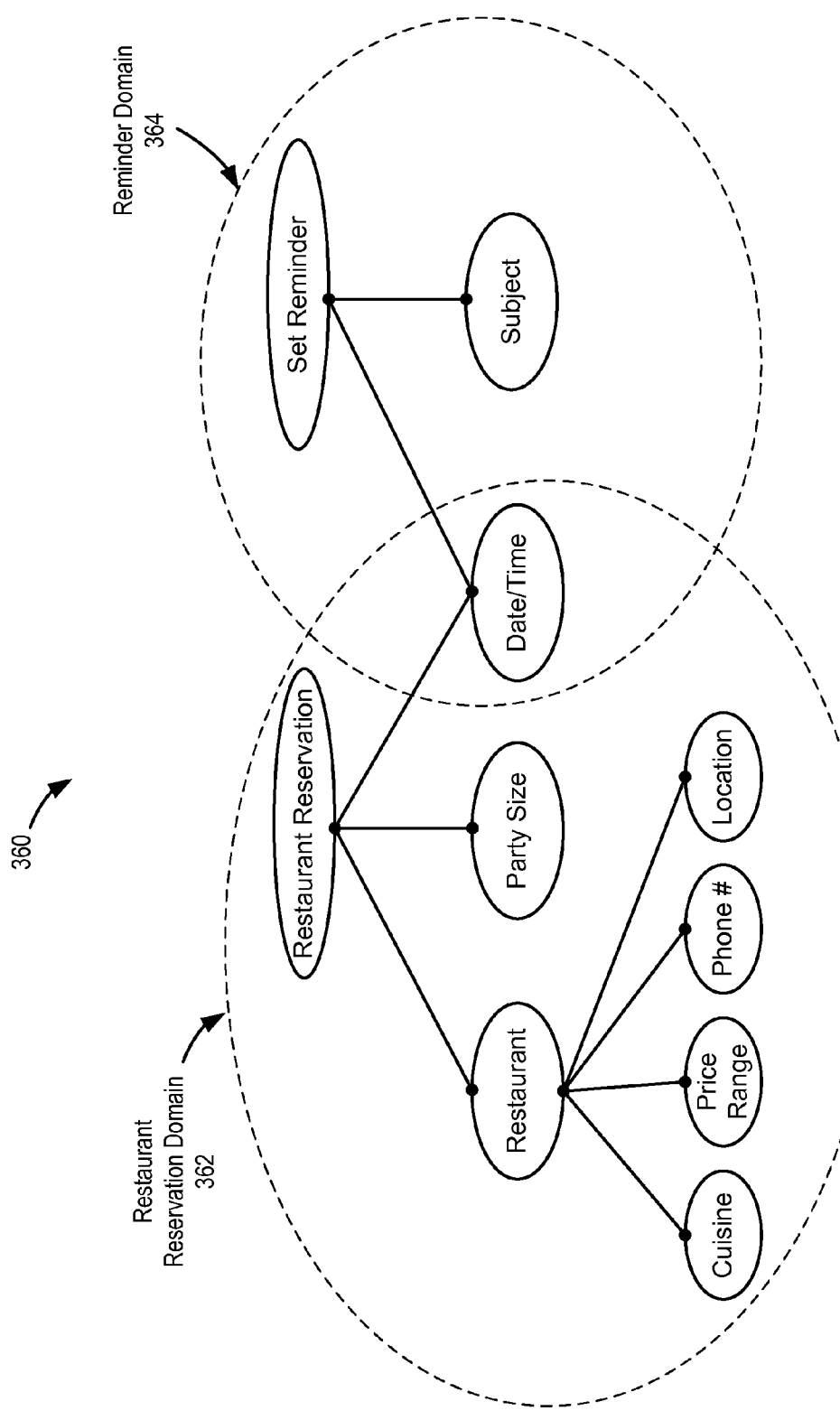
FIG. 3C is a diagram of a portion of an ontology in accordance with some embodiments.

In some embodiments, the ontology 360 is made up of actionable intent nodes and property nodes. Within the ontology 360, each actionable intent node is linked to one or more property nodes either directly or through one or more intermediate property nodes. Similarly, each property node is linked to one or more actionable intent nodes either directly or through one or more intermediate property nodes. For example, as shown in FIG. 3C, the ontology 360 may include a "restaurant reservation" node (i.e., an actionable intent node). Property node "restaurant," (a domain entity represented by a property node) and property nodes "date/time" (for the reservation) and "party size" are each directly linked to the actionable intent node (i.e., the "restaurant reservation" node). In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, as shown in FIG. 3C, the ontology 360 may also include a "set reminder" node (i.e., another actionable intent node). Property nodes "date/time" (for the setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in the ontology 360.

An actionable intent node, along with its linked concept nodes, may be described as a "domain." In the present discussion, each domain is associated with a respective actionable intent, and refers to the group of nodes (and the relationships therebetween) associated with the particular actionable intent. For example, the ontology 360 shown in FIG. 3C includes an example of a restaurant reservation domain 362 and an example of a reminder domain 364 within the ontology 360. The restaurant reservation domain includes the actionable intent node "restaurant reservation," property nodes "restaurant," "date/time," and "party size," and sub-property nodes "cuisine," "price range," "phone number," and "location." The reminder domain 364 includes the actionable intent node "set reminder," and property nodes "subject" and "date/time." In some embodiments, the ontology 360 is made up of many domains. Each domain may share one or more property nodes with one or more other domains. For example, the "date/time" property node may be associated with many different domains (e.g., a scheduling domain, a travel reservation domain, a movie ticket domain, etc.), in addition to the restaurant reservation domain 362 and the reminder domain 364.

While FIG. 3C illustrates two example domains within the ontology 360, other domains (or actionable intents) include, for example, "initiate a phone call," "find directions," "schedule a meeting," "send a message," and "provide an answer to a question," and so on. A "send a message" domain is associated with a "send a message" actionable intent node, and may further include property nodes such as "recipient(s)", "message type", and "message body." The property node "recipient" may be further defined, for example, by the sub-property nodes such as "recipient name" and "message address."

In some embodiments, the ontology 360 includes all the domains (and hence actionable intents) that the digital assistant is capable of understanding and acting upon. In some embodiments, the ontology 360 may be modified, such as by adding or removing entire domains or nodes, or by modifying relationships between the nodes within the ontology 360.

In some embodiments, nodes associated with multiple related actionable intents may be clustered under a "super domain" in the ontology 360. For example, a "travel" super-domain may include a cluster of property nodes and actionable intent nodes related to travels. The actionable intent nodes related to travels may include "airline reservation," "hotel reservation," "car rental," "get directions," "find points of interest," and so on. The actionable intent nodes under the same super domain (e.g., the "travels" super domain) may have many property nodes in common. For example, the actionable intent nodes for "airline reservation," "hotel reservation," "car rental," "get directions," "find points of interest" may share one or more of the property nodes "start location," "destination," "departure date/time," "arrival date/time," and "party size."

In some embodiments, each node in the ontology 360 is associated with a set of words and/or phrases that are relevant to the property or actionable intent represented by the node. The respective set of words and/or phrases associated with each node is the so-called "vocabulary" associated with the node. The respective set of words and/or phrases associated with each node can be stored in the vocabulary index 344 in association with the property or actionable intent represented by the node. For example, returning to FIG. 3B, the vocabulary associated with the node for the property of "restaurant" may include words such as "food," "drinks," "cuisine," "hungry," "eat," "pizza," "fast food," "meal," and so on. For another example, the vocabulary associated with the node for the actionable intent of "initiate a phone call" may include words and phrases such as "call," "phone," "dial," "ring," "call this number," "make a call to," and so on. The vocabulary index 344 optionally includes words and phrases in different languages.

The natural language processor 332 receives the token sequence (e.g., a text string) from the speech-to-text processing module 330, and determines what nodes are implicated by the words in the token sequence. In some embodiments, if a word or phrase in the token sequence is found to be associated with one or more nodes in the ontology 360 (via the vocabulary index 344), the word or phrase will "trigger" or "activate" those nodes. Based on the quantity and/or relative importance of the activated nodes, the natural language processor 332 will select one of the actionable intents as the task that the user intended the digital assistant to perform. In some embodiments, the domain that has the most "triggered" nodes is selected. In some embodiments, the domain having the highest confidence value (e.g., based on the relative importance of its various triggered nodes) is selected. In some embodiments, the domain is selected based on a combination of the number and the importance of the triggered nodes. In some embodiments, additional factors are considered in selecting the node as well, such as whether the digital assistant has previously correctly interpreted a similar request from a user.

In some embodiments, the digital assistant also stores names of specific entities in the vocabulary index 344, so that when one of these names is detected in the user request, the natural language processor 332 will be able to recognize that the name refers to a specific instance of a property or sub-property in the ontology. In some embodiments, the names of specific entities are names of businesses, restaurants, people, movies, and the like. In some embodiments, the digital assistant can search and identify specific entity names from other data sources, such as the user's address book, a movies database, a musicians database, and/or a restaurant database. In some embodiments, when the natural language processor 332 identifies that a word in the token sequence is a name of a specific entity (such as a name in the user's address book), that word is given additional significance in selecting the actionable intent within the ontology for the user request.

For example, when the words "Mr. Santo" are recognized from the user request, and the last name "Santo" is found in the vocabulary index 344 as one of the contacts in the user's contact list, then it is likely that the user request corresponds to a "send a message" or "initiate a phone call" domain. For another example, when the words "ABC Café" are found in the user request, and the term "ABC Café" is found in the vocabulary index 344 as the name of a particular restaurant in the user's city, then it is likely that the user request corresponds to a "restaurant reservation" domain.

User data 348 includes user-specific information, such as user-specific vocabulary, user preferences, user address, user's default and secondary languages, user's contact list, and other short-term or long-term information for each user. The natural language processor 332 can use the user-specific information to supplement the information contained in the user input to further define the user intent. For example, for a user request "invite my friends to my birthday party," the natural language processor 332 is able to access user data 348 to determine who the "friends" are and when and where the "birthday party" would be held, rather than requiring the user to provide such information explicitly in his/her request.

Other details of searching an ontology based on a token string is described in Applicant's U.S. Utility application Ser. No. 12/341,743 for "Method and Apparatus for Searching Using An Active Ontology," filed Dec. 22, 2008, the entire disclosure of which is incorporated herein by reference.

Once the natural language processor 332 identifies an actionable intent (or domain) based on the user request, the natural language processor 332 generates a structured query to represent the identified actionable intent. In some embodiments, the structured query includes parameters for one or more nodes within the domain for the actionable intent, and at least some of the parameters are populated with the specific information and requirements specified in the user request. For example, the user may say "Make me a dinner reservation at a sushi place at 7." In this case, the natural language processor 332 may be able to correctly identify the actionable intent to be "restaurant reservation" based on the user input. According to the ontology, a structured query for a "restaurant reservation" domain may include parameters such as {Cuisine}, {Time}, {Date}, {Party Size}, and the like. Based on the information contained in the user's utterance, the natural language processor 332 may generate a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} are not specified in the structured query based on the information currently available. In some embodiments, the natural language processor 332 populates some parameters of the structured query with received context information. For example, if the user requested a sushi restaurant "near me," the natural language processor 332 may populate a {location} parameter in the structured query with GPS coordinates from the user device 104.

In some embodiments, the natural language processor 332 passes the structured query (including any completed parameters) to the task flow processing module 336 ("task flow processor"). The task flow processor 336 is configured to receive the structured query from the natural language processor 332, complete the structured query, if necessary, and perform the actions required to "complete" the user's ultimate request. In some embodiments, the various procedures necessary to complete these tasks are provided in task flow models 354. In some embodiments, the task flow models include procedures for obtaining additional information from the user, and task flows for performing actions associated with the actionable intent.

As described above, in order to complete a structured query, the task flow processor 336 may need to initiate additional dialogue with the user in order to obtain additional information, and/or disambiguate potentially ambiguous utterances. When such interactions are necessary, the task flow processor 336 invokes the dialogue processing module 334 ("dialogue processor 334") to engage in a dialogue with the user. In some embodiments, the dialogue processor 334 determines how (and/or when) to ask the user for the additional information, and receives and processes the user responses. (The questions are provided to and answers are received from the users through the I/O processing module 328.) In some embodiments, the dialogue processor 334 presents dialogue output to the user via audio and/or visual output, and receives input from the user via spoken or physical (e.g., clicking) responses. Continuing with the example above, when the task flow processor 336 invokes the dialogue flow processor 334 to determine the "party size" and "date" information for the structured query associated with the domain "restaurant reservation," the dialogue flow processing module 334 generates questions such as "For how many people?" and "On which day?" to pass to the user. Once answers are received from the user, the dialogue flow processor 334 can then populate the structured query with the missing information, or pass the information to the task flow processor 336 to complete the missing information from the structured query.

In some cases, the task flow processor 336 may receive a structured query that has one or more ambiguous properties. For example, a structured query for the "send a message" domain may indicate that the intended recipient is "Bob," and the user may have multiple contacts named "Bob." The task flow processor 336 will request that the dialogue processor 334 disambiguate this property of the structured query. In turn, the dialogue processor 334 may ask the user "Which Bob?", and display (or read) a list of contacts named "Bob" from which the user may choose.

Once the task flow processor 336 has completed the structured query for an actionable intent, the task flow processor 336 proceeds to perform the ultimate task associated with the actionable intent. Accordingly, the task flow processor 336 executes the steps and instructions in the task flow model according to the specific parameters contained in the structured query. For example, the task flow model for the actionable intent of "restaurant reservation" may include steps and instructions for contacting a restaurant and actually requesting a reservation for a particular party size at a particular time. For example, using a structured query such as: {restaurant reservation, restaurant=ABC Café, date=Mar. 12, 2012, time=7 pm, party size=5}, the task flow processor 336 may perform the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some embodiments, the task flow processor 336 employs the assistance of a service processing module 338 ("service processor") to complete a task requested in the user input or to provide an informational answer requested in the user input. For example, the service processor 338 can act on behalf of the task flow processor 336 to make a phone call, set a calendar entry, invoke a map search, invoke or interact with other user applications installed on the user device, and invoke or interact with third party services (e.g. a restaurant reservation portal, a social networking website, a banking portal, etc.). In some embodiments, the protocols and application programming interfaces (API) required by each service can be specified by a respective service model among the services models 356. The service processor 338 accesses the appropriate service model for a service and generates requests for the service in accordance with the protocols and APIs required by the service according to the service model.

For example, if a restaurant has enabled an online reservation service, the restaurant can submit a service model specifying the necessary parameters for making a reservation and the APIs for communicating the values of the necessary parameter to the online reservation service. When requested by the task flow processor 336, the service processor 338 can establish a network connection with the online reservation service using the web address stored in the service model, and send the necessary parameters of the reservation (e.g., time, date, party size) to the online reservation interface in a format according to the API of the online reservation service.

In some embodiments, the natural language processor 332, dialogue processor 334, and task flow processor 336 are used collectively and iteratively to infer and define the user's intent, obtain information to further clarify and refine the user intent, and finally generate a response (i.e., an output to the user, or the completion of a task) to fulfill the user's intent.

In some embodiments, after all of the tasks needed to fulfill the user's request have been performed, the digital assistant 326 formulates a confirmation response, and sends the response back to the user through the I/O processing module 328. If the user request seeks an informational answer, the confirmation response presents the requested information to the user. In some embodiments, the digital assistant also requests the user to indicate whether the user is satisfied with the response produced by the digital assistant 326.

More details on the digital assistant can be found in the U.S. Utility application Ser. No. 12/987,982, entitled "Intelligent Automated Assistant", filed Jan. 18, 2010, U.S. Utility Application No. 61/493,201, entitled "Generating and Processing Data Items That Represent Tasks to Perform", filed Jun. 3, 2011, the entire disclosures of which are incorporated herein by reference.

In many instances, a digital assistant is able to infer a user's intent based on a natural language request provided by the user and fulfill the user's request either by providing information sought by the user's request or by performing tasks according to the user's request. However, sometimes, the digital assistant will fail to provide a satisfactory response to the user's request for information or action. The reasons for the failures can be many, such as imperfect speech recognition, unrecognized terms and concepts in the user request, incorrect or incomplete information and inadequate capability in the digital assistant's services, and so on. Regardless of the reason for the digital assistant's failure to provide a satisfactory response to a user request, it is desirable to implement a suitable failure management procedure for the digital assistant.

As shown in FIG. 3B, in some embodiments, the digital assistant 326 also implements a failure management module 340 to provide appropriate remedies when a failure is detected. In some embodiments, the failure management module 340 invokes the crowd sourcing module 342 or searches for answers in the crowd-source knowledge base 358 to generate an appropriate remedial or corrective response for a failed user request. The crowd sourcing module 342 issues queries and collects answers from one or more external CS information sources over an extended period of time, and uses the answers to supplement the digital assistant's abilities in speech processing, natural language processing (for intent inference), and/or task flow processing. For example, the crowd sourced answers may help to recognize speech in particular accents in different regions, expand the vocabulary associated with different domains, and/or identify additional domain entities. In some embodiments, the crowd sourced answers are used (either by the digital assistant itself, or by a provider of the digital assistant) to create additional domains and task flows to further expand the capabilities of the digital assistant.

In some embodiments, the crowd sourcing module 342 establishes and maintains the crowd sourced knowledge base 358. The crowd sourced knowledge base 358 stores crowd sourced information that addresses informational or task requests that the digital assistant might provide to its users. In some embodiments, the contents of the crowd sourced knowledge base are organized by records of previous user requests to which the digital assistant had initially failed to successfully respond, but subsequently fulfilled using crowd-sourced information. The crowd-sourced knowledge base provides references and information to the digital assistant to provide correct and satisfactory responses to the same or similar user requests received in the future. In some embodiments, the crowd sourced knowledge base is organized to facilitate searching by the natural language processor. For example, the information and answers in the crowd sourced knowledge base may be indexed by nodes in an ontology (e.g., the ontology 360 in FIG. 3B) as well, so that the infrastructure of the natural language processor can be leveraged to quickly find past questions and answers in one or more relevant domains.

In some embodiments, the failure management module 340, the crowd sourcing module 340 and the CS knowledge base 358 are part of the digital assistant system 326, and can various other components through various internal application interfaces. In some embodiments, one or more of the failure management module 340, the crowd sourcing module 340, and the CS knowledge base 358, of one or more sub-components thereof are optionally provided separately from the digital assistant system 326, and the digital assistant system 326 accesses each of these modules and sub-components thereof through one or more external application programming interfaces (APIs). In some embodiments, various aspects of the digital assistant system 326, such as the speech to text processing (e.g., the speech modules, acoustic models, vocabulary used in speech recognition), the natural language processing aspect (e.g., language models, grammar, ontology, etc.), the task-flow, dialogue flow, and service processing, are modified based on the information stored in the CS knowledge base 358 to improve future performance of the digital assistant system 326.

In some embodiments, the digital assistant maintains usage logs 370 on user requests and interactions between the digital assistant and the users. The usage logs optionally store information such as the user requests received, the context information surrounding the user requests, the responses provided to the users, and feedback provided by the users, the parameters, models, third-party services, and procedures used by the digital assistant to generate and provide the responses, etc. In some embodiments, the usage logs are searchable by various search parameters, such as time, location, user, demographic, response type, feedback type, task type, duration, failure type, etc. More details are provided with respect to the usage log 370 in FIG. 7 and accompanying descriptions.

Although FIG. 3B does not explicit show the communication interfaces between all components of the digital assistant 326, it is to be understood that the components shown are capable of communicate with any other components of the digital assistant 326 either directly or through one or more other interfaces, such as application programming interfaces, database query interfaces, and/or other interfaces, protocols, and/or communication channels.

Figure 4:
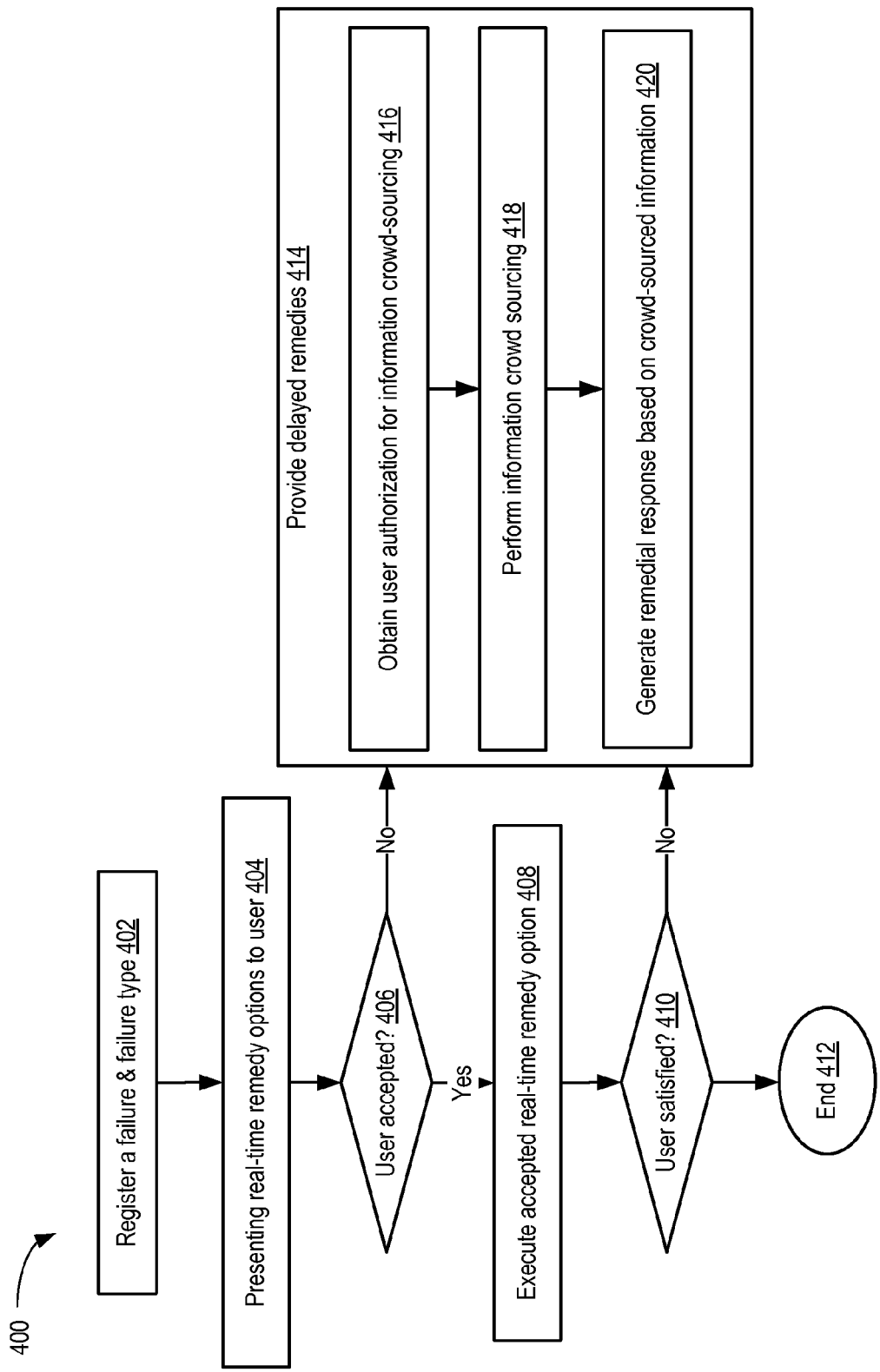
FIG. 4 is a flow chart for a failure management process invoking information crowd sourcing to produce a delayed remedial or corrective response in accordance with some embodiments.

FIG. 4 is a flow diagram illustrating an example process 400 undertaken by a failure management module of a digital assistant (e.g., the failure management module 340 in FIGS. 3A-3B). The example process 400 is merely an illustration of the decision process regarding which remedy option(s) should be provided to the user after a failure to provide a satisfactory response is recognized by the digital assistant. Other methods and processes are possible, and more or fewer remedy options may be implemented by the failure management module of the digital assistant in various embodiments.

In the example process 400, first, the digital assistant registers a failure to provide a satisfactory response to a user request, and optionally determines the failure type for the failure (402). A failure type is determined based on the reason for which the digital assistant has failed to produce a satisfactory response to the user request. The failure may be discovered by the digital assistant during the natural language processing or task flow execution process, or may be indicated by the user after the unsatisfactory response was provided to the user.

After the failure has been registered and its failure type determined, the digital assistant selects one or more real-time remedy options suitable for addressing the type of failure, and presents the options to the user (404). Examples of real-time remedy options include doing a web search based on the user request, calling a technical support hotline, calling an emergency number, searching the crowd-sourced knowledge base, and the like. In this specification, a real-time response refers to a response to a user request provided to the user by the digital assistant within a time-frame associated with the same user session or continuous dialogue between the user and the digital assistant in which the user request was received by the digital assistant. Therefore, each of the real-time remedy options should produce a real-time remedial or corrective response to the user request, e.g., within a few minutes of the user request.

In some embodiments, if the digital assistant had been able to partially infer one or more candidate actionable intents during the natural language processing stage, the candidate intents and their associated properties and domains can be used by the digital assistant in selecting the real-time remedy options to be presented to the user. In some embodiments, the domains (or actionable intents) recognized by the digital assistant may each be associated with one or more real-time remedy options. In some embodiments, the domains (or actionable intents) are clustered into different groups, and each group is associated with one or more real-time remedy options.

After the selected real-time remedy option(s) are presented to the user, the user may reject or accept the real-time remedy options(s) by providing a user input (e.g., a verbal reply, a gestural input, or the like). Based on the user input, the digital assistant determines whether the user has accepted any of the real-time remedy option(s) (406). If the digital assistant determines that the user has accepted one or more of the real-time remedy option(s) presented to the user, the digital assistant proceeds to execute the accepted real-time remedy option(s) (e.g., performing the web search, or making the call to the technical support hotline, and so on) (408).

Once the accepted real-time remedy options have been executed (e.g., when search results from the web search have been presented, or when the technical support call is completed), the digital assistant inquires whether the user is satisfied with the results of the real-time remedies just provided (410). If the digital assistant determines that the user is satisfied with the real-time remedial response based on the user's response, the digital assistant considers that the failure has been addressed and ceases further action regarding the failure and associated user request (412).

In some embodiments, if the digital assistant determines that the user has rejected all of the real-time remedy options presented to the user (e.g., shown as the "No" branch of the decision 406), or if the user is unsatisfied with the real-time remedial response(s) provided to the user (e.g., shown as the "No" branch of the decision 410), the digital assistant proceeds to invoke the delayed remedy procedures (414). The delayed remedy procedures include consulting with external CS information sources and/or crowd sourced knowledge base to generate a delayed remedial or corrective response in an extended time frame.

In this specification, a delayed response refers to a response to a user request that is provided outside of the time frame of the current user session or continuing dialogue with the user in which the user request was first received. The time-frame in which a delayed response to a user request is provided ranges from several minutes to several hours, days, or weeks, depending on the nature of the user request and the typical time frame that useful information may be crowd sourced from external CS information sources.

As shown in FIG. 4, the delayed remedy procedures include first obtaining user's authorization to proceed with information crowd sourcing for the user request (416), performing the information crowd sourcing process (418), and generating a delayed response based on the crowd-sourced information, as well as any information that the digital assistant already possessed before the crowd sourcing was started (420). More details on information crowd sourcing for user requests are provided with reference to FIGS. 5, 6A-6C, and 7.

As set forth above, in some embodiments, the digital assistant may attempt to obtain additional information from external sources and formulate a response based on the additional information in an extended time-frame. In some embodiments, the information crowd sourcing procedures may also be invoked as one of the means to generate a response without first detecting a failure. For example, the digital assistant can allow the user to explicitly request a response to be generated based on crowd sourced information at the outset. In response to the user's explicit request, the natural language processor of the digital assistant can invoke the information crowd sourcing module directly without first detecting a failure.

Figure 5:
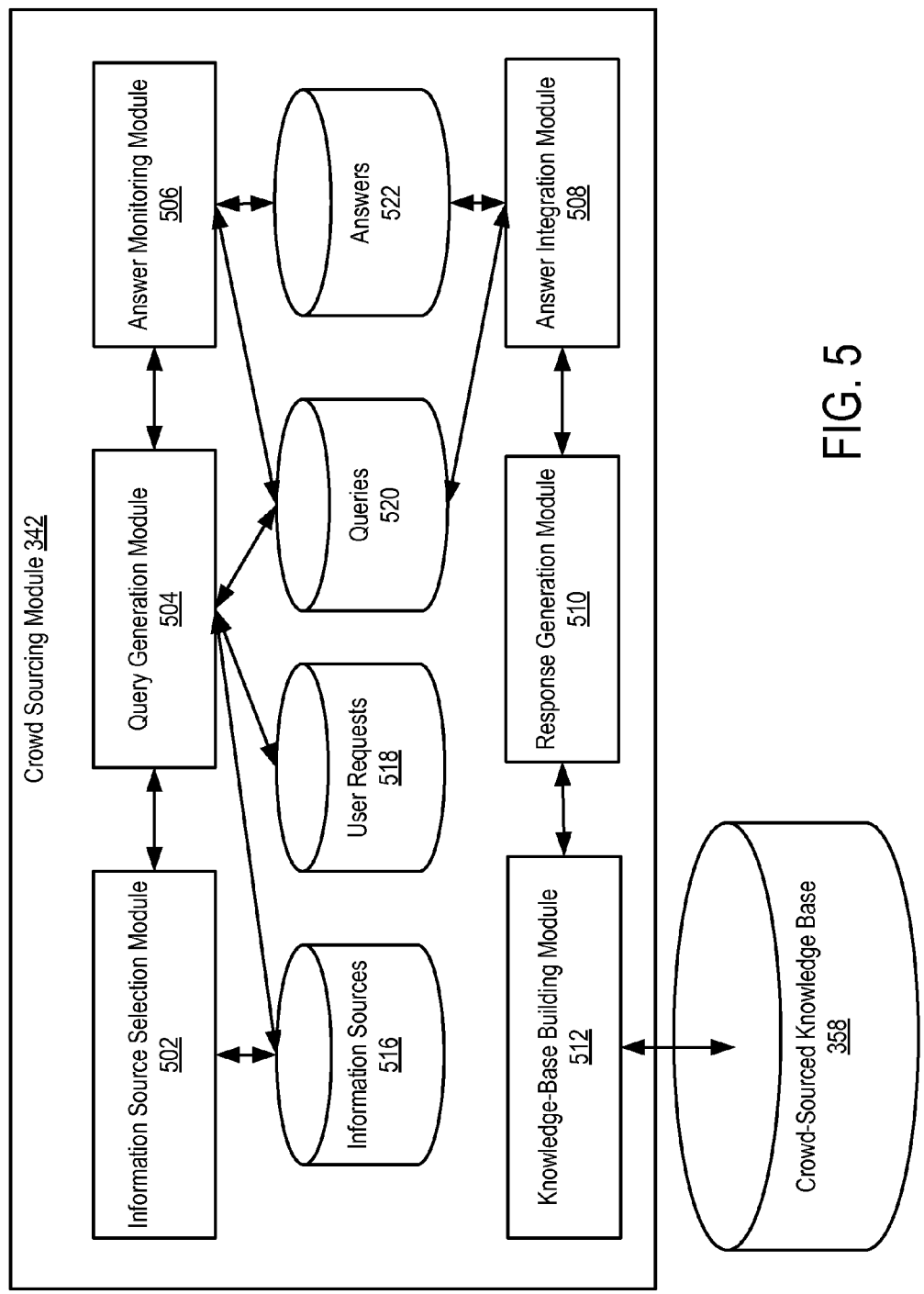
FIG. 5 is an information crowd sourcing module of a digital assistant in accordance with some embodiments.

FIG. 5 is a block diagram of an example information crowd sourcing module (e.g., the crowd sourcing module 342 shown in FIGS. 3A-3B and later in FIG. 7) in accordance with some embodiments. As shown in FIG. 5, the crowd sourcing module 342 includes an information source selection module 502, a query generation module 504, an answer monitoring module 506, an answer integration module 508, and a response generation module 510. In some embodiments, the crowd sourcing module 342 also includes knowledge building module 512 to build and maintain the crowd-sourced knowledge base based on the crowd sourced information.

Also shown in FIG. 5, the crowd sourcing module 342 stores data in various data structures and databases to keep track of the CS information sources, user requests, queries, and answers involved in the crowd sourcing process. For example, the information sources database 516 stores the CS information sources available to provide crowd sourced information. The user requests database 518 stores the user requests for which information crowd sourcing is currently being performed. The queries database 520 stores the queries that have been sent to the external CS information sources for each user request. The answers database 522 stores the answers that have been received from the CS information sources for each query.

In some embodiments, the information source selection module 502 selects, from among multiple CS information sources in the information source database 516, one or more CS information sources suitable to provide useful information for the comprehension and fulfillment of a user request. In some embodiments, the information source selection module is optional, and a fixed set of CS information sources are used for all user requests.

In some embodiments, the query generation module 504 generates one or more queries for each user request for which information crowd sourcing is to be performed. The queries are generated based on the user request and its context information. The query generation module designs the queries such that they are likely to bring back answers helpful in the comprehension and fulfillment of the user request. In some embodiments, the query generation module 504 also serves to send the queries to the appropriate CS information sources.

In some embodiments, the answer monitoring module 506 monitors the CS information sources to retrieve answers to queries from the CS information sources. In some embodiments, the answer monitoring module 506 can also receive answers sent to the answer monitoring module 506 by the CS information sources. For different CS information sources and/or queries, the time frame in which monitoring for answers is performed can range in minutes, hours, days, weeks, or even longer. The answer monitoring module 506 stores the answers received for each query in the answers database 522, and keeps track of the answer statuses of the queries.

Once the answer monitoring module determines that sufficient answers have been collected for the queries issued for a particular user request, the answer integration module filters, ranks, reconciles, and integrates the answers to provide consolidated crowd sourced information relevant to the particular user request to the response generation module. The response generation uses the consolidated crowd sourced information and any information the digital assistant already possesses to generate a response to the particular user request.

In some embodiments, if the response generated based on the crowd sourced information is satisfactory to the user, the knowledge-base building module 512 stores the consolidated crowd sourced information and/or the queries and answers that contributed to the consolidated crowd sourced information in the crowd-sourced knowledge base 358.

FIG. 5 is merely an illustration of how a crowd sourcing module may be implemented. In various embodiments, more or fewer components may be used to implement information crowd sourcing for the digital assistant. More or fewer functions may be provided by the digital assistant. More details regarding the crowd sourcing module 342 and the information crowd sourcing process are provided with reference to FIGS. 6A-6C, and 7 below.

Figure 6A:
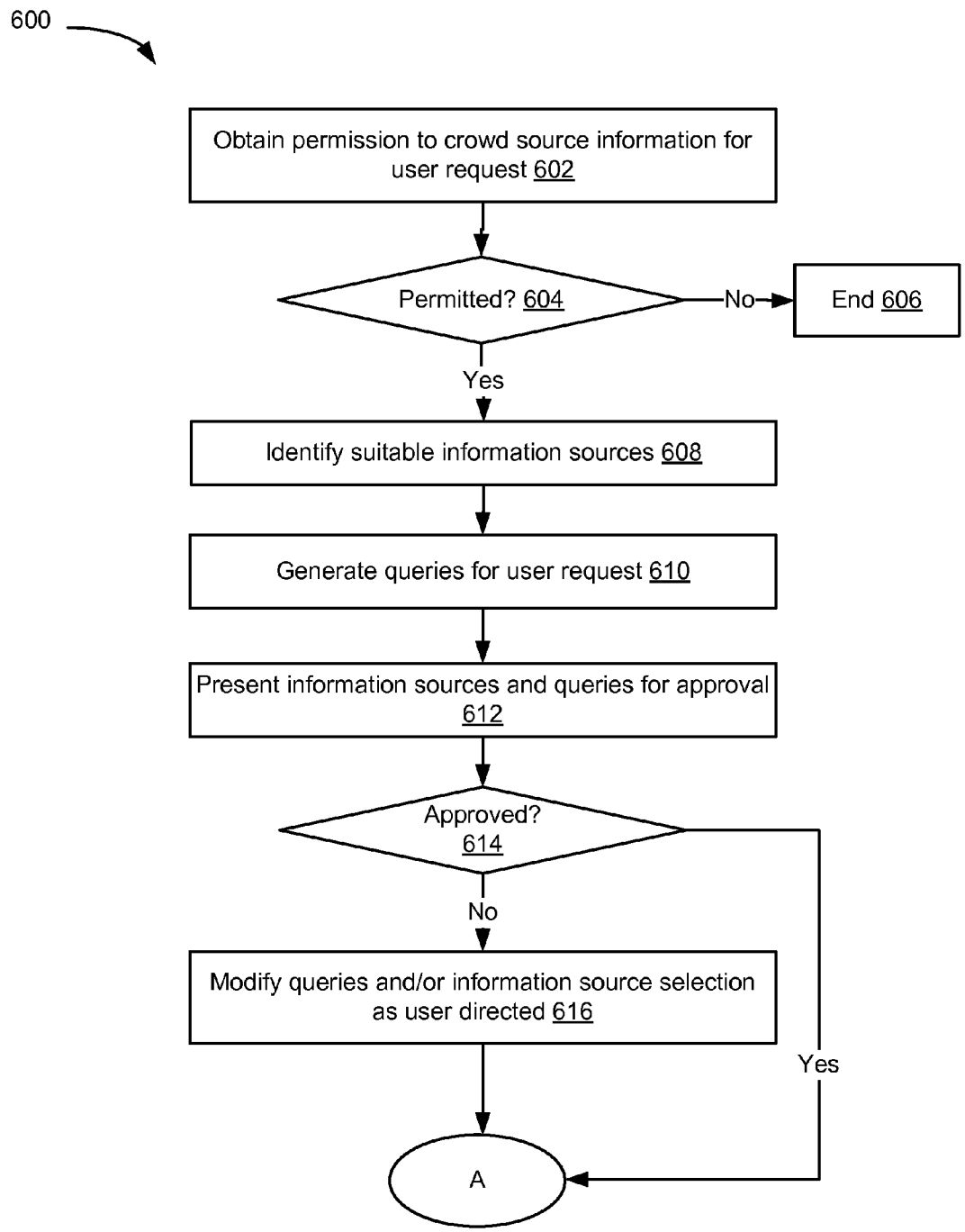
FIGS. 6A-6C are flow charts illustrating a process for providing a response to a user request based on crowd sourced information in accordance with some embodiments.
Figure 6B:
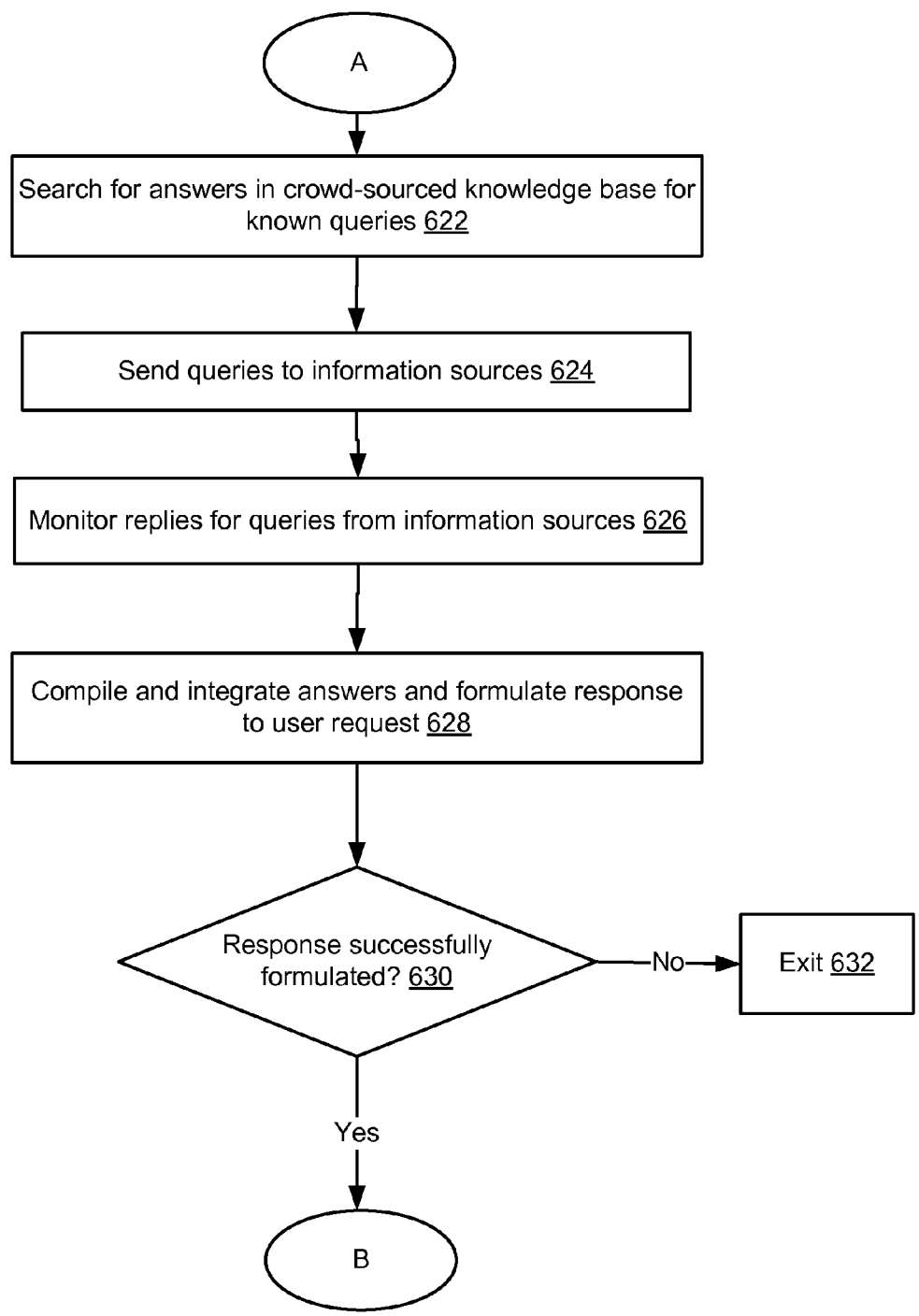
Figure 6C:
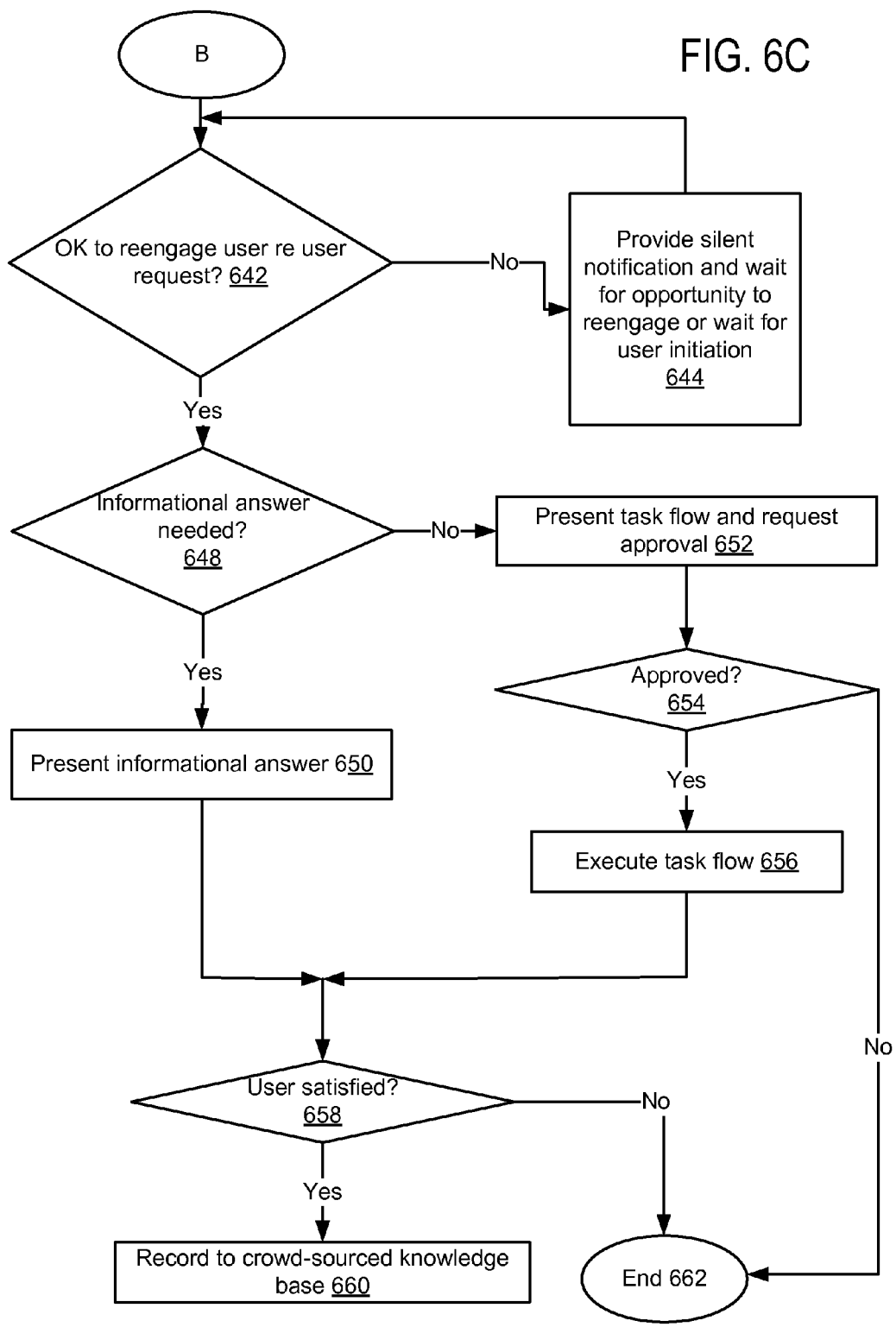

FIGS. 6A-6C illustrate an example process 600 for crowd sourcing information to provide a response to a user request. In some embodiments, the process 600 can be performed as part of a delayed remedy procedure used when one or more real-time response mechanisms have failed to produce a satisfactory response to the user. In some embodiments, the process 600 is a standalone process that is provided independently of a detected failure to fulfill a user request. In some embodiments, the process 600 may be used to provide a response either when a prior failure was detected or without the presence of a prior failure. FIGS. 6A-6C each describes one stage of the information crowd sourcing process. Not all steps shown in FIGS. 6A-6C are necessary in all embodiments. In some embodiments, the process 600 is performed by the information crowd sourcing module 358 shown in FIGS. 3A-3B and 5.

FIG. 6A illustrates the first stage of the information crowd sourcing process. In the first stage, queries are generated based at least in part on a user request, and CS information sources are selected for information crowd sourcing for the user request. This stage of the information crowd sourcing process can happen quickly and within the same user session in which the user request was first received.

As shown in FIG. 6A, during the first stage, the digital assistant first seeks express permission from the user that information crowd sourcing is to be used to aid in the generation of a satisfactory response to the user request (602). In some embodiments, the digital assistant notifies the user that the information crowd sourcing does not guarantee to produce a satisfactory response, and that even if the information crowd sourcing does bring back useful information for producing a satisfactory result, it would take some extended time outside of the current user session before the response can be generated. In some embodiments, the digital assistant also notifies the user that the digital assistant may act on behalf of the user to answer questions and provide additional information to external CS information sources during the crowd sourcing process. The digital assistant allows the user to reject the option to perform crowd sourcing for the user request. The digital assistant can also help the user to establish some privacy rules for the digital assistant for interacting with different CS information sources, such that the user's privacy is not inadvertently compromised during the crowd sourcing.

Based on user's input, the digital assistant determines whether the user has accepted the option to crowd source information for the user request (604). If the user does not accept the information crowd sourcing option for any reason (e.g., for privacy or timing concerns), the digital assistant notifies the user that a satisfactory response cannot be generated based on the current capabilities of the digital assistant. After the notification, the digital assistant can cease further actions or dialogues regarding the user request (606).

If the digital assistant determines that the user would like to proceed with the information crowd sourcing, the digital assistant proceeds to identify one or more CS information sources suitable for providing information regarding the user request (608). In some embodiments, the CS information source selection is performed by the information source selection module 502 shown in FIG. 5. In some implementations, the information source selection is optional, and a default set of information sources are used for all user requests.

In some embodiments, the digital assistant optionally selects the suitable CS information sources based on the properties and domains that were "activated" by the words in the user request during the earlier natural language processing of the user request. For example, if the properties of "restaurant" and "birthday party" were activated during the natural language processing of a user request, the digital assistant can select CS information sources such as a life style information portal, rather than a technical support information portal. In some embodiments, other criteria for selecting the CS information sources can be used.

In some embodiments, the CS information sources that the crowd sourcing module may query for information and answers include public forums. In a public forum, questions can be posted to a wide audience, and answers can be solicited and received from the general public who visit the public forum. Examples of public forums include online chat rooms, online message boards, discussion groups, and the like. In general, a large public forum can have sub-forums focused on different topics and subject matters. In some embodiments, the digital assistant can treat each sub-forum as a separate CS information source.

In general, public forums are suitable for collecting answers for queries that are difficult to categorize or comprehend for machines but may be easily handled by real people. For example, the digital assistant may fail to comprehend a question or answer such as "How to get rid of ants in my kitchen?" based on the domains and properties it has implemented so far, however, individual members of the public will easily understand the question and may have straight-forward answers right away.

In some embodiments, the CS information sources may include specialized sources providing more specialized and focused information, such as expert forums, technical support forums, fan-sites for particular subject matter, and the like. The more specialized and focused CS information sources may be more suitable for queries that require specialized knowledge. For example, a user may ask, "Why can't I print this?" after failing to print a webpage opened on her handheld device. The answer may require a diagnostic procedure that only specially-trained technical support staff or other technically savvy individuals can provide. The query regarding the error in printing a webpage from a user device may be more suited for a technical support expert forum than a general purpose public forum or a product review expert forum, for example.

In some embodiments, the CS information sources include a group of self-identified contributors. Each contributor can be an individual or a group of individuals who have identified themselves as experts in particular fields and agreed to answer questions from the crowd sourcing module in the particular fields.

For example, a female programmer, who is also an excellent chef, may identify herself as an expert in the fields of computers and cooking Whenever a query in one of these two fields is issued by the information crowd sourcing module, the programmer can be alerted of the query (e.g., through an automatic notification system of the digital assistant). If the programmer is able to provide an answer to the query, she can submit the answer to the information crowd sourcing module (e.g., to the answer monitoring module 506 shown in FIG. 5).

In some embodiments, queries and answers in a particular field may be posted in a public area for all self-identified experts of the field to see. The answers provided for the queries can be peer reviewed and rated by other self-identified experts in the field. The information crowd sourcing module can utilize the rating of the answers to select the best answers to a query, for example.

In some embodiments, the interaction between the information crowd sourcing module and the self-identified experts can be through a third-party service, where the third-party service handles the dispatching of queries and collection of answers, as well as screening the self-identified experts, evaluating answers, and/or rating the self-identified experts. In some embodiments, the information crowd sourcing module implements the interfaces and processing components for managing the information crowd sourced from the self-identified experts.

In some embodiments, the CS information sources include an answer arena where users participate in a game in which participants compete to see who can provide the best answers and the most number of answers to queries posted to the game arena. In some embodiments, the game arena includes many smaller arenas each for a different question domain or subject matter. The game arena can provide rewards for gamers, such as points, credits, and the like. Sometimes, the game arena can be used to collect answers for the more challenging questions, and the participants can utilize various resources they personally have access to as an individual (e.g., either online or in the real world) to figure out an answer. The answers for a particular query can be reviewed and/or voted on by a group panel, or by other disinterested/non-participating users for the particular query.

In some embodiments, each user can specify a list of preferred CS information sources or the digital assistant of the user may have learned over time that a particular group of CS information sources have worked well for the user. In such embodiments, the information source selection module can choose the suitable CS information sources based on the user's preference or the recommendation by the digital assistant based on past successes.

In some embodiments, some CS information sources are only available to a specific group of users (e.g., subscribers to a premium CS information source), and the information source selection can be based on the status and identity of the user and whether they have authorization to use particular CS information sources. Other ways of selecting the CS information sources for different users and user requests are possible.

Once the digital assistant has selected the suitable CS information sources for the user request, the digital assistant can proceed to generate one or more queries based on the user request and any available context information (610). In some embodiments, the query generation is performed by the query generation module 504 shown in FIG. 5. In some embodiments, the queries may be the raw voice input of the user contained in the user request. In some embodiments, the query may be a portion of the voice input of the user, and/or other processed form of the raw voice input. In some embodiments, the query includes some or all of the context information currently associated with the user request. In some embodiments, the query may also include partially instantiated domains and/or concepts related to the user request. In various embodiments, the crowd sourcing module generates different queries for different CS information sources, and according to the respective formats required by the different CS information sources.

In some embodiments, the CS information sources identified in the information source database 516 can be organized according subject matter and types. Different APIs and/or protocols needed to communicate with each CS information source can be stored in the information source database 516 as well. The query generation module 504 can refer to the CS information source database 516 when formatting the queries for a particular CS information source.

In some embodiments, the query generation module can generate a query that includes the user request and associated context information their original data form for some CS information sources. The query generation module can also generate a query that includes the user request and context information in a processed form according to the requirements of a CS information source, e.g., according to particular APIs or formatting requirements of the CS information source. In some embodiments, query generation module generates a natural language query that paraphrases the user request with some useful context information, but has all personally identifiable information removed therefrom.

In some embodiments, the query generation module generates queries that are related to only one or more sub-aspects of the user request. For example, suppose that the user said, "Please make an e-card for me with the words 'You are the best dad in the world.' The query generation module may generate a query "How do I make a custom e-card?" The query generation module may also generate other queries such as "What is an e-card?" or "How to make an e-card?" if the word "e-card" and task-flow associated with making an e-card are yet not part of the vocabulary and task-flow models of the digital assistant at the time. In some embodiments, the query generation module uses the natural language processing capabilities of the digital assistant to generate the queries in natural language.

In some embodiments, the query generation module can generate queries that are natural language variants of the user request. For example, suppose the user said, "Teach me how to cook lobsters." The query generation module may generate natural language queries such as "How to cook lobsters?" "Lobster cooking tips" "Got an easy lobster recipe?" The crowd sourcing module can use the natural language variants to identify similar questions that have already been asked and answered in the past in various occasions. For example, instead of or in addition to issuing a fresh query generated from the user request to the various CS information sources, the information crowd sourcing module can search on FAQ bulletins, message boards, public forums, and the crowd-source knowledge base for similar or equivalent questions, and use the answers to those similar or equivalent questions to help with formulating a response to the user request.

In some embodiments, the query generation module identifies user requests that are very similar to one another and can benefit from the answers to the same queries. For example, suppose that the crowd sourcing module has dispatched a first query "Printing error after system upgrade to OS version 7.1." to a CS information source for a user request "Why can't I print?" accompanied by context information indicating a system upgrade to OS version 7.1, and the first query is now in the answer gathering stage. Further suppose that the information crowd sourcing module now needs to do information crowd sourcing for a second user request, "I upgraded to OS 7.1 and now I can no longer print, what's wrong?" The query generation module will generate a second query based on the second user request, and then recognize that there is already a similar or equivalent query (i.e., the first query) dispatched to one or more CS information sources. Therefore, the crowd sourcing module does not dispatch the newly generated query to the CS information sources that have already received a similar or equivalent query before. Instead, the crowd sourcing module waits for the answers to the first query to be collected, and uses the answers to the first query for generating responses to both user requests.

The ability to recognize that similar or equivalent queries have been dispatched or answered is important because the information crowd sourcing module handles information crowd sourcing for many user requests received from many users. Many of these user requests may be very similar and the same queries and answers may provide the necessary information to resolve all of these user requests. Thus, by recognizing similarities between user requests, and detecting and filtering out duplicate or nearly duplicate queries generated from the user requests, the information crowd sourcing module can operate more efficiently. The filtering of duplicate and near duplicate queries also helps prevent the need to have contributors answer the same questions over and over again. In some embodiments, the query generation module uses the natural language processing capabilities of the digital assistant to determine if two or more queries are duplicates or near duplicates of each another.

In some embodiments, the information crowd sourcing module avoids issuing duplicate queries by recognizing the commonalities among different user requests. In some embodiments, the commonality between two user requests can be found based on a large overlap between the domains and properties activated by the two user requests. If two user requests can be fulfilled using the same root solutions or answers (e.g., a common task flow), then the information crowd sourcing only need to be performed for one of the two user requests or a generic combination of the two user requests.

For example, suppose that, after a new version of a device operating system is released, many users who have upgraded to the new version of operating system may experience similar technical issues due to compatibility with existing applications or due to bugs in the operating system. Therefore, multiple users may issue user requests indicating a problem with their respective devices around the same period of time. The information crowd sourcing module will recognize that the different user requests "Why did my web browser crash?" "What happened to my web browser?" "Why can't I open this webpage?" and "Why can't I open this link from my e-mail?" all relate to the same issue because all of these different user requests map to the same domain of technical questions related to the domain of "web browser application technical issues" in the ontology implemented by the digital assistant. In addition, since devices of the users may collect context information (e.g., the operation that the user was performing right before the user request was received, the current version of the operating system, the device type, and so on), the commonality of the user requests is further reflected in the context information provided along with the user requests. In this example, the commonality of the user requests will be reflected in the context such as the version of the operating system, the time that the user requests were received, the error log that has been recorded, and so on. When these user requests are all directed to the crowd sourcing module around the same time period, the crowd sourcing module will be able to determine and recognize that the information crowd sourcing of these similar user requests can be addressed together using one or more generic queries, such "How to fix the browser problem after operating system upgrade to version x.x, in device XX?" The version information and device information in the generic query is completed in by the context information accompanying the user requests. In some embodiments, some user-specific context information (anonymized to protect user privacy) may be utilized by the experts in the CS information sources to provide answers that may be generally applicable to other users.

In some embodiments, the information crowd sourcing component establishes a special query pool for handling queries that are each relevant to the fulfillment of multiple similar or equivalent user requests. The crowd sourcing module optionally sends the queries in the special query pool to a team of experts who can provide solutions, answers, or information in a more speedily manner. Once the answer to a query in the special query pool is received, the answer can help resolve a large number of user requests. In some embodiments, the crowd sourcing module establishes certain criteria for determining when a query may enter the special query pool to receive expedited answers.

The ability to recognize the similarity between user requests also allows the information crowd sourcing module to determine if a current user request is similar or identical to another user request that has already been successfully fulfilled as the result of a previous information crowd sourcing process. If the crowd sourcing module determines that the current user request and the earlier request are identical or sufficiently similar, the crowd sourcing module attempts to fulfill the current user request in a similar manner. The similarity between the two user requests can be determined based on the similarity between the domains and properties that were activated during the natural language processing (intent inference) process for the two user requests.

In some embodiments, the query generation module uses the results from the natural language processing (intent inference) process to determine what questions will likely bring forth answers that will aid the digital assistant in producing a satisfactory response to the user request. For example, suppose that the user had said, "Find me a restaurant that serves Caipirinha." The digital assistant would be able to infer that the user wishes to find a restaurant, but would not know what "Caipirinha" stands for. The query generation module will then use the words that were not found in the vocabulary for the property of "restaurant" (e.g., "Caipirinha" in this case) as the subject of the query. Therefore, the query generation module would generate queries such as "What is Caipirinha?" or "What kind of food or drink is called "Caipirinha"? in addition to the user's original question "Which restaurant serves Caipirinha." In some embodiments, for unknown vocabulary, the query generation module may also provide a few variations of the spelling in the different queries.

In addition, in some embodiments, the query generation components may also use the ontology (e.g., the hierarchy of nodes and sub-nodes) of the "restaurant" property to formulate a query such as "What kind of cuisine is Caipirinha?" When a reply is received for this query and the digital assistant finds out that "Caipirinha" is a type of alcoholic drink found in South America, then, the digital assistant will be able to focus its search for restaurants that serve South American cuisine and alcoholic beverages, and finally find an answer to the user's original question.

In some embodiments, the query generation component 504 may pass at least some of the domains and properties that were activated during natural language processing process of the user request to a CS information source that is capable of extracting information embedded in one or more partially completed structured queries representing those domains and properties. The CS information source can use the information extracted from the partially completed structured queries to decide which contributor should receive the natural language or structured crowd sourcing queries generated by the query generation module 604. In some embodiments, the CS information source can also use the extracted information to provide answers to follow-up questions that a contributor may ask regarding the crowd sourcing queries.

There are many ways that queries can be generated for a user request. Different query generation methods may have different implications in the effectiveness in bringing forth information helpful in responding to user requests, and in the efficiency of query dispatching and answer collection processes. The methods for generating queries provided above are just some of the examples. In some embodiments, the query generation module 504 stores all the queries that have been handled, and the queries that are in the answer collection stage in a queries database (e.g., the queries database 520 in FIG. 5). The queries in the queries database may be clustered based on their commonalities in terms of subject matter. In some embodiments, equivalent or similar queries may be identified as such in the queries database.

In some embodiments, the crowd sourcing module selects the suitable CS information sources for a user request before the queries for the user request are generated. In some embodiments, however, the queries can be generated from the user request first, and then CS information sources can be selected for each query based on various criteria, e.g., based on the subject matter of the query. In some embodiments, a group of CS information sources can be selected before the queries are generated, and the selected CS information sources can be further refined and assigned to handle different queries after the queries are generated.

For example, the queries that are generated for a user request may be related to several different domains of knowledge. Thus, different queries may be dispatched to different CS information sources each suitable for answering some of the queries. Suppose that a user asked, "How do I program my thermostat to conserve energy?" This user request may be partially matched to the domain of technical support due to the terms "program" and "thermostat," and partially matched to the domain of energy conservation due to the terms "conserve energy" in the user request. Based on these two domains, the CS information source selection module may decide to select a technical support forum for a first query "How to program a thermostat?" generated from the user request, while selecting a conservation focused panel for a second query "What room temperatures conserve energy?" generated from the user request.

Referring back to FIG. 6A, after the queries are generated for each selected CS information source, the queries and selected CS information sources are optionally presented to the user for review and approval (612). In some embodiments, the user is allowed to modify the queries and/or the selection of CS information sources at this time or accept the queries and CS information sources as suggested by the crowd sourcing module. In some embodiments, the digital assistant does not present the queries and selected CS information sources to the user for review or approval, and simply proceeds to send the queries to the CS information sources.

In some embodiments, natural language representations of the queries are presented to the user for review and approval, but equivalent structured machine-readable queries are sent to the CS information sources. In some embodiments, the crowd sourcing module will present a list of all the different CS information sources available to the user upon request by the user. The user is allowed to choose one or more of the CS information sources to use for the crowd sourcing. In some embodiments, the user is also allowed to modify some or all of the queries that are to be sent to the different CS information sources.

In some embodiments, if the information crowd sourcing module is already handling a similar user request, and the queries generated for the current user request are already being answered at various CS information sources, the information crowd sourcing module notifies the user that many users have been experiencing the same issue or have the same question, and assures the user that a solution or answer should be arriving soon.

In some embodiments, if the crowd sourcing module is invoked as part of the failure management process of a digital assistant, the crowd sourcing module stores the user request in a failure status database. Each user request is assigned a unique identifier in the failure status database, and information associated with the user request, such as the original user input, the context information associated with the user request, the reason of the failure, the partial or complete intent inferred from user input, the current status of the crowd sourcing for the user request, and ultimately, the result of the crowd sourcing and output generation, can be stored in the failure status database. Various modules of the crowd sourcing module can updated the failure status database with appropriate information.

In some embodiments, when a user's voice input or a portion thereof is included a query, the query generation module implements an algorithm to clean the voice input of the user to remove or obfuscate any offensive or sensitive phrases or words from the voice input before releasing the voice input to any public forums. In some embodiments, the query generation module establishes a screening process that prevents queries involving questionable content from being posted onto the public forums. For example, if the query generation module detects sensitive words related to illegal activities (e.g., copyright violations or drug-related activities)

in a user request, the information crowd sourcing component can reject the user request, or avoid sending queries related to the user request to the CS information sources.

Referring back to FIG. 6A, if suitable CS information sources and/or queries have been presented to the user for approval, the crowd sourcing module determines whether the user has approved the CS information sources and/or queries presented to the user (614). If the presented CS information sources and/or queries are approved, the crowd sourcing module can prepare to enter the second stage of the information crowd sourcing described with reference to FIG. 6B. If the user did not approve the CS information sources and queries, but provided suggestions for modifications, the digital assistant modifies the queries and/or selection of CS information sources according to user's suggestions (616). After the queries and/or selection of CS information sources are modified according to the user's suggestions, the crowd sourcing module can prepare to enter the second stage of the information crowd sourcing described with reference to FIG. 6B. If the request for approval of the CS information sources and/or queries is not implemented by the crowd sourcing module, the crowd sourcing module proceeds to the second stage once the queries are generated.

In some embodiments, if a query generated for a current user request is a duplicate of another query already provided to an CS information source, the information crowd sourcing module does not sent that query to the CS information source again, but simply monitors the answers for the earlier query for both some earlier user request(s) and the current user request.

FIG. 6B illustrates the second stage of the information crowd sourcing process for the user request. The second stage can continue from the step 616 in FIG. 6A or the "No" branch of the decision 614 in FIG. 6A. In the second stage, the information crowd sourcing module optionally searches the crowd-sourced knowledge base (e.g., the crowd-sourced knowledge base 358 in FIGS. 3A-3B and 5 and 7) to see if any of the approved queries for the current user request already exists in the crowd-sourced knowledge base (622). If one or more of the approved queries already exist or have equivalents in the crowd-sourced knowledge base 358, the information crowd sourcing module uses the answers to those queries as the answers for the one or more approved queries.

If one or more of the approved queries are not found in the crowd-sourced knowledge base 358, the information crowd sourcing module proceeds to send those one or more approved queries to the approved CS information sources (624). In some embodiments, sending the queries to a CS information source includes posting a message to a public discussion forum or bulletin board, adding a challenge to a game arena, sending a structure query to a database, and/or other communications according to the respective APIs and protocols of the CS information sources.

After the queries have been dispatched to the CS information sources, the information crowd sourcing module (or an answer monitoring module thereof) monitors the replies received from the CS information sources for the queries dispatched to the CS information sources (626). In some embodiments, the monitoring includes responding to follow-up questions about the queries, and determining when to close the answer gathering period for each of the queries. In some embodiments, the monitoring also involves requesting the user to provide additional information or participating in a live dialogue with one of the CS information sources. In some embodiments, the monitoring also includes determining whether it is appropriate to request the user to provide information or participate in a live dialogue based on the current state of the user. For example, the answer monitoring module may access the user's calendars and determine the user's current location or speed or current engagement, and decide whether it is appropriate to interrupt the user at the present time.

In some embodiments, after the queries are sent to different CS information sources, the answer monitoring module proactively (e.g., periodically) check to see if any replies or answers have been provided by the CS information sources. Sometimes, the answer monitoring module receives notifications from the CS information sources when one or more replies or answers have been received for a particular query. Sometimes, if the number of answers are abundant for certain CS information sources, e.g., expert forums having many self-identified experts or popular game arenas, the answer monitoring module optionally sets a limited answer gathering period and stops taking more replies or answers after the limited answer gathering period expires. For different types of CS information sources, the manner by which answer to queries are monitored may be different.

In some embodiments, the answer monitoring module 506 provides additional information to the CS information sources in response to follow-up questions received from the CS information sources. For example, when a reply is received from a CS information source about a query, the answer monitoring module may utilize the natural language processing capabilities and intent inference process of the digital assistant to determine whether the reply seeks additional clarification information or provides an answer. If the reply seeks additional information, the answer monitoring module determines what information is being sought and whether the digital assistant possesses that information. If the information is available, and sharing of the information with the CS information source is not prohibited by the user's privacy policy or preference, the answer monitoring module provides the information to the CS information source. In some embodiments, the answer monitoring module formulates a natural language response that includes the requested additional information and provides the natural language response back to the CS information source. For example, the natural language response can be posted as a follow-up to the original query in a public forum, and all users reading the original query can now see the follow-up information as well.

In some embodiments, when the answer monitoring module processes the follow-up questions to determine their meanings and intent, the answer monitoring module also utilizes the domains and properties associated with the original user request to help provide context to the follow-up questions.

In some embodiments, when a follow-up question is received from a CS information source for a particular query, the answer monitoring module initiates a dialogue with the information source (e.g., an expert or a customer support staff). In some embodiments, the answer monitoring system utilizes the natural language processing and dialogue processing capabilities of the digital assistant to facilitate the dialogue with the CS information source. In some embodiments, the dialogue can be carried out continuously in real-time, or intermittently over an extended period of time. For example, the answer monitoring module may engage in a diagnostic process with a live technical support staff, and can answer questions posed by the technical support staff. In some embodiments, the digital assistant handles the follow-up questions without the active participation of the user in some situations, while in other situations, the answer monitoring module may decide that it is appropriate to bring the user into the follow-up dialogue, so that the user can provide information that the digital assistant did not currently possess.

Referring back to FIG. 6B, once the information crowd sourcing module (or the answer monitoring module thereof) determines that the enough answers have been gathered for the queries associated with a user request, the information crowd sourcing module proceeds to compile and integrate the answers received for the queries, and formulate a response to the user request based on the integrated answers (628). In some embodiments, the answer integration module 508 compiles and integrates the answers received from the queries for the user request into consolidated crowd sourced information, and the response generation module generates the response to the user request based on the consolidated crowd sourced information and any information the digital assistant already possessed before the information crowd sourcing for the user request.

In some embodiments, when integrating the answers received from different CS information sources, the answer integration module merges and reconciles information received from all of the answers. In some embodiments, outlier answers may be filtered out. In some embodiments, the answer integration module ranks the answers according to factors such as the votes they received, the quality-level or credibility of their respective contributors, the number of duplicates or supporter replies each answer has, and so on.

In some embodiments, one or more top-ranked answers are selected and a response is formulated to include all of the one or more top-ranked answers (e.g., when the user request seeks an informational answer). In some embodiments, one or more top-ranked answers are merged into a single answer and a response is formulated to include the single answer. In some embodiments, the answers received for a user request may be related to different aspects of the user request, and the response generation module creates a response based on the consolidated knowledge inferred from answers received for the different aspects of the user request.

In some embodiments, if the user request is for the performance of a task, the information obtained from the answers can be used by the response generation module to generate a task flow for the user request.

At the second stage shown in FIG. 6B, the response is merely formulated. For a user request seeking an informational answer, the crowd sourced informational answer has not been presented to the user. For a user request seeking performance of a task, the actions for performing the task have not been carried out by the digital assistant.

Referring back to FIG. 6B, after the digital assistant has made the attempt to formulate a response to the user request using the crowd sourced information (e.g., information from the crowd-sourced knowledge base and/or from the answers to the queries), the crowd sourcing module determines whether the response has been successfully formulated (630). If the information crowd sourcing module determines that, despite the additional information obtained from the answers received from the CS information sources, it is not able to successfully formulate a response to the user request, the information crowd sourcing notifies the digital assistant of the failure, and ceases further action on this user request (632). In some embodiments, the information crowd sourcing module stores a log of the failures, and retries the crowd sourcing at a later time (e.g., when a new CS information source is added).

In some embodiments, the answer integration module may determine that, at the end of the allowed answer gathering time period, no satisfactory answer or an insufficient number of answers have been received from the different CS information sources. If so, the crowd sourcing module also determines that a response cannot be successfully formulated at this time. For example, sometimes, the answer integration module may determine that the answers received are not of sufficient quality (e.g., based on a threshold quality criterion such as votes, or based on peer review) for generating a satisfactory response to the user. Sometimes, the response generation module may determine that the answers received do not provide sufficient information or the information is not of sufficient specificity and clarity to help the response generation module to generate a task flow to accomplish the requested task.

Referring back to FIG. 6B, if the information crowd sourcing module determines that it is able to formulate a response to the user request with the help of the additional information obtained from the crowd sourcing process, the digital assistant can prepare to enter the final stage of providing the crowd sourced response to the user. FIG. 6C illustrates the final stage of the information crowd sourcing, i.e., presenting the crowd sourced response to the user.

As shown in FIG. 6C, before the digital assistant provides the crowd sourced response to the user, the digital assistant first determines whether it is an appropriate time to reengage the user regarding the earlier user request (642). For example, the digital assistant may determine the current status of the user based on various signals such as the speed by which the user is moving, the current location of the user, the current time, whether there is any meeting scheduled on the user's calendar for the present time, whether the user device is currently idle or being used for other tasks, and so on. Based on the status of the user, the digital assistant determines whether it is appropriate to interrupt the user or wait for a better opportunity later.

If the digital assistant determines that is it not appropriate to actively reengage the user at the present time, the digital assistant optionally presents a silent notification to the user (e.g., a silent status indicator on the user device) about the availability of the crowd sourced response, such that the user can initiate a dialogue with the digital assistant at a time he or she deems fit or the digital assistant can just wait until a suitable opportunity to reengage with the user is presented (644). For example, at the end of a conversation with the user regarding other matters, the digital assistant can ask the user whether the user wishes to see the crowd sourced response for an earlier user request. In some embodiments, the digital assistant checks periodically to determine if it is appropriate the reengage the user regarding the crowd sourced response for the earlier user request.

If the digital assistant determines that it is appropriate to reengage the user regarding the earlier user request, the digital assistant proceeds to provide the crowd sourced response to the user. Depending on whether the user request was seeking an informational answer or the performance of a task, different steps are taken by the digital assistant. For example, the digital assistant first determines whether the user request was for an informational answer (648). If the user request seeks an informational answer, the digital assistant proceeds to present the informational answer formulated based on the crowd sourced information to the user (650).

Alternatively, if the user request seeks the performance of a task, the digital assistant optionally presents the task flow formulated for the user request, and asks the user to confirm that the user wishes to proceed with the execution of the task flow (652). The digital assistant determines whether the user approves the task flow (654). If the user does not approve the task flow, the digital assistant considers the crowd sourcing answer as unsatisfactory, and ceases further actions regarding the user request (662). If the digital assistant determines that the task flow is approved, the digital assistant proceeds to execute the task flow, e.g., using the facilities of the task flow processing and execution infrastructure of the digital assistant (656).

In some implementations, before a crowd sourced task flow is executed for a user request, the crowed sourcing module forwards the crowd sourced task flow to a board of trusted experts for review and verification. In some embodiments, the digital assistant optionally simulates an operating environment of the user's device and associated services, and executes the crowd sourced task flow in a simulation before the task flow is executed on the user's device.

Once either the informational answer is presented to the user, or the execution of the proposed task flow is successfully completed, the digital assistant asks the user whether the response provided for the user request was satisfactory (658). If, based on the user's feedback, the digital assistant determines that the crowd sourced response is still not satisfactory to the user, the digital assistant considers the crowd sourced response an unsatisfactory response, and ceases further actions regarding the user request, or escalates the user request to other remedial processes, such as sending the user request to a human personal assistant of the user, or the like.

Alternatively, if the digital assistant determines that the user is satisfied with the crowd sourced response (e.g., based on the user's feedback), the digital assistant (e.g., the knowledge-base building module 512 shown in FIG. 5) proceeds to record the crowd sourced response, the user request, and/or the queries and answers that contributed to the successful fulfillment of the user request to the crowd-sourced knowledge base (660). In some embodiments, the digital assistant also records other information, such as the CS information sources that provided the best answers to the queries, and the follow-up questions and answers exchanged during the answer gathering stage.

In some embodiments, the user requests, queries, and answers can be organized by one or more ontologies. The ontologies optionally model the user requests, queries and answers as nodes of domains and properties having various associated vocabulary, attributes, parameters, and task flows. The nodes are organized in one or more hierarchies and may be interrelated by their super-properties, sub-properties, vocabulary, attributes, parameters, task flows, and so on. The organization of the crowd-sourced knowledge base allows the digital assistant to determine whether satisfactory answers to a query or information request already exist in the crowd-sourced knowledge base, and whether a satisfactory response for a user request for performance of a task can be found in the crowd-sourced knowledge base. In some embodiments, the searching for a user request or answer in the crowd-sourced knowledge ontology based on words in the user request or answer is analogous to the identification of an actionable intent based on the words in the user's utterance. For example, a user request node in the crowd-sourced knowledge ontology is optionally associated with one or more property nodes that define different aspects of the user request. Based on the respective vocabulary associated with each node in the crowd-sourced knowledge ontology, a new user request will trigger or activate many of the property nodes associated with an existing user request in the crowd-sourced knowledge base, and be identified as similar to the existing user request.

In some embodiments, the failure to provide a satisfactory response to a user request is identified by an offline analysis of the data logs of the operation and usage of the digital assistant, rather than in real time while responding to the user. In some embodiments, the failure is identified by automated or manual analysis of log data. For example, in some embodiments, failures are identified in the usage logs by evidence for a task not being completed, or answers not being available from information sources, or from users' repeated requests with similar intents, or from users indicating frustration (e.g., turning off or otherwise interrupts the digital assistant's response or action), and/or other data analysis techniques. In some embodiments, data on failures identified offline are sent to the crowd-sourcing module in a similar manner as failures identified in real-time. In these embodiments, the results of crowd-sourced answers are available for use in future real-time sessions, but generally are not delivered back to the users who experienced the failures that were identified offline.

Figure 7:
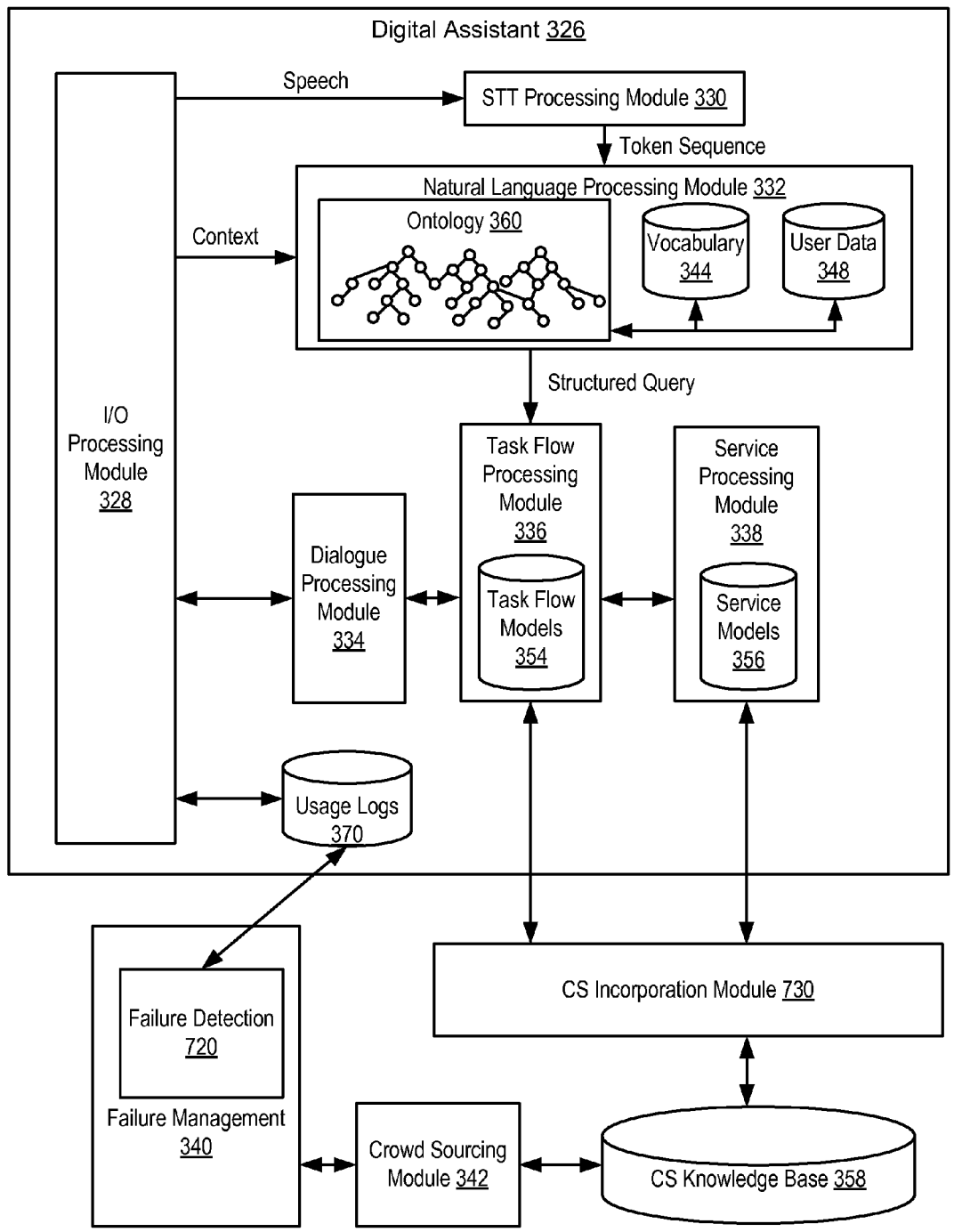
FIG. 7 is a diagram illustrating a failure management and crowd-sourcing knowledge base being used offline to improve various mechanisms of the digital assistant.

FIG. 7 illustrates that, in some embodiments, the digital assistant 326 or the components responsible for providing immediate response to the user are provided separately (e.g., by third-parties, or on different infrastructures) from the failure management module 340, the crowd sourcing module 342, and the crowd-sourced knowledge base 358. However, the functionalities provided by the failure management module 340, the crowd sourcing module 342, and the crowd sourced knowledge base 358 herein, are also applicable to embodiments in which the failure management module 340, the crowd sourcing module 342, and/or the crowd sourced knowledge base 358 are part of the digital assistant system 326.

Referring now to FIG. 7, content of the usage logs 370 of the digital assistant 326 can be analyzed for failures 720. In some embodiments, a failure detection component 720 periodically, or upon request, scans the usage logs 370 for signals, and/or patterns indicative of failures. For example, if the digital assistant implements a catch-all response (e.g., sending the user to a web search interface whenever the digital assistant has failed to find or provide a satisfactory response after two attempts), each issuance of the catch-all response is logged in the usage log 370. When the failure detection module 720 makes a query against the usage logs 370 for all instances in which a catch-all response has been provided for a particular type of user request, the failure detection module 720 would receive event logs of user requests that had failed to produce a satisfactory response. The failure detection module 720 optionally sends to the failure management module 340 the event logs of these user requests. In some embodiments, the failure management module 340 processes these failures in a similar manner as failures that are detected in real-time. The difference between real-time and offline processing of the failures lies in the lack of direct interactions with the user (e.g., requesting permissions, or confirmations, etc.) during the processing. In addition, in most scenarios, if and when these failures are resolved by crowd-sourcing, the correct responses are not presented back to users who initially experienced those failures. Instead, the offline processing is for the benefit of users that make similar requests in the future.

In some embodiments, the information obtained by failure-driven crowd-sourcing and stored in crowd-sourced knowledge base 358 is integrated back into the real-time response mechanisms (e.g., the STT processing module 330, the natural language processing module 332, dialogue processing module 334, the task flow processing module 336, the service processing module 356, and the models used by these processing modules) used by the digital assistant 326. For example, if a question posed by a user was not answered by the digital assistant, and the failure was identified and sent to crowd sourcing as described herein, and successfully answered, then the answer is optionally added to the primary information sources used by the digital assistant. The next time that the same question is asked, the assistant optionally uses the updated information sources to answer the question directly without invoking the crowd-sourcing processes.

In some embodiments, a crowd-sourcing incorporation module 730 is implemented, either as a standalone module or part of the failure management module 340. The crowd-sourcing incorporation module 730 operates in a batch mode to analyze successful crowd-sourced information in the crowd-sourced knowledge base 358, and add that information into the appropriate information stores (e.g., acoustic models, speech models, vocabulary, ontology, language models, task flow models, service models, etc.) of the digital assistant 326.

In some embodiments, the crowd-sourced information is used to update the vocabulary database 344 used in natural language processing. For example, when the failure involved a failure to recognize certain words which were then later associated by the crowd-sourcing process with nodes in the ontology, as described in earlier parts of the specification, the new vocabulary is optionally added to vocabulary database 344 and indexed by nodes in ontology 360 so that on subsequent requests the assistant can correctly infer the intent based on the new vocabulary.

In some embodiments the crowd-sourced information is used to update the task flow models 354. For example, the crowd-sourced response to a diagnostic problem might suggest that the next task flow step is to ask the user a certain question to obtain specific diagnostic data. In some embodiments, such task flows are added to the task flow models 354 after an expert panel review, as described in earlier part of the specification.

In some embodiments the crowd-sourced information is used to update the service models 356 used by service processing module 338. For example, the crowd-source response to a certain question might be a referral to use a particular service. For instance, if the user asked "where can I get blue suede shoes" the crowd-sourced response might be a referral to use a service representing an online shoe sales information site. This is different from storing a specific answer to where to buy the shoes. It is the information used by an assistant to call the shoe sales information service with a query about blue suede shoes, which in turn might respond with stores and inventory results for blue suede shoes.

In some embodiments, the crowd-sourced knowledge base 358 is used directly by external services which are employed by the digital assistant to respond to user requests. For example, a digital assistant sometimes calls on the services of several question answering services (e.g., "external services" in FIG. 3B). One of these services is optionally a question answering service that uses questions and answers stored in the crowd-sourced knowledge base 358 to provide answers back to the digital assistant 358. In these embodiments, some of these questions are directly answered by the assistant in real-time without requiring the information to be incorporated into the response mechanisms of the digital assistant 326 (e.g., through the operation of the crowd-sourcing incorporation module 730). For example, in some embodiments, the digital assistant optionally uses the information in the crowd-sourced knowledge base 358, either directly or through a third-party service, for a period of time to respond to real-time requests, and further evaluate the user feedback before allowing the crowd-sourcing incorporation module 730 to modify the response mechanism of the digital assistant 326 using such information.

In some embodiments, when preparing a response to the user, the digital assistant, in addition to calling on a web search engine on unknown queries, also calls a service that is powered by a crowd-sourced knowledge base (e.g., the crowd-sourced knowledge base 358 or other third-party crowd-sourced knowledge bases). In some embodiments, if the crowd-sourced knowledge base powered service returns an answer, the digital assistant provides that answer to the user instead of the web search (e.g., the catch-all response). If the crowd-sourced knowledge base powered service does not return an answer, the digital assistant provides the answer received from the web search (e.g., the catch-all response). In this way, the competence of the digital assistant can be automatically grown as it feeds failures to crowd-sourced services and they provide suitable responses on subsequent requests.

It should be understood that the particular order in which the operations in the flow charts have been described is merely exemplary and is not intended to indicate that the described order is the only order in which the operations could be performed. One of ordinary skill in the art would recognize various ways to reorder the operations described herein. In addition, unless explicitly specified, features described in various embodiments may be combined and used together. Additionally, it should be noted that details of other processes described herein may be applied in addition to, instead of, or in conjunction with the operations described with reference to the figures.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for providing a response to a user request, comprising:
   at a server computer with one or more processors and memory:
      receiving a user request from a mobile client device, the user request including at least a speech input and seeks an informational answer or performance of a task;
      detecting a failure to provide a satisfactory response to the user request;
      in response to detecting the failure, crowd-sourcing information relevant to the user request by querying one or more crowd sourcing information sources;
      receiving one or more answers from the crowd sourcing information sources; and
      generating a response to the user request based on at least one of the one or more answers received from the one or more crowd sourcing information sources.

2. The method of claim 1, wherein crowd-sourcing the information relevant to the user request further comprises:
   generating one or more queries based on the user request; and
   sending the one or more queries to the one or more crowd sourcing information sources.

3. The method of claim 1, wherein the crowd-sourcing further comprises identifying, from a set of crowd sourcing information sources, the one or more crowd sourcing information sources to be queried.

4. The method of claim 1, further comprising, prior to the crowd-sourcing:
   requesting permission from the user to send the information contained in the user request to the one or more crowd sourcing information sources; and receiving permission from the user to send the information contained in the user request to the one or more crowd sourcing information sources.

5. The method of claim 1, further comprising:
receiving at least one real-time answer from a real-time answer-lookup database;
upon receipt of the at least one real-time answer, sending to the mobile client device the at least one real-time answer;
receiving at least one non-real-time answer from a non-real-time expert service after receiving the at least one real-time answer; and
upon receipt of the at least one non-real-time answer, sending to the mobile client device the at least one non-real-time answer.

6. The method of claim 1, further comprising:
not receiving any answer from at least one of the one or more crowd sourcing information sources before generating the remedial response.

7. The method of claim 1, further comprising:
when more than one answer is received from the one or more crowd sourcing information sources, ranking the answers in accordance with predetermined criteria.

8. The method of claim 1, wherein receiving the one or more answers from the crowd sourcing information sources further comprises:
receiving at least one of the one or more answers from individual members of the public in non-real-time.

9. A non-transitory computer-readable medium storing instructions, the instructions, when executed by one or more processors, cause the processors to perform operations comprising:
receiving a user request from a mobile client device, the user request including at least a speech input and seeks an informational answer or performance of a task;
detecting a failure to provide a satisfactory response to the user request;
in response to detecting the failure, crowd-sourcing information relevant to the user request by querying one or more crowd sourcing information sources;
receiving one or more answers from the crowd sourcing information sources; and
generating a response to the user request based on at least one of the one or more answers received from the one or more crowd sourcing information sources.

10. The computer-readable medium of claim 9, wherein crowd-sourcing the information relevant to the user request further comprises:
generating one or more queries based on the user request; and
sending the one or more queries to the one or more crowd sourcing information sources.

11. The computer-readable medium of claim 9, wherein the crowd-sourcing further comprises identifying, from a set of crowd sourcing information sources, the one or more crowd sourcing information sources to be queried.

12. The computer-readable medium of claim 9, wherein the operations further comprise:
prior to the crowd-sourcing:
requesting permission from the user to send the information contained in the user request to the one or more crowd sourcing information sources; and
receiving permission from the user to send the information contained in the user request to the one or more crowd sourcing information sources.

13. The computer-readable medium of claim 9, wherein the operations further comprise:
receiving at least one real-time answer from a real-time answer-lookup database;
upon receipt of the at least one real-time answer, sending to the mobile client device the at least one real-time answer;
receiving at least one non-real-time answer from a non-real-time expert service after receiving the at least one real-time answer; and
upon receipt of the at least one non-real-time answer, sending to the mobile client device the at least one non-real-time answer.

14. The computer-readable medium of claim 9, wherein the method further comprise:
not receiving any answer from at least one of the one or more crowd sourcing information sources before generating the remedial response.

15. The computer-readable medium of claim 9, wherein the operations further comprise:
when more than one answer is received from the one or more crowd sourcing information sources, ranking the answers in accordance with predetermined criteria.

16. The computer-readable medium of claim 9, wherein receiving the one or more answers from the crowd sourcing information sources further comprises:
receiving at least one of the one or more answers from individual members of the public in non-real-time.

17. A system, comprising:
one or more processors; and
memory storing instructions, the instructions, when executed by the one or more processors, cause the processors to perform operations comprising:
receiving a user request from a mobile client device, the user request including at least a speech input and seeks an informational answer or performance of a task;
detecting a failure to provide a satisfactory response to the user request;
in response to detecting the failure, crowd-sourcing information relevant to the user request by querying one or more crowd sourcing information sources;
receiving one or more answers from the crowd sourcing information sources; and
generating a response to the user request based on at least one of the one or more answers received from the one or more crowd sourcing information sources.

18. The system of claim 17, wherein crowd-sourcing the information relevant to the user request further comprises:
generating one or more queries based on the user request; and
sending the one or more queries to the one or more crowd sourcing information sources.

19. The system of claim 17, wherein the crowd-sourcing further comprises identifying, from a set of crowd sourcing information sources, the one or more crowd sourcing information sources to be queried.

20. The system of claim 17, wherein the operations further comprise:
prior to the crowd-sourcing:
requesting permission from the user to send the information contained in the user request to the one or more crowd sourcing information sources; and
receiving permission from the user to send the information contained in the user request to the one or more crowd sourcing information sources.

21. The system of claim 17, wherein the operations further comprise:
    receiving at least one real-time answer from a real-time answer-lookup database;
    upon receipt of the at least one real-time answer, sending to the mobile client device the at least one real-time answer;
    receiving at least one non-real-time answer from a non-real-time expert service after receiving the at least one real-time answer; and
    upon receipt of the at least one non-real-time answer, sending to the mobile client device the at least one non-real-time answer.

22. The system of claim 17, wherein the operations further comprise:
    not receiving any answer from at least one of the one or more crowd sourcing information sources before generating the remedial response.

23. The system of claim 17, wherein the operations further comprise:
    when more than one answer is received from the one or more crowd sourcing information sources, ranking the answers in accordance with predetermined criteria.

24. The system of claim 17, wherein receiving the one or more answers from the crowd sourcing information sources further comprises:
    receiving at least one of the one or more answers from individual members of the public in non-real-time.

25. The method of claim 1, wherein the detecting a failure to provide a satisfactory response to the user request comprises determining that a web-search based on information contained in the user request is unsatisfactory to the user.

26. The method of claim 1, wherein the detecting a failure to provide a satisfactory response to the user request comprises receiving feedback from the user that a previous response provided to the user was unsatisfactory.

27. The method of claim 1, wherein the detecting a failure to provide a satisfactory response to the user request comprises analyzing usage logs associated with the user.

\* \* \* \* \*